United States Patent
Kravitz et al.

(10) Patent No.: US 12,107,963 B1
(45) Date of Patent: Oct. 1, 2024

(54) METHOD AND APPARATUS FOR REVERSIBLE TOKENIZATION WITH SUPPORT FOR EMBEDDABLE ROLE-BASED ACCESS CONTROL

(71) Applicant: Springcoin, Inc., Marina del Rey, CA (US)

(72) Inventors: David William Kravitz, San Jose, CA (US); Michael Young, San Diego, CA (US); Matthew Benjamin Smith, Playa Vista, CA (US)

(73) Assignee: Springcoin, Inc., Marina del Rey (CA)

( * ) Notice: Subject to any disclaimer, the term of this patent is extended or adjusted under 35 U.S.C. 154(b) by 0 days.

(21) Appl. No.: 18/388,438

(22) Filed: Nov. 9, 2023

Related U.S. Application Data

(63) Continuation-in-part of application No. 18/228,383, filed on Jul. 31, 2023, now Pat. No. 11,930,117.

(Continued)

(51) Int. Cl.
*H04L 9/32* (2006.01)
*G06F 40/284* (2020.01)
*H04L 9/40* (2022.01)

(52) U.S. Cl.
CPC .......... *H04L 9/3234* (2013.01); *G06F 40/284* (2020.01); *H04L 63/101* (2013.01)

(58) Field of Classification Search
CPC .... H04L 9/3234; H04L 63/101; G06F 40/284

(Continued)

(56) References Cited

U.S. PATENT DOCUMENTS 11,374,910 B2 * 6/2022 Kravitz .................. H04L 63/12
11,526,493 B2 * 12/2022 Borrill ................ G06F 16/2379
(Continued)

FOREIGN PATENT DOCUMENTS

| CN | 112041869 A | 12/2020 |
| KR | 20210139344 A | 11/2021 |
| WO | 2022056097 A1 | 3/2022 |

OTHER PUBLICATIONS

Patriquin, Justin; "The How and Why of Reversible Tokenization"; Sep. 11, 2020; https://medium.com/dropoutlabs/announcing-reversible-tokenization-in-cape-python-9fb7f95ebe52; in English (5 pages).

(Continued)

*Primary Examiner* — Kambiz Zand
(74) *Attorney, Agent, or Firm* — FITCH EVEN TABIN & FLANNERY, LLP

(57) ABSTRACT

Participants as requestors using a requesting network element request one or more tokenization processors to generate tokens that represent a sanitized version of data such that the resultant tokens are amenable to comparison across participants. As circumstances warrant, one or more such tokens can be submitted to the tokenization processor(s) to privately retrieve the original data. Role-based access control scope parameters and tokenization processor-specific tokenization processor secrets can be embedded into reversible tokens that remain invariant under updating of the tokenization processor secrets across tokenization processors. By another approach, role-based access control scope parameters and tokenization processor-specific tokenization processor secrets are embedded into tokens and corresponding key tokens such that upon authorized presentation of a token by a requestor, the corresponding key token is recovered so that the keying material that was used to generate (Continued)

ciphertext is retrievable in order to recover the corresponding plaintext.

20 Claims, 27 Drawing Sheets

Related U.S. Application Data

(60) Provisional application No. 63/393,734, filed on Jul. 29, 2022.
(58) Field of Classification Search
USPC .......................................................... 713/159
See application file for complete search history.

(56) References Cited

U.S. PATENT DOCUMENTS

| | | | | |
|---|---|---|---|---|
| 2016/0063487 A1* | 3/2016 | Moreton | ............... | G06Q 20/20 705/67 |
| 2022/0029969 A1* | 1/2022 | Kravitz | ............... | H04L 9/3252 |
| 2022/0229869 A1* | 7/2022 | Martin | ............... | G06Q 20/34 |
| 2022/0385642 A1* | 12/2022 | Kravitz | ............... | H04L 63/0281 |

OTHER PUBLICATIONS

NIST; "Security and Privacy Controls for Information Systems and Organizations"; Special Publication 800-53 Revision 5, Sep. 2020; in English (492 pages).

Gorawski, Marcin et al., "Optimization of Privacy Preserving Mechanisms in Homogeneous Collaborative Association Rules Mining"; in English ( 2011; 6 pages).

PCI Security Standards Council; "Tokenization Product Security Guidelines" Apr. 2015; in English (84 pages).

Thomas, Christopher; "Recurrent Neural Networks and Natural Language Processing" Jun. 9, 2019; in English (17 pages).

Singer, Gadi; "LM!=KM: The Five Reasons Why Language Models Fall Short of Supporting Knowledge Model Requirements of Next-Gen AI" Jan. 12, 2022; in English (16 pages).

Aldeco-Perez, Rocio et al.; "Provenance-based Auditing of Private Data Use" Aug. 2008; in English (13 pages).

* cited by examiner

METHOD AND APPARATUS FOR REVERSIBLE TOKENIZATION WITH SUPPORT FOR EMBEDDABLE ROLE-BASED ACCESS CONTROL

CROSS REFERENCE TO RELATED APPLICATION

This application is a continuation-in-part of co-pending and co-owned U.S. patent application Ser. No. 18/228,383 entitled METHOD AND APPARATUS FOR REVERSIBLE TOKENIZATION WITH SUPPORT FOR EMBEDDABLE ROLE-BASED ACCESS CONTROL and filed Jul. 31, 2023, which is incorporated by reference in its entirety herein.

This application claims the benefit of U.S. Provisional application No. 63/393,734 filed Jul. 29, 2022, which is incorporated by reference in its entirety herein.

TECHNICAL FIELD

These teachings relate generally to accessing data and more particularly to the preservation of privacy.

BACKGROUND

It is known in the prior art to tokenize data via multiple processors such that the one or more secrets used by each processor to effect tokenization can be updated without requiring previously tokenized data to be retokenized to enable effective matching of tokenized data across instances of tokenization regardless of when tokenization occurred. It is also known to have a requestor of tokenization ephemerally blind the input data to hide its value during the tokenization process without affecting the finalized value of the resultant token. The applicant has determined that it can be desirable, however, to retain these properties while satisfying additional ones as explained below.

Figure 6:
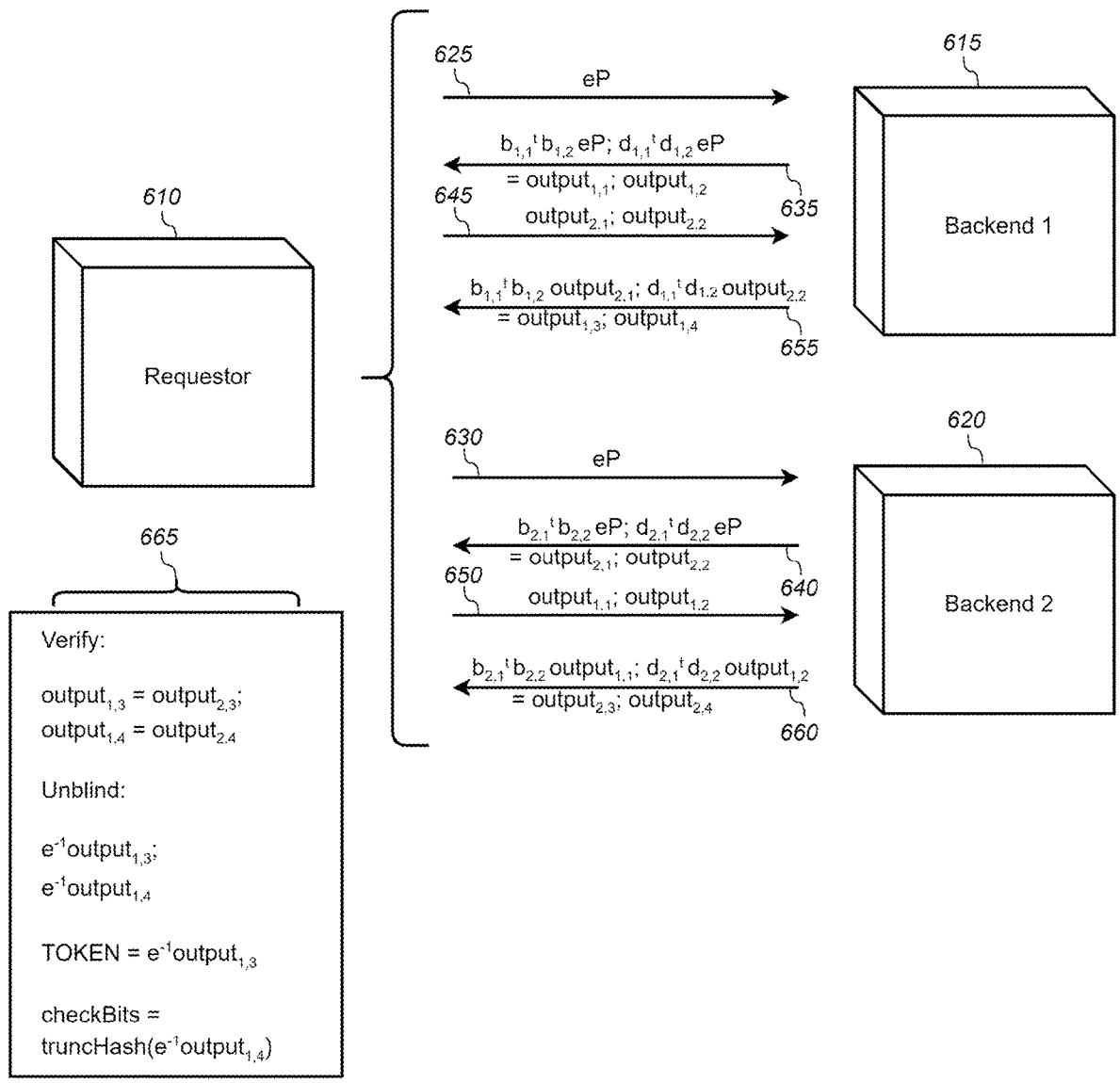
FIG. 6 comprises a flow chart with a signal flow diagram as configured in accordance with various embodiments of these teachings and that illustrates parallelizable two-round tokenization involving a Requestor, a Backend 1 and a Backend 2. The final outputs comprise a reversible token and a cryptographic integrity token, and their derivation involves verification, unblinding and hashing on the part of the Requestor. The transmissions depicted in FIG. 6 may include an overlay such as authenticated or non-authenticated encryption that is subsequently decrypted, that is not explicitly shown.
Figure 10:
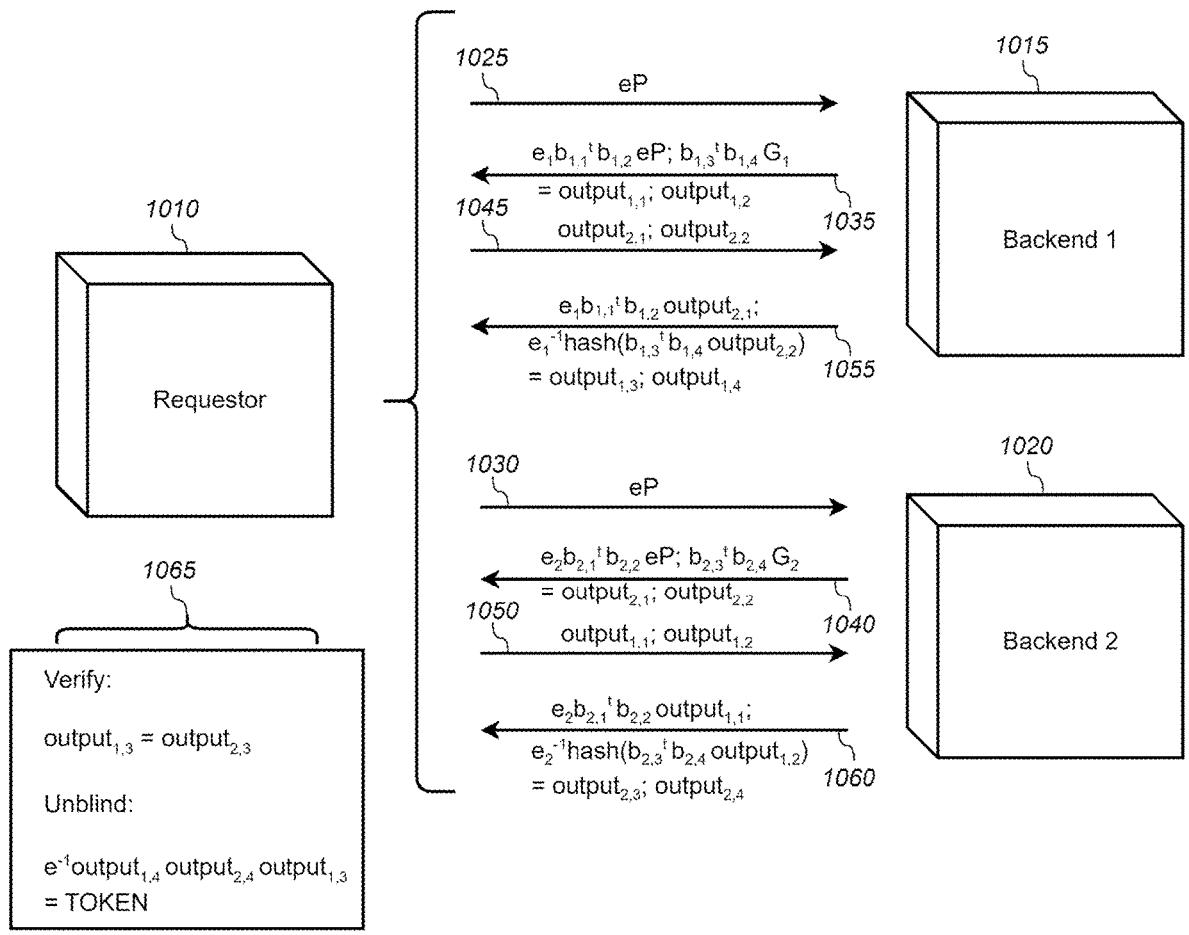
FIG. 10 comprises a flow chart with a signal flow diagram as configured in accordance with various embodiments of these teachings and that illustrates parallelizable two-round tokenization involving a Requestor, a Backend 1 and a Backend 2. A reversible token is a final output, and its derivation involves verification and unblinding on the part of the Requestor that follows unblinding on the part of Backend 1 and Backend 2. The transmissions depicted in FIG. 10 may include an overlay such as authenticated or non-authenticated encryption that is subsequently decrypted, that is not explicitly shown.
Figure 11:
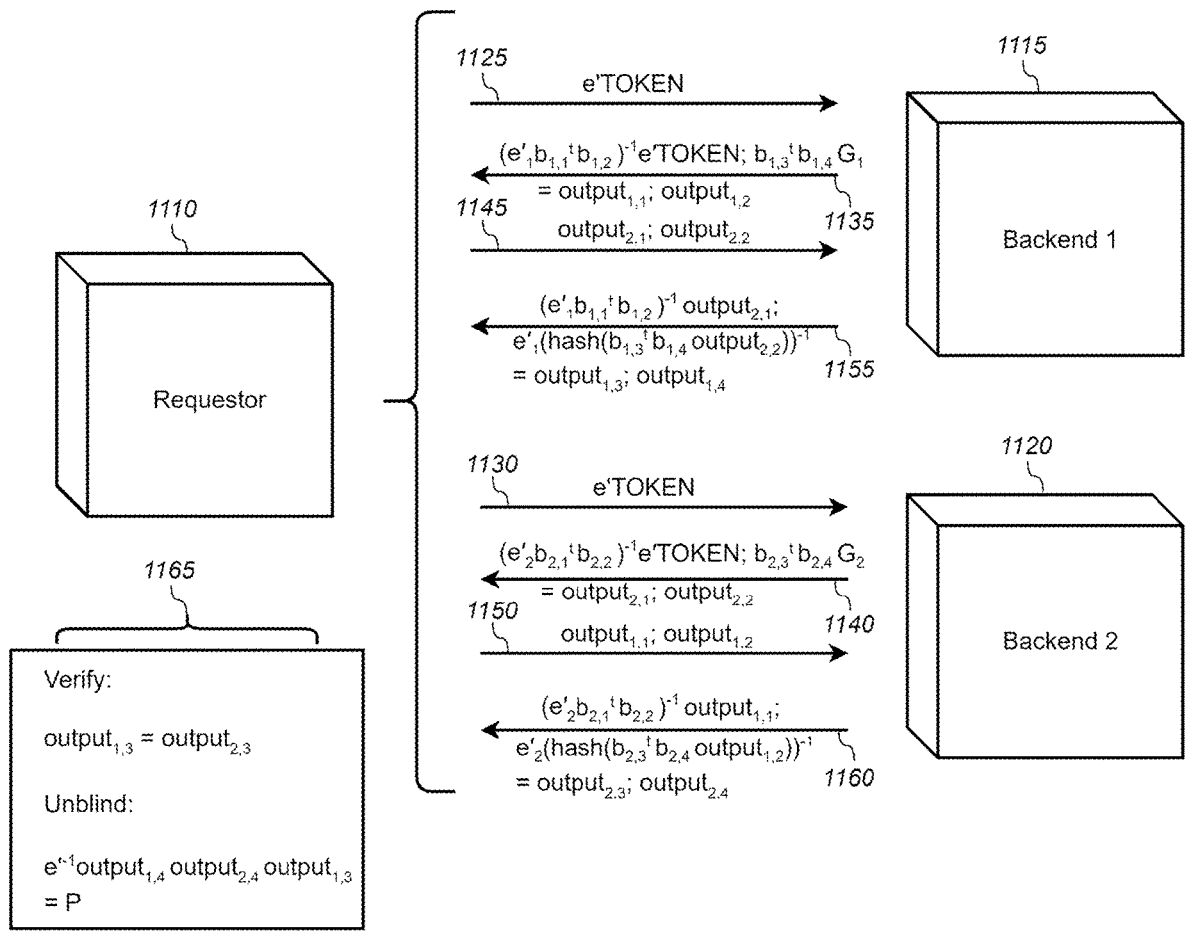
Figure 12:
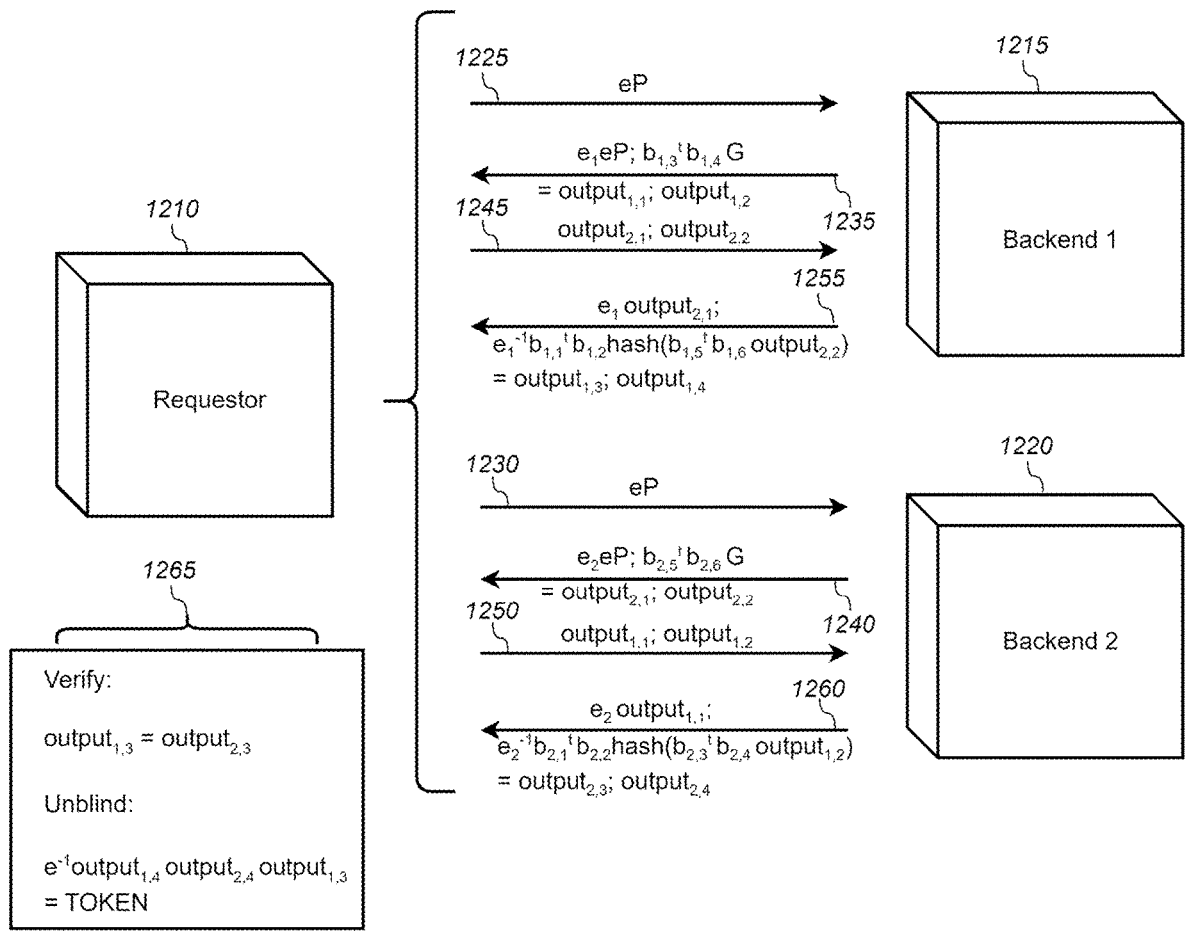
Figure 13:
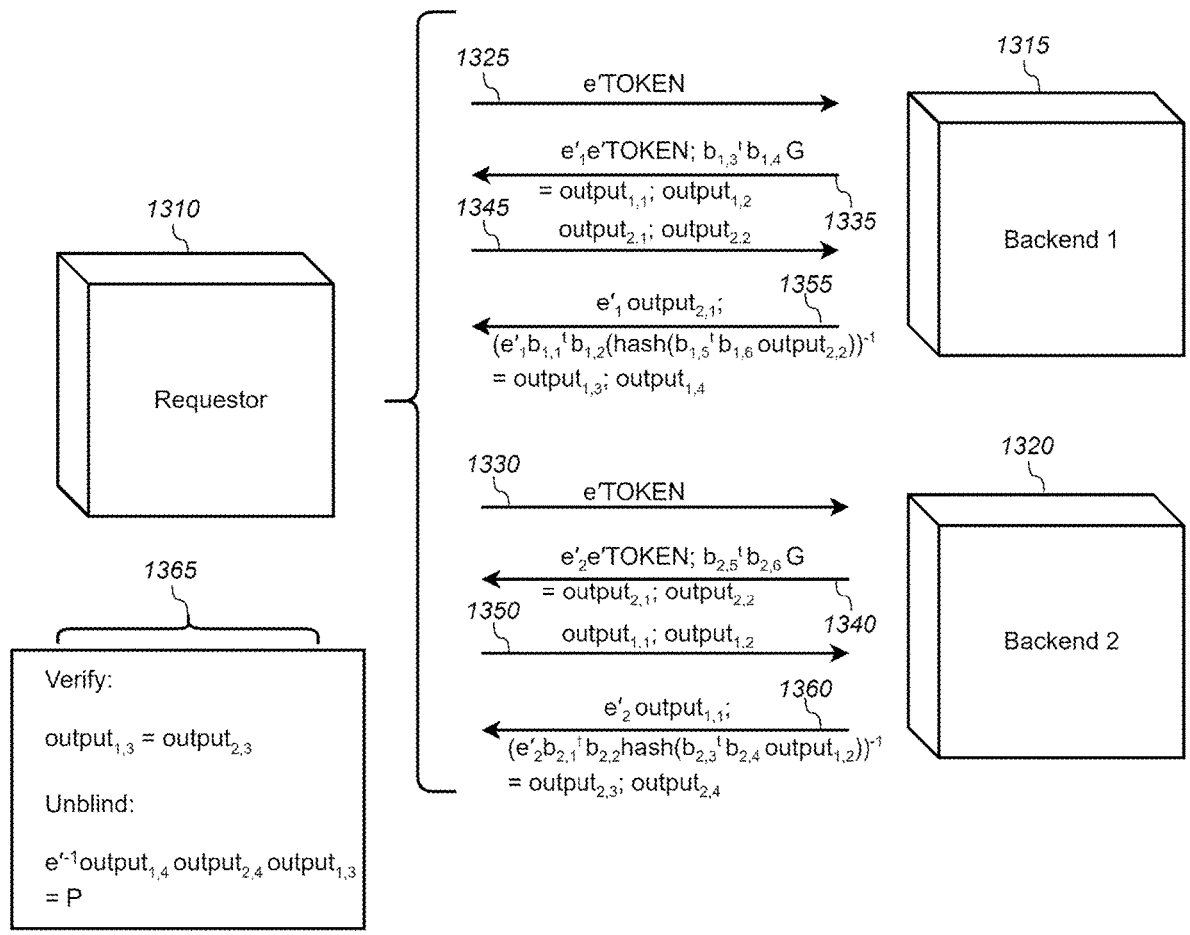
Figure 14:
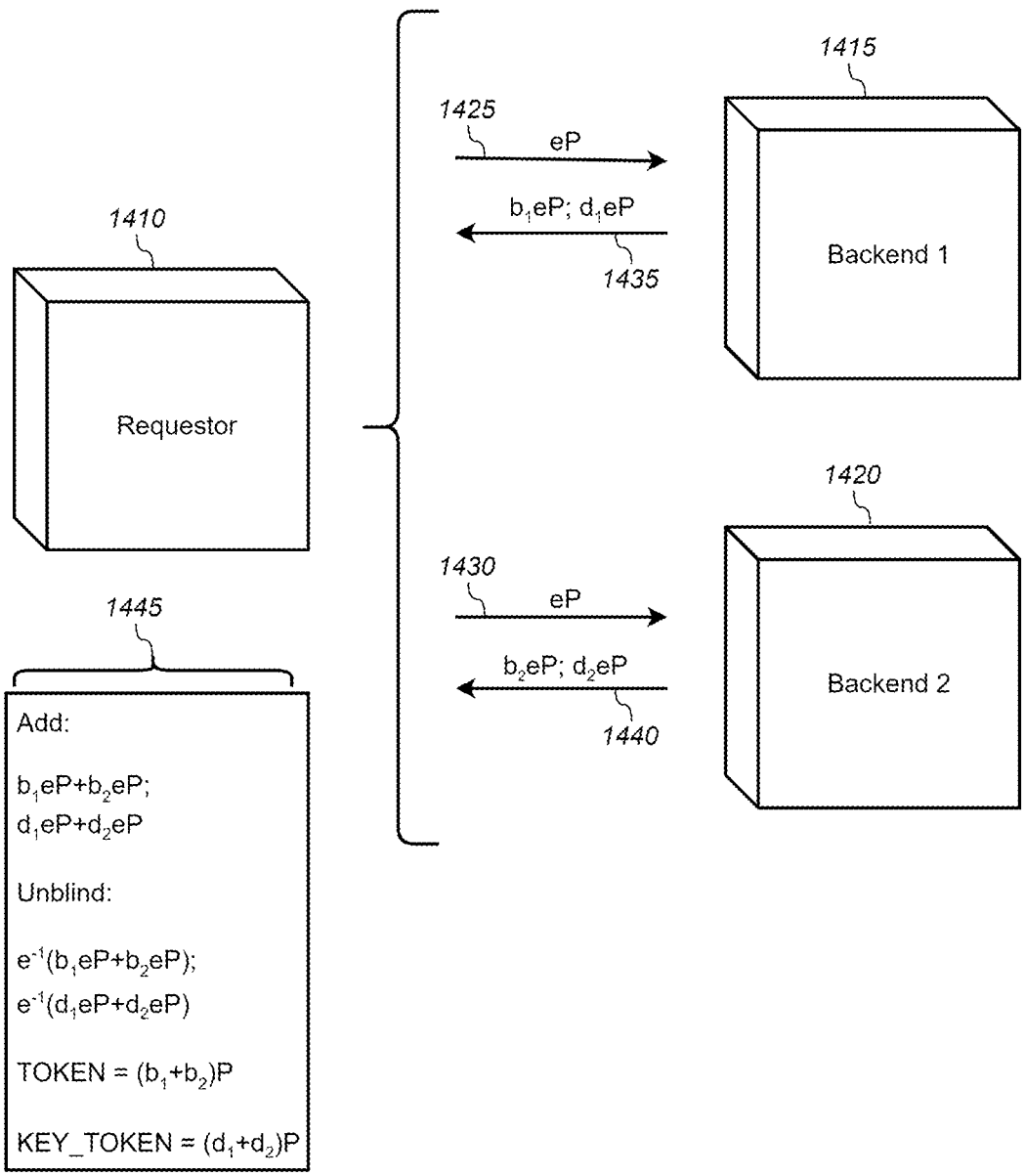
Figure 15:
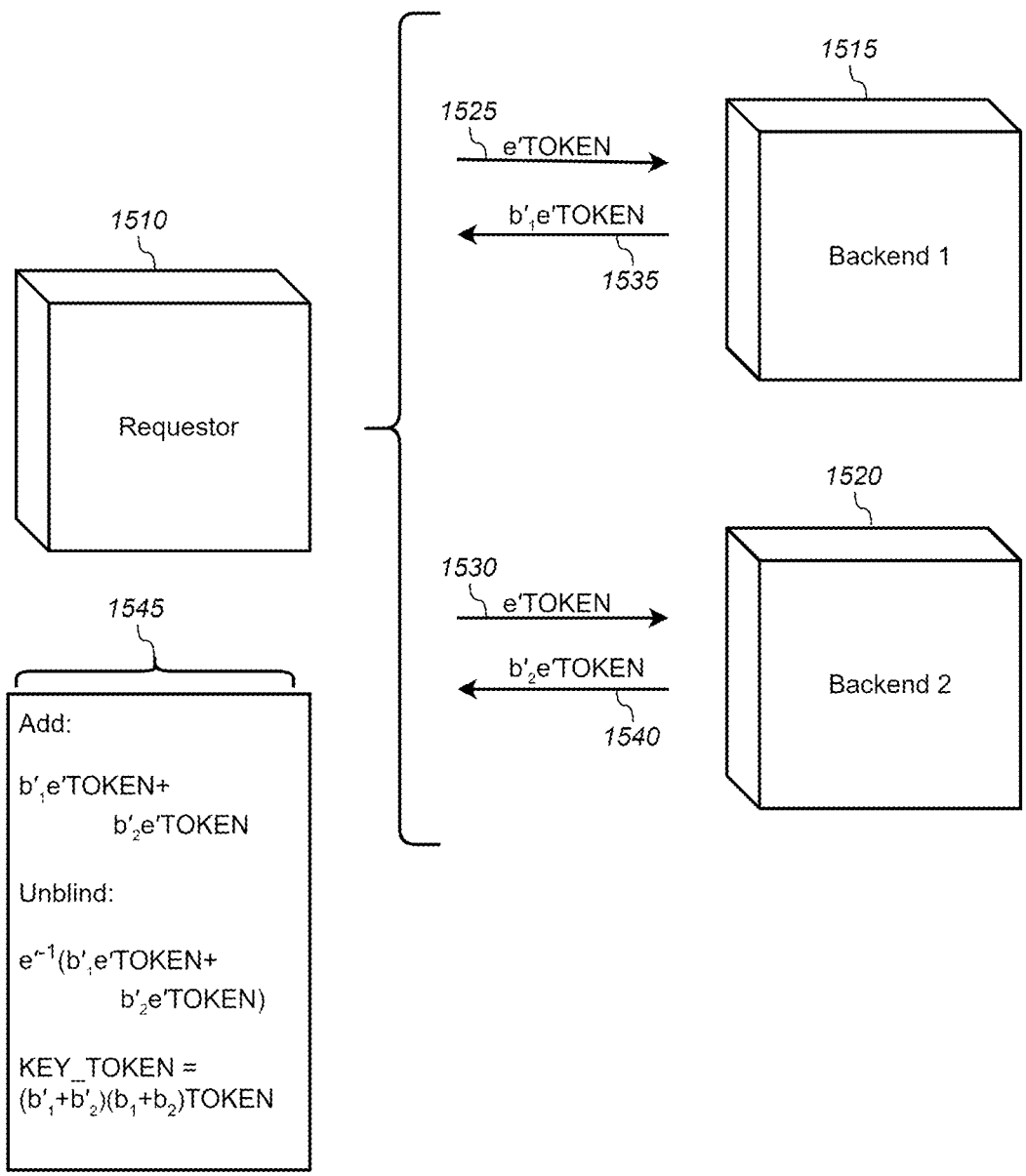
Figure 16:
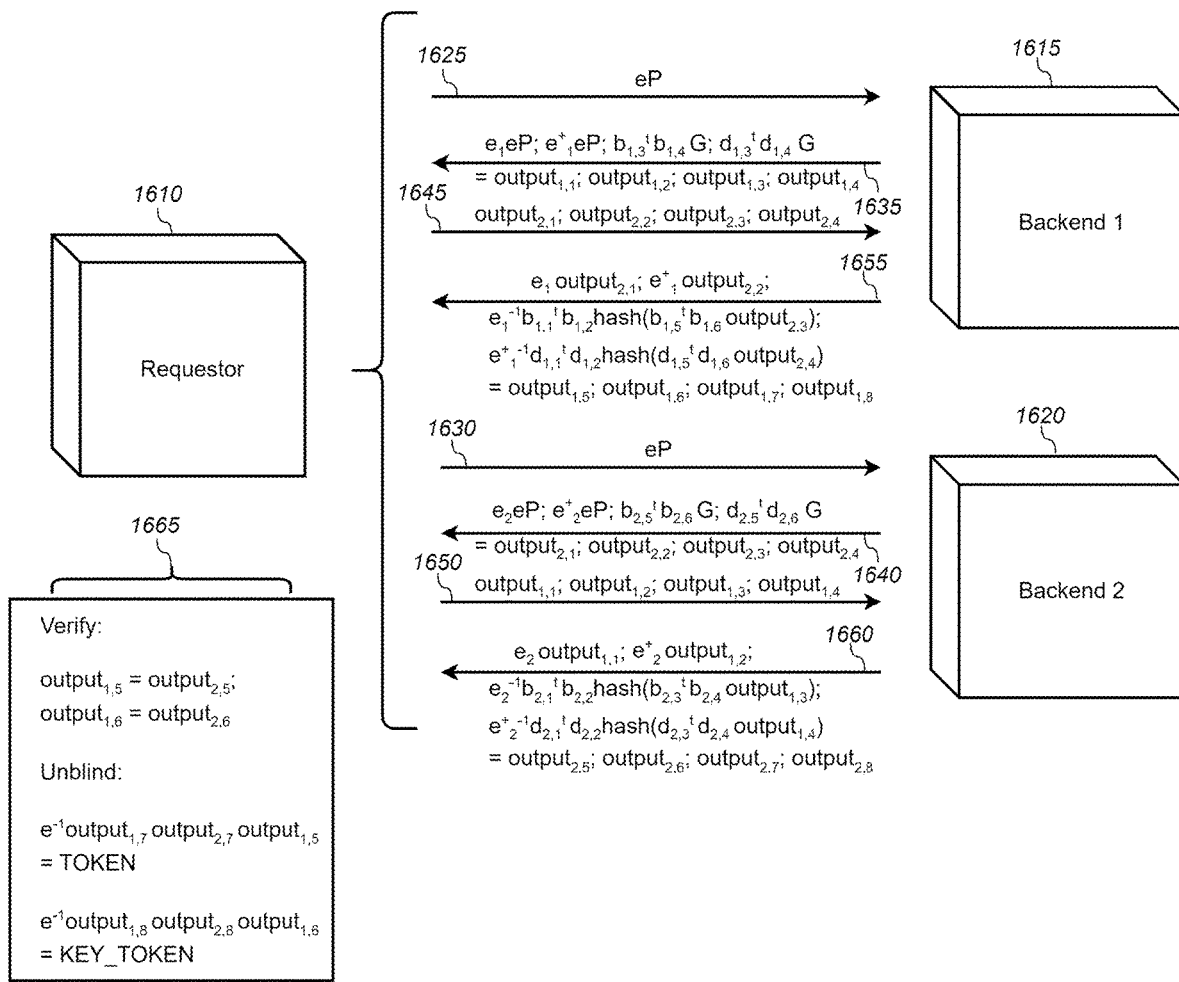
Figure 17:
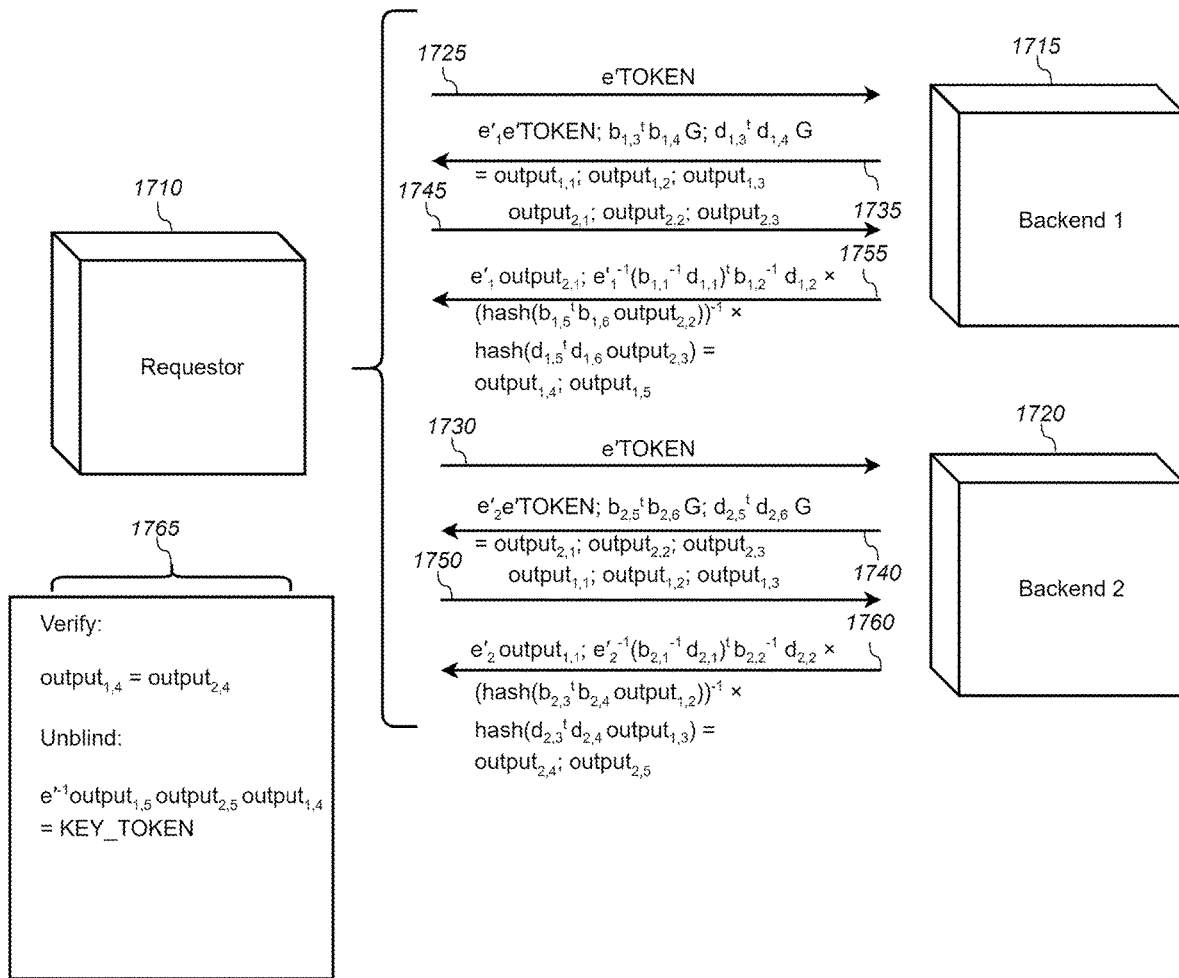
Figure 18:
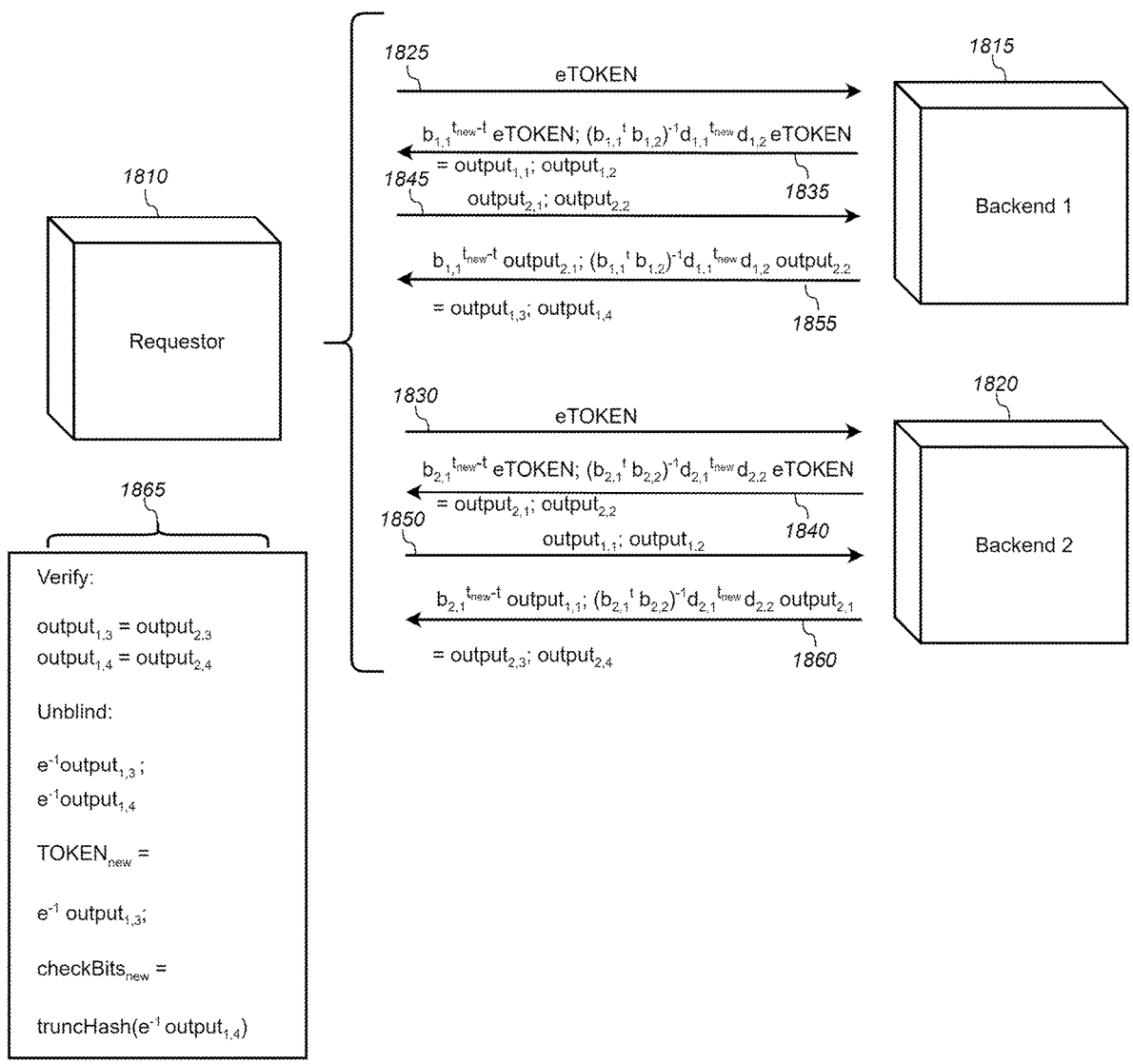
Figure 19:
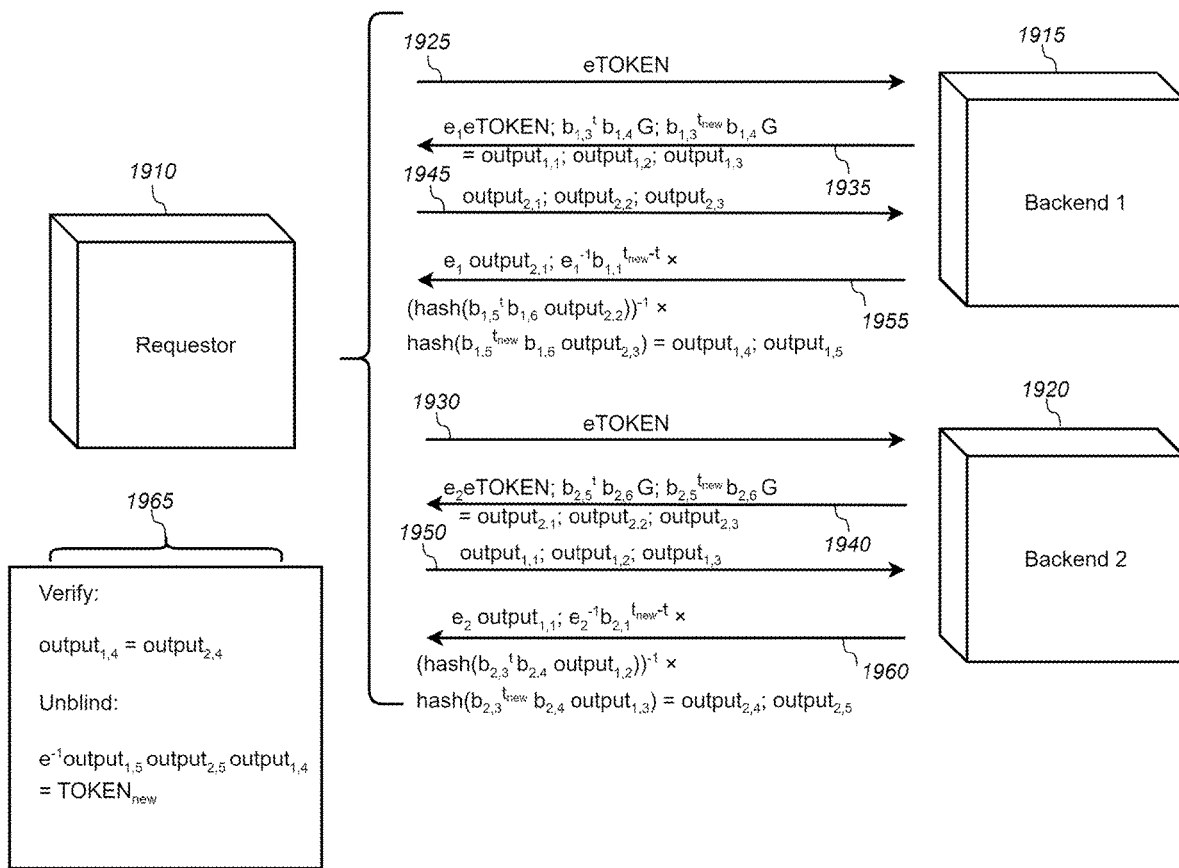
Figure 20:
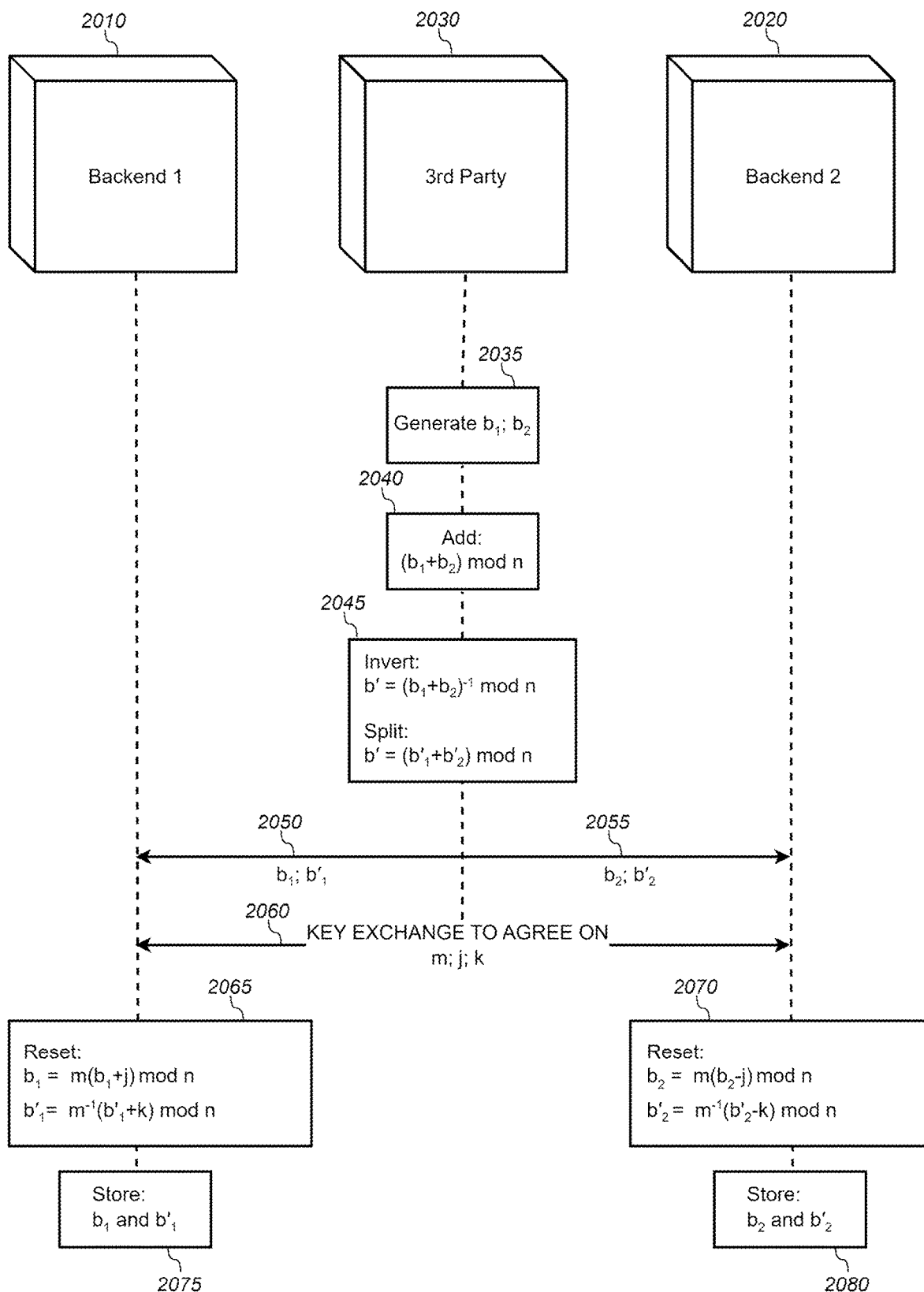
Figure 21:
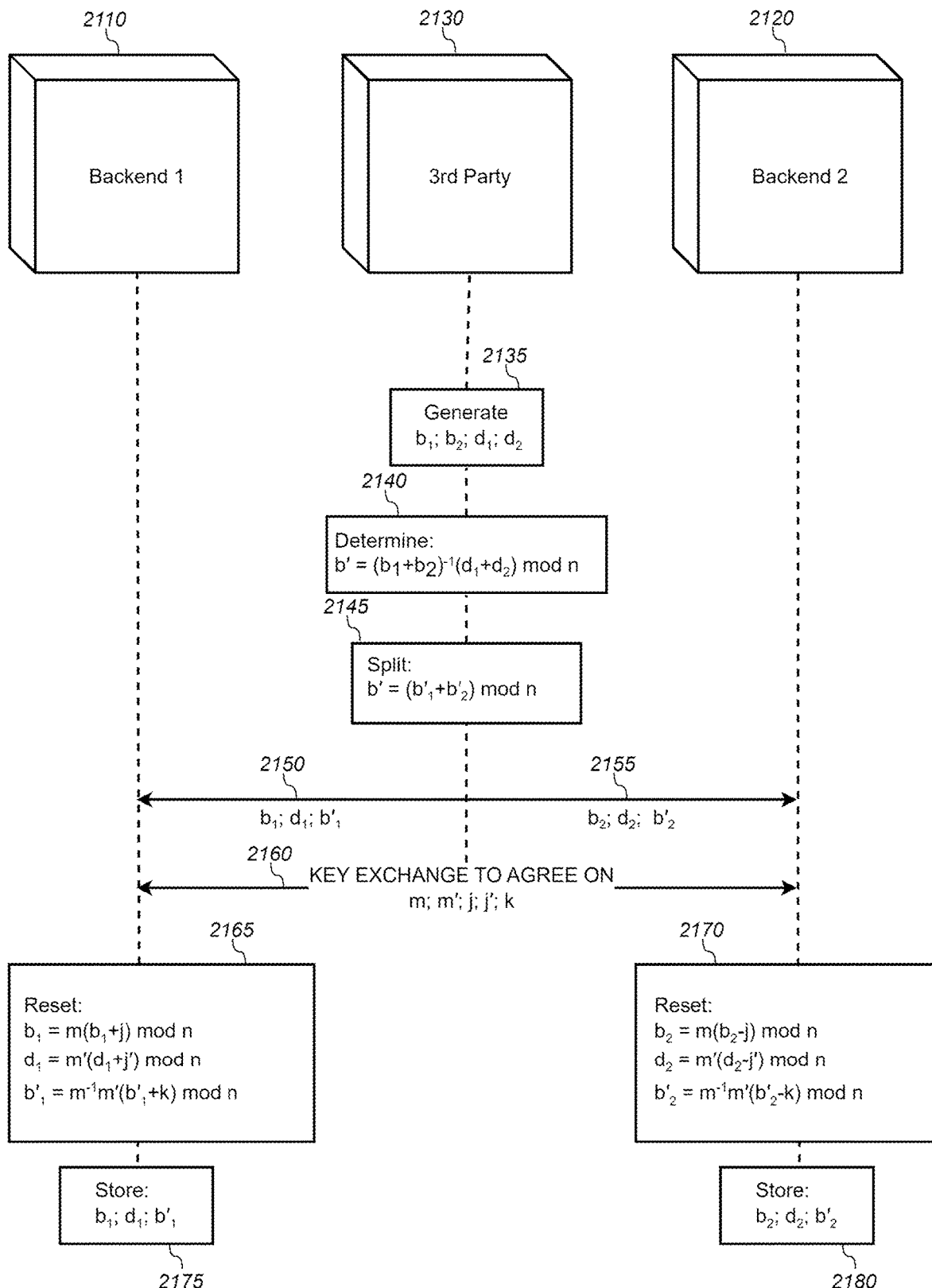
Figure 22:
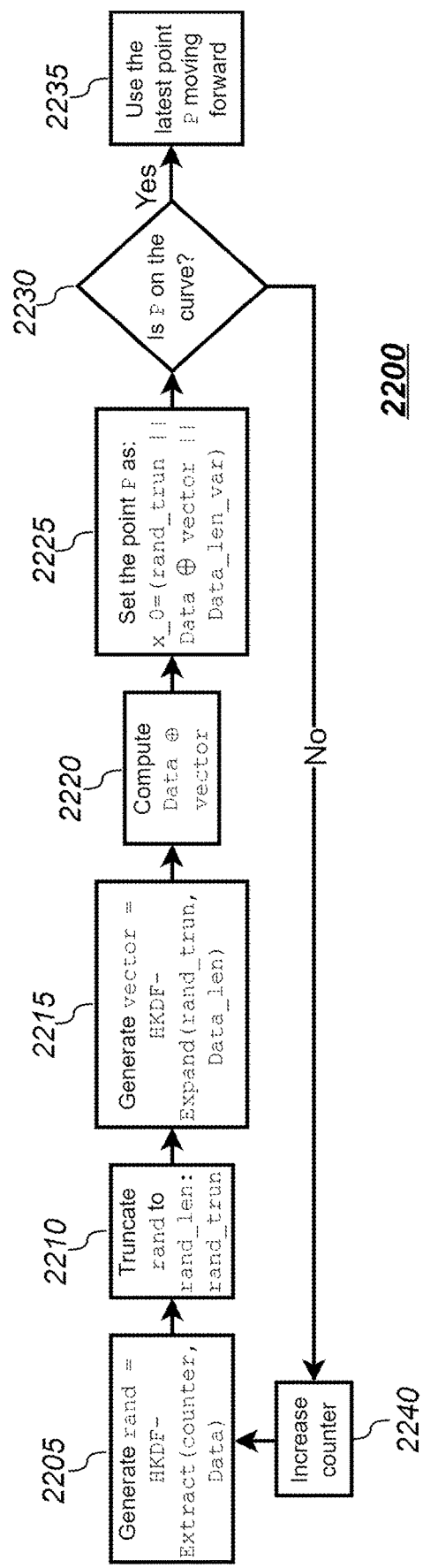

FIG. 11 comprises a flow chart with a signal flow diagram as configured in accordance with various embodiments of these teachings and that illustrates parallelizable two-round detokenization, intended to recover a representation of the Data that was tokenized as corresponding to FIG. 10 and involving a Requestor, a Backend 1 and a Backend 2. The transmissions depicted in FIG. 11 may include an overlay such as authenticated or non-authenticated encryption that is subsequently decrypted, that is not explicitly shown;

FIG. 12 comprises a flow chart with a signal flow diagram as configured in accordance with various embodiments of these teachings and that illustrates parallelizable two-round tokenization involving a Requestor, a Backend 1 and a Backend 2. A reversible token is a final output, and its derivation involves verification and unblinding on the part of the Requestor that follows unblinding on the part of Backend 1 and Backend 2. The transmissions depicted in FIG. 12 may include an overlay such as authenticated or non-authenticated encryption that is subsequently decrypted, that is not explicitly shown;

FIG. 13 comprises a flow chart with a signal flow diagram as configured in accordance with various embodiments of these teachings and that illustrates parallelizable two-round detokenization, intended to recover a representation of the Data that was tokenized as corresponding to FIG. 12 and involving a Requestor, a Backend 1 and a Backend 2. The transmissions depicted in FIG. 13 may include an overlay such as authenticated or non-authenticated encryption that is subsequently decrypted, that is not explicitly shown;

FIG. 14 comprises a flow chart with a signal flow diagram as configured in accordance with various embodiments of these teachings and that illustrates parallelizable two-round tokenization involving a Requestor, a Backend 1 and a Backend 2. Derivation of the final outputs involves addition and unblinding on the part of the Requestor, where these outputs comprise a key token usable to derive keying material and a token usable during detokenization to recover the key token. The processing of FIG. 14 is related to the direct tokenization of Data depicted in FIG. 2. The transmissions depicted in FIG. 14 may include an overlay such as authenticated or non-authenticated encryption that is subsequently decrypted, that is not explicitly shown;

FIG. 15 comprises a flow chart with a signal flow diagram as configured in accordance with various embodiments of these teachings and that illustrates parallelizable two-round detokenization, intended to recover the keying material as derived from the key token of FIG. 14 and involving a Requestor, a Backend 1 and a Backend 2. The transmissions depicted in FIG. 15 may include an overlay such as authenticated or non-authenticated encryption that is subsequently decrypted, that is not explicitly shown;

FIG. 16 comprises a flow chart with a signal flow diagram as configured in accordance with various embodiments of these teachings and that illustrates parallelizable two-round tokenization involving a Requestor, a Backend 1 and a Backend 2. Derivation of the final outputs involves verification and unblinding on the part of the Requestor, where these outputs comprise a key token usable to derive keying material and a token usable during detokenization to recover the key token. The processing of FIG. 16 is related to the direct tokenization of Data depicted in FIG. 12. The transmissions depicted in FIG. 16 may include an overlay such as authenticated or non-authenticated encryption that is subsequently decrypted, that is not explicitly shown;

FIG. 17 comprises a flow chart with a signal flow diagram as configured in accordance with various embodiments of these teachings and that illustrates parallelizable two-round detokenization, intended to recover the keying material as derived from the key token of FIG. 16 and involving a Requestor, a Backend 1 and a Backend 2. The transmissions depicted in FIG. 17 may include an overlay such as authenticated or non-authenticated encryption that is subsequently decrypted, that is not explicitly shown;

FIG. 18 comprises a flow chart with a signal flow diagram as configured in accordance with various embodiments of these teachings and that illustrates parallelizable two-round token translation involving a Requestor, a Backend 1 and a Backend 2. Derivation of the final outputs involves verification, unblinding and hashing on the part of the Requestor, where these outputs comprise a reversible token and a cryptographic integrity token. The processing of FIG. 18 is related to the tokenization depicted in FIG. 6, where the scope t of FIG. 6 is converted to the scope $t_{new}$ of FIG. 18. The transmissions depicted in FIG. 18 may include an overlay such as authenticated or non-authenticated encryption that is subsequently decrypted, that is not explicitly shown;

FIG. 19 comprises a flow chart with a signal flow diagram as configured in accordance with various embodiments of these teachings and that illustrates parallelizable two-round token translation involving a Requestor, a Backend 1 and a Backend 2. Derivation of a reversible token as a final output involves verification and unblinding on the part of the Requestor that follows unblinding on the part of Backend 1 and Backend 2. The processing of FIG. 19 is related to the tokenization depicted in FIG. 12, where the scope t of FIG. 12 is converted to the scope $t_{new}$ of FIG. 19. The transmissions depicted in FIG. 19 may include an overlay such as authenticated or non-authenticated encryption that is subsequently decrypted, that is not explicitly shown;

FIG. 20 comprises a flow chart with a signal flow diagram as configured in accordance with various embodiments of these teachings and that illustrates third-party setup of Backend 1 and Backend 2 and resetting and storage of tokenization processor secrets. The processing of FIG. 20 is compatible with the tokenization and detokenization of FIG. 2 and FIG. 3, respectively, as well as compatible with the tokenization and detokenization of FIG. 4 and FIG. 5, respectively. The transmissions depicted in FIG. 20 may include an overlay such as authenticated or non-authenticated encryption that is subsequently decrypted, that is not explicitly shown;

FIG. 21 comprises a flow chart with a signal flow diagram as configured in accordance with various embodiments of these teachings and that illustrates third-party setup of Backend 1 and Backend 2 and resetting and storage of tokenization processor secrets. The processing of FIG. 21 is compatible with the tokenization and detokenization of FIG. 14 and FIG. 15, respectively. The transmissions depicted in FIG. 21 may include an overlay such as authenticated or non-authenticated encryption that is subsequently decrypted, that is not explicitly shown;

FIG. 22 comprises a flow chart configured in accordance with various embodiments of these teachings and that illustrates generating a reversible elliptic curve point representation of Data that incorporates an optional integrity check.

Figure 23:
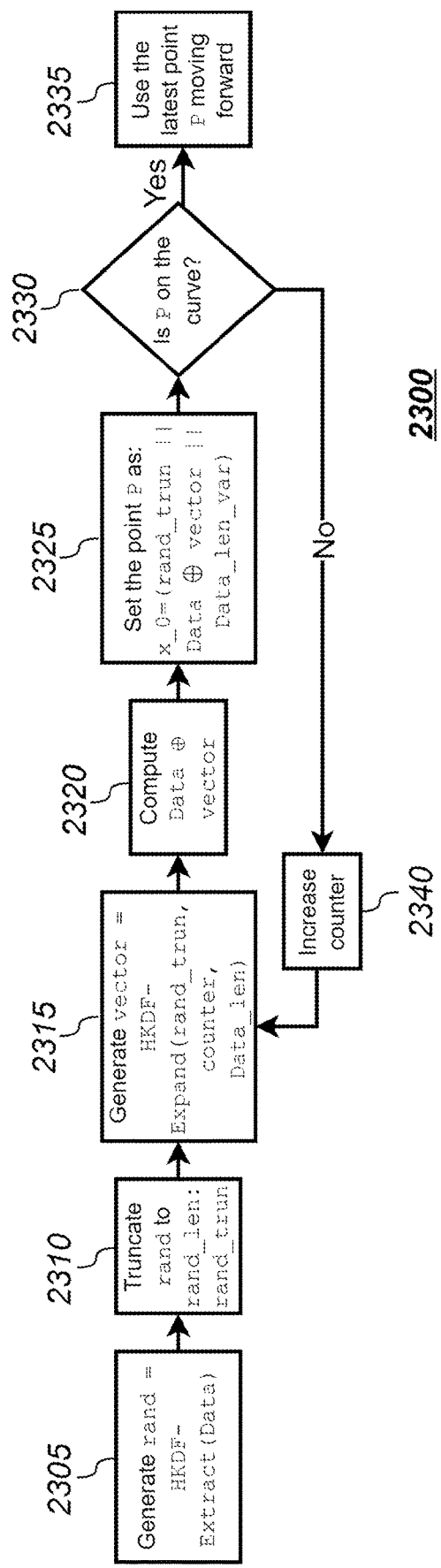

FIG. 23 comprises a flow chart configured in accordance with various embodiments of these teachings and that illustrates, as an alternative flow to that depicted in FIG. 22, generating a reversible elliptic curve point representation of Data that incorporates an optional integrity check.

Figure 24:
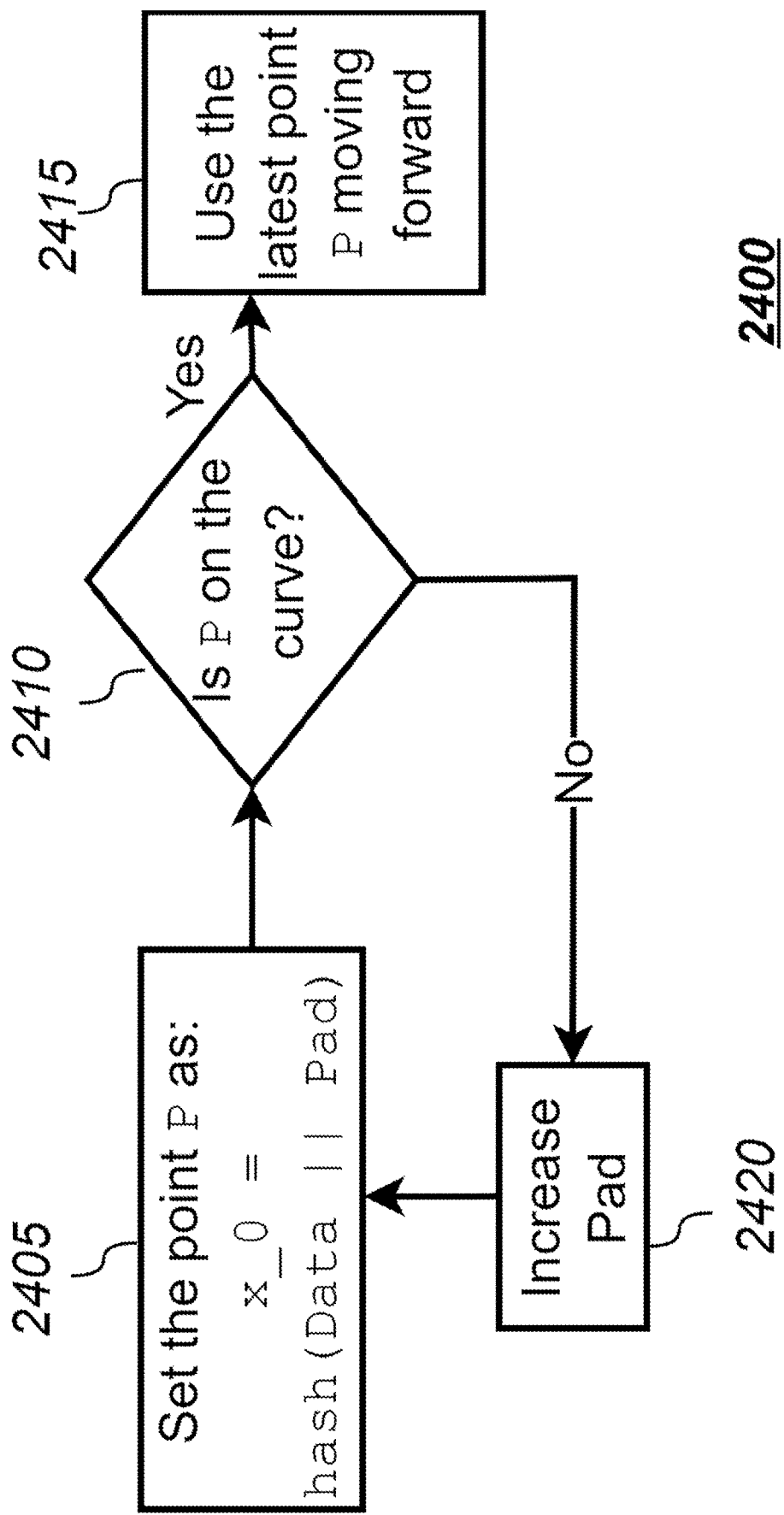

FIG. 24 comprises a flow chart configured in accordance with various embodiments of these teachings and that illustrates generating a non-reversible elliptic curve point representation of Data for use in generating a token and key token.

Figure 25:
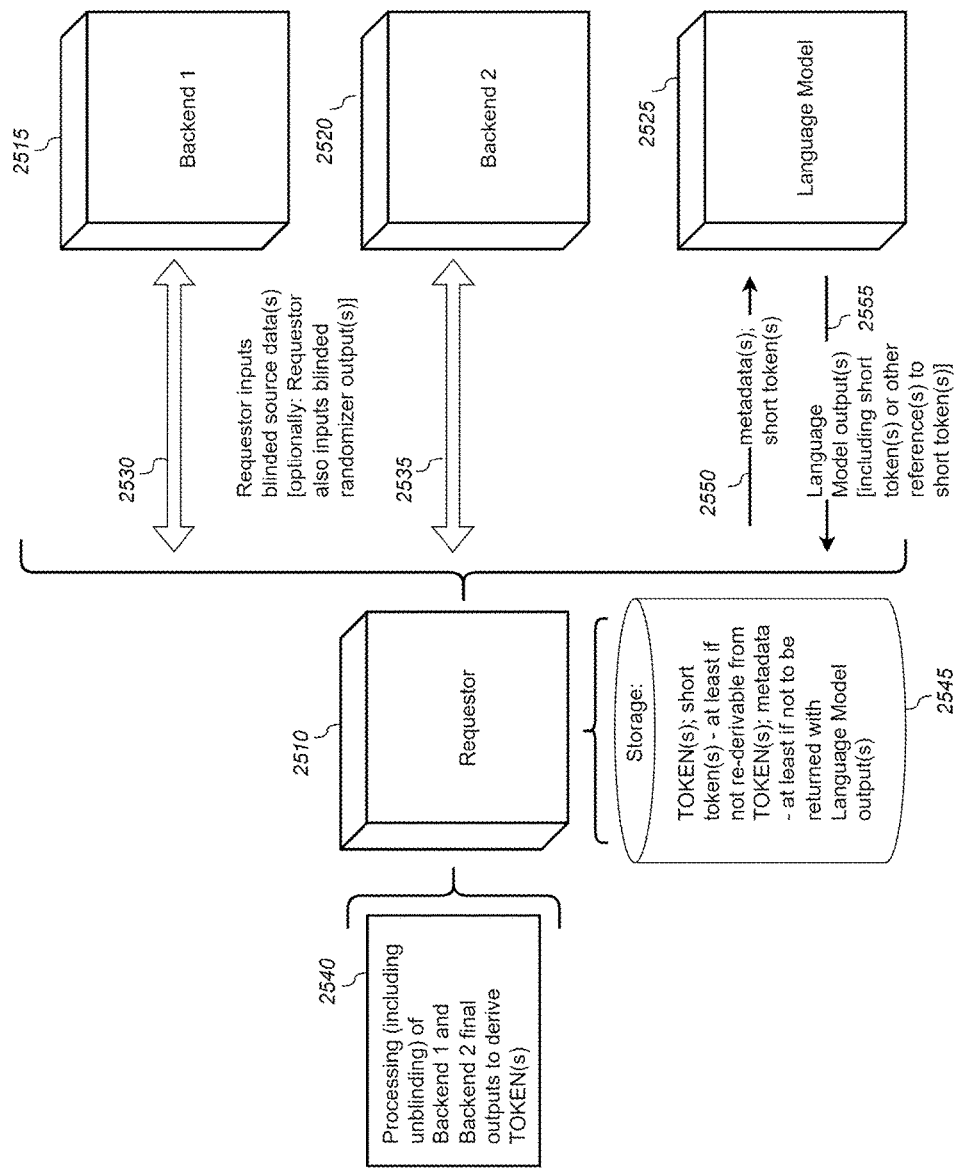
Figure 26:
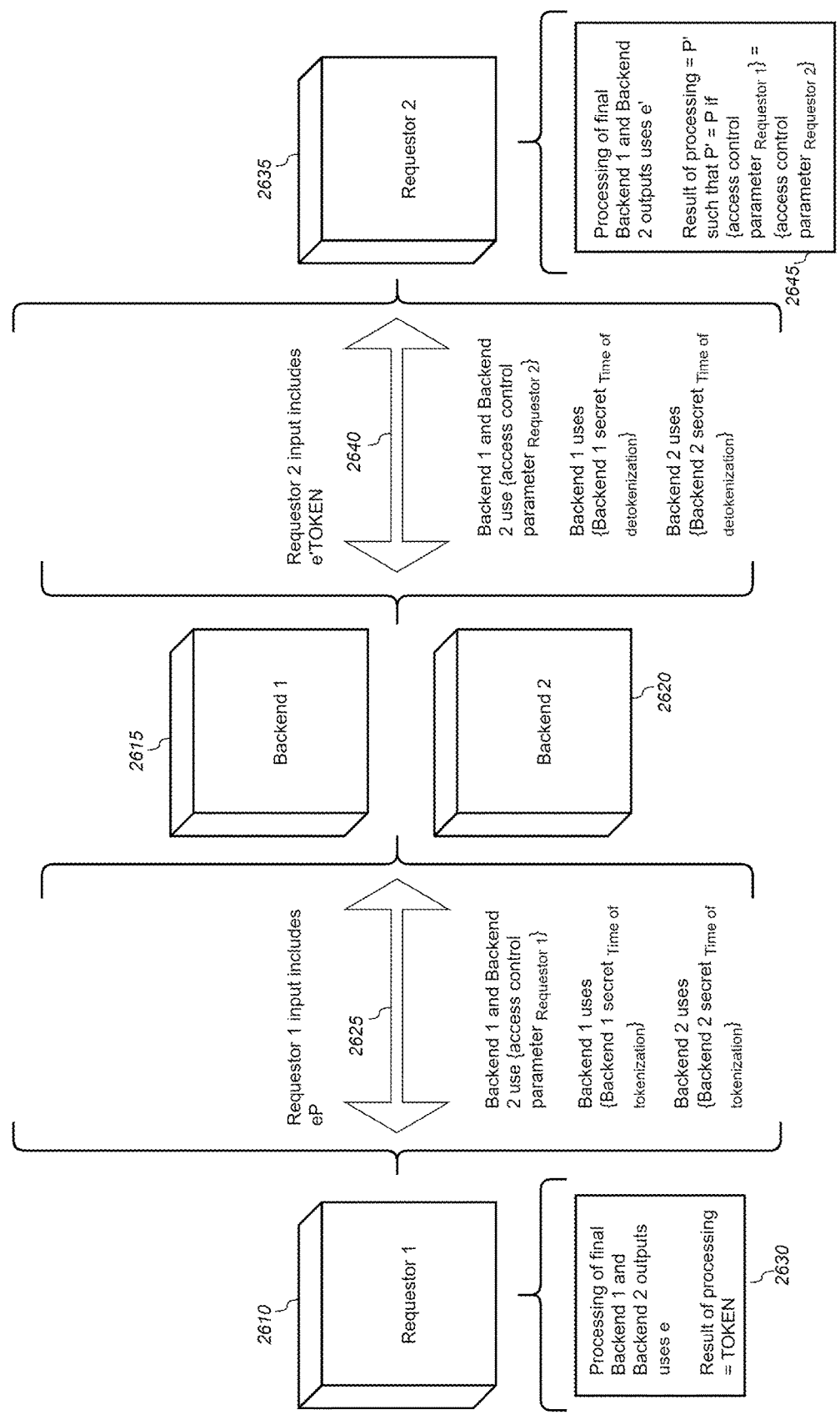
Figure 27:
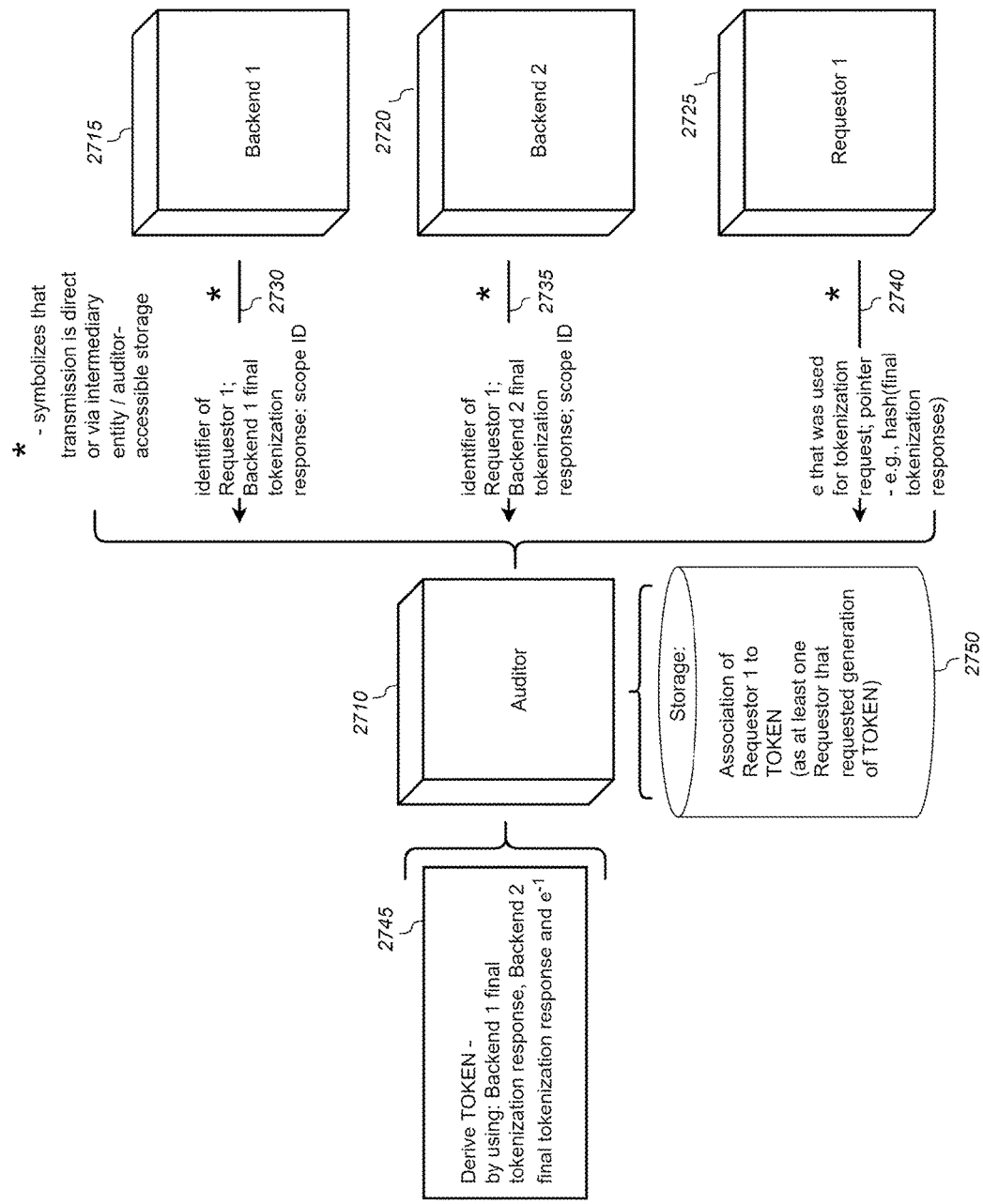

FIG. 25 comprises a flow chart with a signal flow diagram as configured in accordance with various embodiments of these teachings and that illustrates tokenization involving a Requestor, Backend 1, and Backend 2, and communication between the Requestor and a Language Model wherein that communication makes use of short tokens that correspond to the tokens that are generated as a result of the interaction between the Requestor and Backend 1 and Backend 2 and processing by the Requestor. The transmissions depicted in FIG. 25 may include an overlay such as authenticated or non-authenticated encryption that is subsequently decrypted, that is not explicitly shown;

FIG. 26 comprises a flow chart with a signal flow diagram as configured in accordance with various embodiments of these teachings and that illustrates tokenization involving Requestor 1, Backend 1, and Backend 2, as well as detokenization involving Requestor 2, Backend 1, and Backend 2. The transmissions depicted in FIG. 26 may include an overlay such as authenticated or non-authenticated encryption that is subsequently decrypted, that is not explicitly shown;

FIG. 27 comprises a flow chart with a signal flow diagram as configured in accordance with various embodiments of these teachings and that illustrates transmission of information from Backend 1, Backend 2, and Requestor 1 to an Auditor that is collectively usable by the Auditor to derive a TOKEN that Requestor 1 requested to be generated through participation of Backend 1 and Backend 2. The transmissions depicted in FIG. 27 may include an overlay such as authenticated or non-authenticated encryption that is subsequently decrypted, that is not explicitly shown.

DETAILED DESCRIPTION

Role-Based Access Control (RBAC) herein is actuated using scope that designates one or more attributes purportedly associated with a Requestor as submitted as part of a tokenization request and/or a detokenization request and/or a token translation request. Scope is used as a qualifying or disqualifying feature in responding to such requests. It is known to supplement Data to be tokenized with metadata that designates purported permissions or attributes of a tokenization Requestor, but that alone is insufficient to achieve the desired properties. A goal of the current invention is to embed scope-specific indicia (aka labels) as parameters into a TOKEN if the Requestor possesses permission to tokenize the source Data under the requested scope, and preferably to do so without need to observe the source Data. A further goal of the current invention is to take advantage of the scope-specific indicium that has been embedded into a TOKEN to render the underlying Data inaccessible without proving possession of that scope by the Requestor, and to preferably do so without need to observe the TOKEN. As a yet further goal, TOKENs should be endowed with a non-malleability property in that operating over morphed versions of TOKENs during tokenization and/or detokenization does not offer practically exploitable adversarial advantage. More specifically, attempts to tokenize a TOKEN or one or more morphed versions of such TOKEN and/or to detokenize a TOKEN or one or more morphed versions of such TOKEN by a Requestor or group of Requestors, where none of such Requestors individually possesses authorization to detokenize the original TOKEN, should render the responsive results as unsuitable to substantively recover the Data. A further property to be attained by the invention is that tokenization and detokenization operations are compatible with multiparty computation such that compromise of all but one of the Tokenization Processors that respond to a request for tokenization or detokenization or token translation is insufficient to substantively access the underlying Data. A yet further property is that the multiparty computation outputs remain invariant under resplitting of the collective secrets that are used for tokenization and/or detokenization and/or token translation computations, where such secrets are available compositely to the Tokenization Processors with one or more shares of such secrets held in each Tokenization Processor's associated memory and updated as a result of resplitting. Such resplitting results in a redistribution of tokenization processor secrets as updated tokenization processor secrets. A tokenization processor secret that is held in a specific Tokenization Processor's associated memory is said to be a tokenization processor secret of that Tokenization Processor. A yet further property is that given knowledge of $Data_A$ and a $TOKEN_A$ that is generated over $Data_A$ using known scope $t_A$, a $TOKEN_B$ that is generated over $Data_B$ using known scope $t_B$ should be cryptographically indistinguishable [https://en.wikipedia.org/wiki/Ciphertext_indistinguishability] from a $TOKEN_C$ that is generated over $Data_A$ using known scope $t_B$, by any group of adversaries such that none of them possesses tokenization or detokenization permission using scope $t_B$, where scope $t_A$ scope $t_B$ and $Data_A$ $Data_B$. In addition, the method must retain its effectiveness in situations where the choices of Data that arise in practice are feasible to exhaust over, wherein no generally applicable solution can usefully supplement the Data with padding that is likely to remain inaccessible to adversaries. (If the values of such padding are shared across all entities that might request tokenization derived from the same Data, then the likelihood of these values remaining secret decreases significantly. If, alternatively, each Requestor supplements the Data with individually generated random padding, then TOKENs based on the same value of Data will fail to match or to be otherwise usefully comparable.)

Each processor is denoted herein as a Backend. The invention is presented primarily as involving two Backends, namely Backend 1 and Backend 2. However, the method is extensible to three or more Backends. The method is operable using only a single Backend, although at the expense of degraded security.

Role-Based Access Control for non-reversible tokens: This special case can be addressed using an extension of prior-art tokenization techniques that make use of a Translator/Coordinator (such as described in U.S. Pat. No. 11,374, 910) in addition to Backends. Suppose there is a final tokenization operation comprised of HMAC using HMAC (Coordinator Key, scope label) as the scope-dependent HMAC key. Then one can use $(b_1+b_2)P$ as the HMAC preimage with the same values of $b_1$ and $b_2$ for all scopes without sacrificing scope isolation of the resultant tokens, where $b_1$ is a secret accessible by Backend 1, $b_2$ is a secret accessible by Backend 2, and P represents the Data to be tokenized. This is readily extensible to three or more Backends. P can be ephemerally blinded by a Requestor such that Backend 1 and Backend 2 access eP, and e is removed from $(b_1 eP+b_2 eP)$, by either the Requestor or by the Coordinator, using knowledge of the ephemeral value e. Rather than a single Coordinator applying HMAC, a threshold signature scheme can be applied. A threshold signature scheme can preferably invoke proactive redistribution/refresh of shares for increased resilience against compromise (e.g., https://dl.acm.org/doi/10.1145/3579375.3579389).

One high-level goal achieved by the current invention is to generate a token, via tokenization processing, that is representative of "Data" (which may comprise potentially sensitive information such as personally identifiable information), wherein such token is at least partially reversible, via detokenization processing, to (directly or indirectly) recover Data. Preferably, neither the token nor the tokenization/detokenization processing leaks Data in the absence of collusion between the (preferably two or more) Tokenization Processors involved in the token generation. The resultant tokens may be "deterministic" in that they are invariant for a given value of Data across participants as Requestors that request tokenization, or may be "non-deterministic" in that the resultant tokens differ across participants. The Data values may be "directly tokenized" in that the token is decrypted to directly recover the Data. Alternatively, Data may be "indirectly tokenized" in that the token is decrypted/inverted to recover a symmetric encryption key that is used, in turn, to decrypt ciphertext, as resulting in plaintext. The decryption of the ciphertext is not necessarily limited to recovery only of Data that was used in generation of the token. The plaintext that is thus recovered may include other information in addition to (or instead of) all or part of Data used to generate the token. The value of Data used to generate the token is not necessarily limited to or inclusive of sensitive data such as personally identifiable information. The recovery process may include potentially optional verification of the integrity of at least part of the recovered Data and/or other information.

A third-party server (also denoted as a $3^{rd}$ Party or third party within the sample embodiments) may be used to secure the setup procedure that enables provisioning of the Tokenization Processors, which may also be denoted as Backends. By one approach, such third-party server is implemented as a stand-alone or cloud-hosted enclave such as SGX-based or Amazon Nitro-based, respectively, to imbue trust into the system. Such an enclave may be hosted by a Tokenization Processor or may be hosted independently. Remote attestation (also known as cryptographic attestation) may be utilized to provide evidence of compliant protocol execution on the part of an enclave. Other methods such as witnessed use of a stand-alone device running vetted software wherein the device is locked away or destroyed or otherwise configured to delete memory of critical parameters may be invoked. As an alternative to making use of a third-party server that is considered trusted (to at least some preferably well-defined extent), an untrusted server may be used. More specifically, if the use of a third-party server does not include provision to assure non-availability of unauthorized access to critical parameters associated with its protocol execution, then preferably secure measures may be taken by one or more Tokenization Processors to assure the non-usefulness of such critical parameters relevant to generation of tokens and/or symmetric keys, and/or to recovery processing.

As previously noted, preferably, composite secrets held collectively across Tokenization Processors, can be resplit to effect updating without adversely affecting the usability of tokens that were generated using previous versions of each Tokenization Processor's individually-held tokenization processor secrets.

Third-party server operation can be limited to setup, such that no third-party server is necessarily involved in other operations, such as pertaining to tokenization, detokenization/recovery, resplit of composite secrets, or deletions or additions of Tokenization Processors.

Refresh of tokenization processor secrets, resulting via resplitting of composite secrets, can be accomplished through direct Tokenization Processor-to-Tokenization Processor communications or end-to-end secured via communications with an arbitrary/untrusted service.

Authentication and/or bidirectional freshness of communications between two parties can be assured via standard means, such as (a) one-time-use nonces incorporated into signed responses, or (b) dependency on ephemeral values such as incorporated into one-pass (static-ephemeral) Diffie-Hellman key establishment or ephemeral-ephemeral Diffie-Hellman key establishment, or (c) a combination of (a) and (b) such as one party signing a Diffie-Hellman ephemeral public key together with a nonce provided by the counterparty and interpreting the response from the counterparty as based on one or more values derived using a secret dependent on the Diffie-Hellman shared secret computed using the ephemeral private key and the counterparty Diffie-Hellman static public key, or each party signing an ephemeral public key for which they possess the corresponding ephemeral private key and basing ensuing communications on the Diffie-Hellman shared secret computed based at least in part on using knowledge of an ephemeral private key and a counterparty ephemeral public key.

Tokenization Processors can act in parallel relative to one another during tokenization and recovery operations. This aspect can be instantiated as based on U.S. Pat. No. 11,374,910, issued Jun. 28, 2022 and on a continuation thereof as U.S. Pat. No. 11,637,817, issued Apr. 25, 2023. Further, Tokenization Processors/Backends can be partitioned as described therein.

Both direct Data tokenization (i.e., the directly tokenized Data case) and tokenization of symmetric keys used to encrypt (and optionally authenticate) Data values (i.e., the indirectly tokenized Data case) are supported, where the choice of which to use may potentially be dependent on factors pertaining to characteristics such as bit length of Data values and/or constraints on size of tokens and/or accompanying ciphertext, if any.

In some embodiments, tokenization processing and detokenization processing are achievable using a single round for tokenization and a single round for detokenization, where detokenization results in direct Data recovery, or symmetric key recovery for indirect Data recovery such as via conversion of a token, say "TOKEN," to another token such as a "KEY_TOKEN."

Individual Tokenization Processors as well as combinations of Tokenization Processors that do not include all Tokenization Processors involved in the tokenization process are preferably blinded from access to Data even if aware of resultant tokens.

Both deterministic and non-deterministic tokenization sub-cases of the direct Data tokenization and indirect (symmetric key) tokenization cases are enabled, where deterministic refers to token values that are invariant across participants, also known as Requestors, requesting tokenization while non-deterministic allows for token values to differ from one participant/Requestor to another.

Non-deterministic tokenization can be implemented to assure uniqueness of token values if a given participant implements in that way, i.e., for a given tokenization Requestor/participant and Data value the resultant token is uniquely-valued. This still allows complete freedom in how random/pseudorandom inputs are selected the first time for each Data value.

Independently of application and strength of ephemeral blinding factors applied to representations of Data, Data bias within representations of Data is preferably distributed across input bits utilizing Data in the deterministic sub-case or concealed utilizing pseudo-randomness/randomness in the non-deterministic sub-case. The same seeded deterministic random bit generator, if any, may potentially be used as contributing towards generation of ephemeral blinding factors as well as towards generation of pseudo-randomness used to conceal Data inputs (potentially together with an additional entropy source). Although the ephemeral blinding factor is removed prior to finalization of the token to enable reversibility without retention/transference of such ephemeral blinding factor (as well as to ensure independence of tokens from ephemeral blinding factors to enable the deterministic sub-case), the effect of flattening/concealment of the Data persists within the finalized token.

Access to ciphertext, and authentication tag (if any), is insufficient to enable feasible recovery of plaintext via exhaustive search of plaintext space, because the invention is implementable for some embodiments via a) double-round tokenization and single-round recovery: symmetric key is generated from an intermediate token value (as a "KEY_TOKEN") a function of which intermediate token value is subjected to further tokenization, the result of which (as a "TOKEN") is reversible to enable the Tokenization Processors to provide for recovery of the symmetric key, or b) single-round tokenization and single-round recovery: symmetric key is generated from an intermediate token value (as a "KEY_TOKEN") that is accompanied by a complementary token value (as a "TOKEN") wherein the complementary token value can be used to enable the Tokenization Processors to provide for recovery of the symmetric key.

Note that the remarks above regarding bias apply to both "TOKEN" and "KEY_TOKEN" values.

In the deterministic sub-case of Data-based tokenization of a symmetric key, the Data value(s) utilized in formulation of the symmetric key need not be identical to Data value(s) that are encrypted (and optionally authenticated) utilizing the resultant symmetric key.

Detokenization for Data recovery can be requested by authorized parties that may be independent of participants that requested tokenization.

Preferably, requests to Tokenization Processors are verifiable as originating with authorized Requestors, where Requestors of tokenization may be distinguishable from Requestors of detokenization.

The method is extensible to a plurality of Tokenization Processors greater than two, where additional Tokenization Processors may optionally be added after initial setup and deployment. Communication between Tokenization Processors can be secured using such techniques as key agreement utilizing standard pairwise Diffie-Hellman/elliptic curve Diffie-Hellman, or groupwise/group Diffie-Hellman.

Values that are agreed upon by Tokenization Processors can, for example, be based on individual contributed values and/or can be derived (e.g., via key derivation) based on Diffie-Hellman shared secrets.

Preferably, each Backend is programmed to delete values that are only needed transiently, such as additive resplitting factors and/or multiplicative blinding factors such as those applied following communication with a non-fully-trusted $3^{rd}$ Party. Any ephemeral private keys, such as elliptic curve Diffie-Hellman keys, applied during key agreement operations, such as to generate shared secrets, should be deleted as well.

Preferably, each Backend is equipped with a non-replicable entropy source, rather than just relying on a purely deterministic random number generator.

Figure 1:
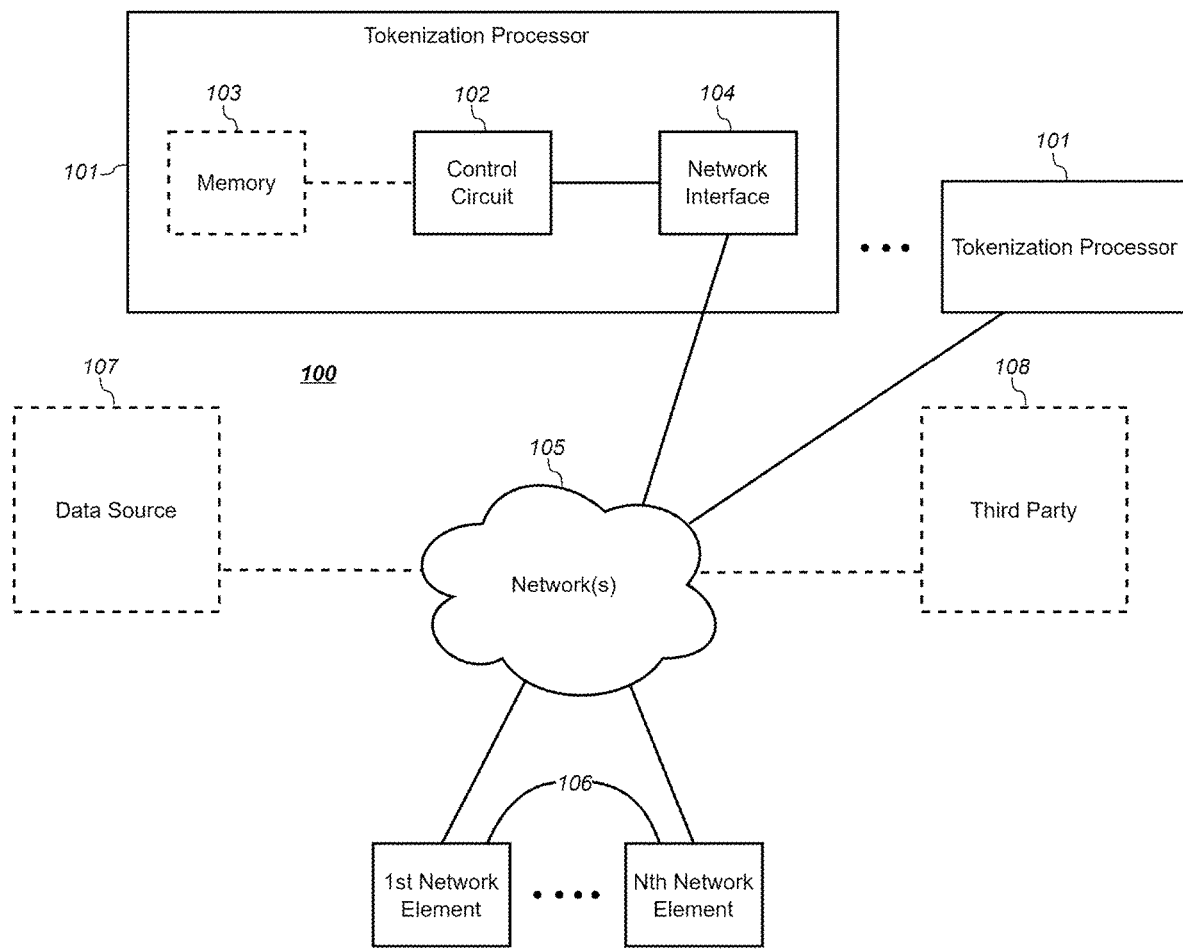
FIG. 1 comprises a flow diagram as configured in accordance with various embodiments of these teachings and that illustrates the architecture of Tokenization Processors and the topology of the communications. In this particular example, the enabling apparatus includes Tokenization Processors configured to effect tokenization, detokenization or token translation via a corresponding network.

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes one or more Tokenization Processors 101. Such Tokenization Processors are configured to effect tokenization via one or more corresponding networks 105. As will be described in more detail herein, such Tokenization Processors may operate on source data inputs that are ephemerally blinded.

In this illustrative example each of the Tokenization Processors 101 includes a control circuit 102, wherein a plurality of Tokenization Processors 101 collectively includes a plurality of control circuits 102. Being a "circuit," the control circuit 102 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out one or more of the steps, actions, and/or functions described herein.

By one optional approach the control circuit 102 operably couples to a memory 103. This memory 103 may be integral to the control circuit 102 or can be physically discrete (in whole or in part) from the control circuit 102 as desired. This memory 103 can also be local with respect to the control circuit 102 (where, for example, both share a common circuit board, chassis, power supply, and/or housing) or can be partially or wholly remote with respect to the control circuit 102 (where, for example, the memory 103 is physically located in another facility, metropolitan area, or even country as compared to the control circuit 102).

In addition to storing other information as described herein, this memory 103 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this example the control circuit 102 also operably couples to a network interface 104, wherein the plurality of control circuits 102 considered collectively couples to a plurality of network interfaces 104. So configured the control circuit 102 can communicate with other elements (both within the apparatus and external thereto) via the network interface 104. More particularly, the network interface 104 facilitates compatible communications via one or more networks 105. Numerous examples are known in the art. A non-exhaustive listing would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the control circuit 102 to another network element, to a local area network, or to any of a variety of wide area networks or extranets (such as, but not limited to, the Internet).

Relevant to the following description, so configured, each of the Tokenization Processors can compatibly communicate via the aforementioned protocol with any of a plurality of requesting network elements 106 (illustrated in FIG. 1 as a first network element through an Nth network element). As will be described in more detail below, such requesting network elements 106 act as Requestors.

Other apparatuses that may play a part in effecting the data-based activity in a given application setting include such elements as an initial data source 107 that does not act as a Requestor and/or a third party 108 that is involved in setup of one or more of the Tokenization Processors 101.

Generalized Formulation (entailing 1 or 2 or 3 or more rounds of communication between Requestor and Backends to effect tokenization, and/or detokenization for recovery, and/or token translation): Note that differently identified parameters are not necessarily distinct from one another. Unless otherwise specifically noted, certain parameters may take on constant values across resplit intervals, although doing so may adversely affect security. Unless otherwise specifically noted, certain functions may take on constant values. Certain embodiments may incorporate additional functions and/or parameters not specifically depicted.

P represents the Data to be tokenized, and TOKEN represents the result of a successful tokenization request. t represents a scope (also known as a context) as a label that is associated with the request for tokenization or detokenization. Standard means, such as SAML assertions, can be used by each Backend to determine the validity of the Requestor's submitted scope.

In the specific embodiments presented, the operation between adjacent terms $f_i()$ and $f_j()$ is multiplication unless otherwise noted. If implemented using an elliptic curve, then P, $G_1$ and $G_2$ represent elliptic curve points and, unless otherwise noted, arithmetic (e.g., addition and/or multiplication and/or inversion of scalars) may be considered modulo n, the order of the elliptic curve point.

TOKEN=$f_3(\beta_{1,3}(t)\ \beta_{2,3}(t)\ \beta_{1,4}\beta_{2,4}\ G_1)\ f_4(\beta_{1,5}(t)\ \beta_{2,5}(t)\ \beta_{1,6}\ \beta_{2,6}\ G_2)\ f_1(\beta_{1,1}(t),\ \beta_{2,1}(t))\ f_2(\beta_{1,2},\ \beta_{2,2})P$.

AUX_TOKEN=$h(g_3(\delta_{1,3}(t)\ \delta_{2,3}(t)\ \delta_{1,4}\ \delta_{2,4}\ G_1)\ g_4(\delta_{1,5}(t)\ \delta_{2,5}(t)\ \delta_{1,6}\delta_{2,6}\ G_2)\ g_1(\delta_{1,1}(t),\ \delta_{2,1}(t))\ g_2(\delta_{1,2},\ \delta_{2,2})\ \text{TOKEN})$.

$G_1$ and/or $G_2$, if any, can be fixed, or may be dependent on an AUX_TOKEN if any is made available to Backends during detokenization (at the expense of 3 or more rounds during tokenization processing).

AUX_TOKEN may, e.g., comprise a cryptographic integrity token, denoted as checkBits, that is used as a condition of information release by Backends during detokenization, or may comprise a key token, denoted as KEY_TOKEN, that is used to derive keying material intended to encrypt and/or recover Data. In the latter case, such keying material may additionally or alternatively enable authentication of encrypted data and/or of additional data that is not encrypted. If there is no dependency on an AUX_TOKEN to enable derivation of keying material, then P is reversible to recover Data.

During tokenization, a Requestor may be supplied with both a TOKEN and KEY_TOKEN. In that case, the TOKEN may be retrieved from storage and submitted (in preferably blinded form) for detokenization that results in recovery of the corresponding KEY_TOKEN. Example embodiments of such TOKEN-KEY_TOKEN pairings are presented later within this specification.

There are at least three reasons to use KEY_TOKENs, namely: (a) accommodate Data of length larger than that which fits within the bounds of standard elliptic curve points; (b) restrict the use of tokenization to keying material generation and recovery for compatibility with standard data encryption schemes, e.g., NIST format-preserving encryption, wherein ciphertext format that is consistent with plaintext format is said to be format-preserving [https://nvlpubs.nist.gov/nistpubs/SpecialPublications/NIST.SP.800-38Gr1-draft.pdf]; and (c) hide release of information during detokenization from potential adversarial exploitation, wherein such information would otherwise be available to the Requestor if detokenization intended to recover P from TOKEN or blinded TOKEN were used instead. As an alternative to separating a tokenization-based key management scheme from standardized encryption of Data using one or more keys derivable via such key management scheme, the tokenization that is implementable from the current invention can be used directly to encrypt Data so as to meet certain format-preserving encryption requirements of the resultant ciphertext.

Example procedures to generate P from Data are presented later within this specification. There are two classes of such procedures, namely, designed to either: generate P from Data such that Data is recoverable via detokenization; or generate P from Data such that the corresponding TOKEN is usable during detokenization to recover KEY_TOKEN. As an example of the former that also meets certain format-preserving encryption requirements, consider tokenization of an elliptic curve point P that results in a TOKEN as an elliptic curve point with x-coordinate denoted as $x_P$. Suppose that the Data underlying P is chosen, for example, as representable as a 16-digit integer. Then write $x_p$ as $x_p$ mod $10^{16}$+k $10^{16}$, where k is a uniquely determined nonnegative integer. Then $x_p$ mod $10^{16}$, as extracted from $x_p$, can be considered as ciphertext that satisfies the format-preserving encryption requirement of mapping a 16-digit integer comprising Data as plaintext to a 16-digit integer as ciphertext, where Data is recoverable via authorized detokenization from knowledge of the ciphertext and k. Suppose that an intermediary stores an encryption of the ciphertext under a key, KK, where the resultant encryption value is paired in storage with the corresponding value of k. Then a Requestor, armed with knowledge of KK, can supply the intermediary with the pair [$\text{Encrypt}_{KK}$(ciphertext), k] that corresponds to the TOKEN that resulted from tokenization of P as derived from Data. If there is a collision of the value of $\text{Encrypt}_{KK}$ (ciphertext) against a previously stored pair [$\text{Encrypt}_{KK}$ (ciphertext), k] with a different value of k, then the Pad—that along with Data comprises at least part of the value of P that is tokenized—is deterministically incremented and the resultant new value of P is submitted for tokenization. Under such deterministically incremented Pad procedure, the space of $\text{Encrypt}_{KK}$(ciphertext) will not be prematurely exhausted so as to cause failure to process retries.

There are three different components of Requestor processing of Backend outputs, dependent on specifics of TOKEN formulation (possibly in combination):

(1) Sum operation by Requestor of distinct second-round Backend outputs—Embodiments 1 and 2
(2) Checking for equality of second-round Backend outputs (where equality holds if both Backends act conformantly)—Embodiments 3 and 4
(3) Multiply operation by Requestor of distinct second-round Backend outputs—Embodiments 5 and 6

Embodiment 1

$f_1$=addition modulo n; $f_2$, $f_3$ and $f_4$ always return 1; $\beta_{1,1}(t)$ is a distinct value of $b_1$ for each value of t, and $\beta_{2,1}(t)$ is a distinct value of $b_2$ for each value of t. The use of addition rather than multiplication for $f_1$ enables single-round tokenization and single-round detokenization for recovery. Embodiment 1 is particularly practical in the case of relatively few distinct scopes.

Embodiment 1 TOKEN: TOKEN=$(b_1+b_2)$P.

Brackets (as [ ]) below indicate inputs being acted upon. Note that such inputs are presented as their intended expressions, although these may differ under a cheating scenario. e indicates an ephemeral value that is generated by the Requestor and preferably withheld from both Backends.

Figure 2:
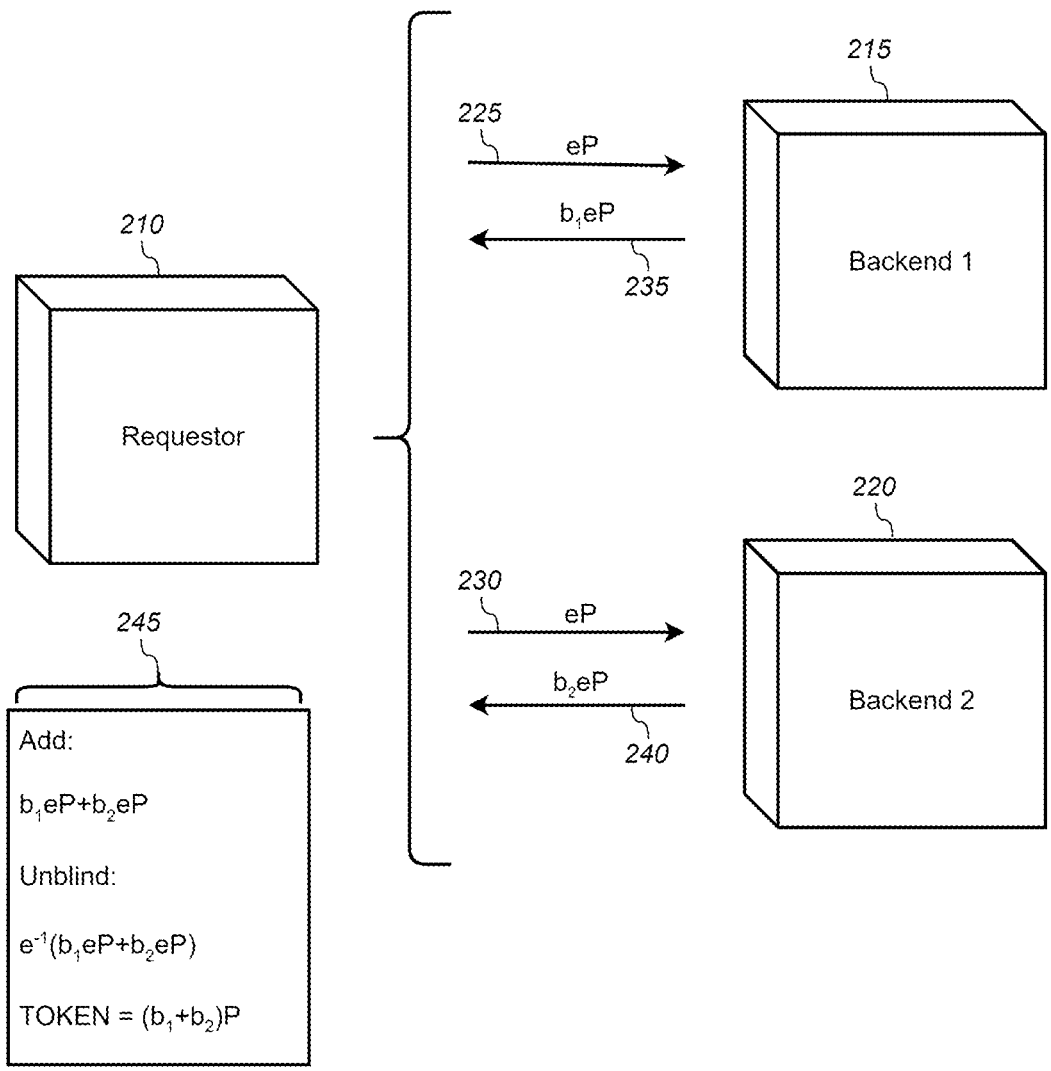
FIG. 2 comprises a flow chart with a signal flow diagram as configured in accordance with various embodiments of these teachings and that illustrates parallelizable single-round tokenization involving a Requestor, a Backend 1 and a Backend 2. A reversible token is a final output, and its derivation involves addition and unblinding on the part of the Requestor. The transmissions depicted in FIG. 2 may include an overlay such as authenticated or non-authenticated encryption that is subsequently decrypted, that is not explicitly shown.

Relevant to FIG. 2, role-based access control can be enabled via cryptographic isolation of scopes from one another as based on assignment of distinct scope-specific tokenization processor secrets used for generation of reversible tokens, wherein each such scope-specific tokenization processor secret is updateable without affecting values of the reversible tokens that are generated jointly by at least two distinct tokenization processors. Specifically, in FIG. 2, $b_1$ and $b_2$, as used for tokenization by Backend 1 and Backend 2, respectively, can be distinct for each scope. Moreover, a Backend 1 and Backend 2 that possess values of $b_1$ and $b_2$, respectively, that correspond to certain scopes may be distinct from a Backend 1 and a Backend 2 that possess values of $b_1$ and $b_2$, respectively, that correspond to certain other scopes.

Referring now to FIG. 2, stepping through tokenization processing, first the Requestor 210 transmits an ephemerally blinded representation of Data, i.e., eP, to Backend 1 215 at 225 and transmits eP to Backend 2 220 at 230. Backend 1 215 responds at 235 with $b_1$ [eP], and Backend 2 220 responds at 240 with $b_2$ [eP]. At 245, the Requestor 210 performs an addition operation and an unblinding operation to derive TOKEN=$e^{-1}$ ([$b_1$ eP]+[$b_2$ eP]).

Figure 3:
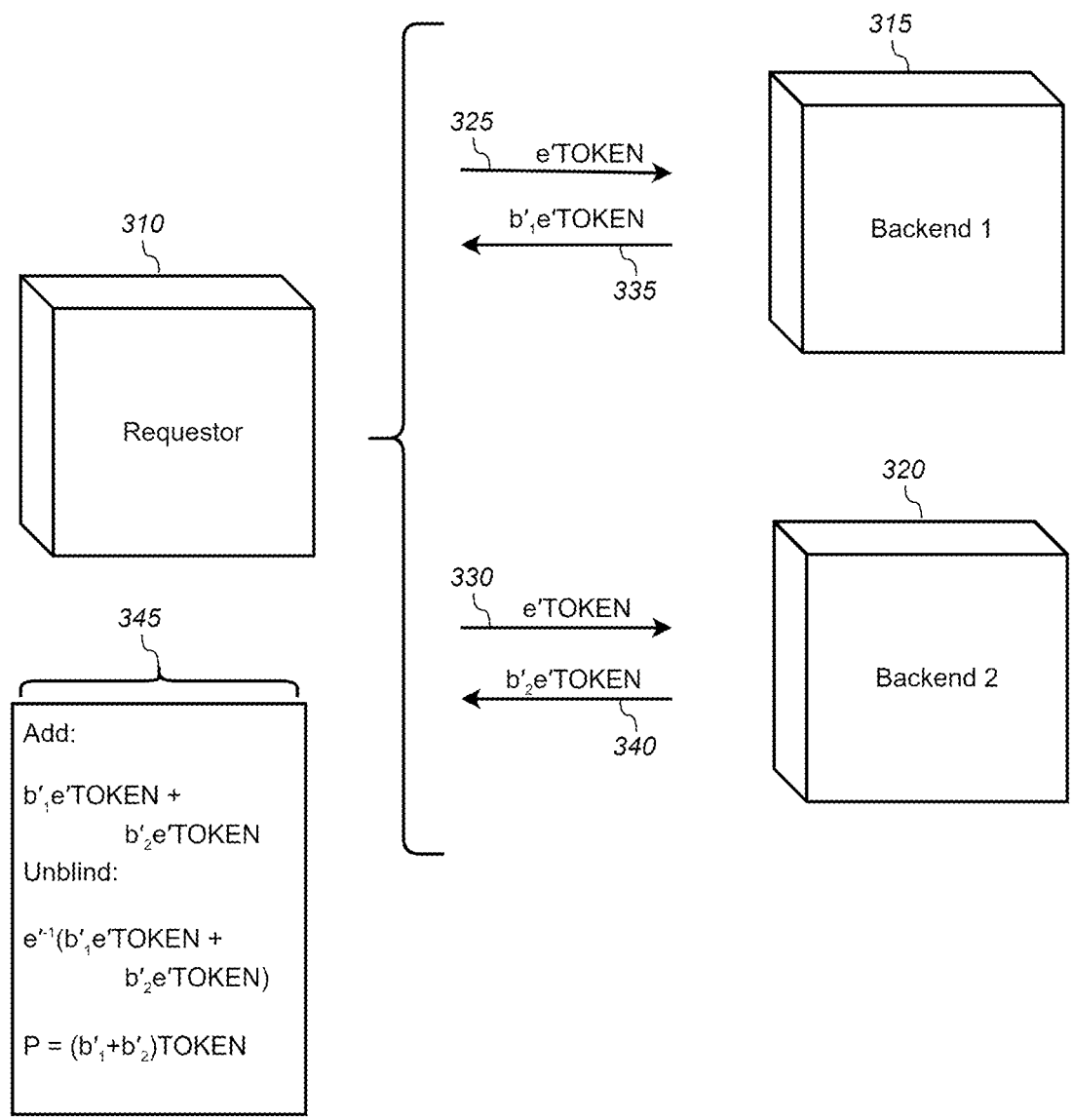
FIG. 3 comprises a flow chart with a signal flow diagram as configured in accordance with various embodiments of these teachings and that illustrates parallelizable single-round detokenization, intended to recover a representation of the Data that was tokenized as corresponding to FIG. 2 and involving a Requestor, a Backend 1 and a Backend 2. The transmissions depicted in FIG. 3 may include an overlay such as authenticated or non-authenticated encryption that is subsequently decrypted, that is not explicitly shown.

Relevant to FIG. 3, $b'_1$ and $b'_2$, as used for detokenization by Backend 1 and Backend 2, respectively, can be distinct for each scope. Scope-specific $b'_1$ and $b'_2$ can be updated without adversely affecting the capability for detokenization of tokens that were generated using previous versions of $b_1$ and $b_2$ that correspond to the same scope as do $b'_1$ and $b'_2$. Moreover, a Backend 1 and Backend 2 that possess values of $b'_1$ and $b'_2$, respectively, that correspond to certain scopes may be distinct from a Backend 1 and a Backend 2 that possess values of $b'_1$ and $b'_2$, respectively, that correspond to certain other scopes.

Referring now to FIG. 3, stepping through detokenization processing, first the Requestor 310 transmits an ephemerally blinded representation of a token, i.e., e'TOKEN, to Backend 1 315 at 325 and transmits e'TOKEN to Backend 2 320 at 330. Backend 1 315 responds at 335 with $b'_1$ [e'TOKEN], and Backend 2 320 responds at 340 with $b'_2$ [e'TOKEN], where $(b'_1+b'_2)(b_1+b_2)=1 \bmod n$. At 345, the Requestor 210 performs an addition operation and an unblinding operation to recover P=$e'^{-1}$ ([$b'_1$ e'TOKEN]+[$b'_2$ e'TOKEN]).

The use of a third party to enable setup of parameters such as $b'_1$ and $b'_2$ is described subsequently within this specification. Such third party can be blinded from accessing useful information about the resultant parameter values. A similar setup procedure enables derivation of parameters the use of which enables re-derivation of KEY_TOKEN from TOKEN or blinded TOKEN where TOKEN incorporates an additive component such as $(b_1+b_2)$ as a scalar multiple of P. In that case, $b'_1$ and $b'_2$ can be defined as satisfying: $(b'_1+b'_2)(b_1+b_2)=(d_1+d_2) \bmod n$.

Embodiments 2-6 require a minimum of two-round tokenization and a minimum of two-round recovery, and are suitable for arbitrarily many scopes in that Backend-retained and -managed parameters are not scope-specific.

Embodiment 2

$f_1$=multiplication modulo n; $f_2$=addition modulo n; constant functions $f_3$ and $f_4$ always return 1; $\beta_{1,1}(t)=b_{1,1}{}^t$ and $\beta_{2,1}(t)=b_{2,1}{}^t$; $\beta_{1,2}=b_{1,2}$ and $\beta_{2,2}=b_{2,2}$.

h=truncated hash; $g_1$=multiplication modulo n; $g_2$=addition modulo n; constant functions $g_3$ and $g_4$ always return 1; $\delta_{1,1}(t)=d_{1,1}{}^t$ and $\delta_{2,1}(t)=d_{2,1}{}^t$; $\delta_{1,2}=d_{1,2}$ and $\delta_{2,2}=d_{2,2}$. AUX-TOKEN here is used as checkBits. Consider the case that $d_{1,2}=c\ b_{1,2} \bmod n$ and $d_{2,2}=c\ b_{2,2} \bmod n$ for a value of c available to both Backend 1 and Backend 2. truncHash denotes a truncated hash function, where length of truncated outputs may be set, for example, as uniform or as scope-specific.

Embodiment 2 TOKEN and checkBits: TOKEN=$(b_{1,1} b_{2,1})^t(b_{1,2}+b_{2,2})$P; checkBits=AUX_TOKEN=truncHash $((d_{1,1} d_{2,1})^t c(b_{1,2}+b_{2,2})$P).

FIGS. 4-13 make use of subscripted "output" notation instead of the bracket ([ ]) notation used in their corresponding detailed description text. FIGS. 16-19 also make use of such "output" notation.

Relevant to FIG. 4, FIG. 6, FIG. 8, FIG. 10, FIG. 18, and FIG. 19, by one approach, one or more tokenization processors embed role-based access control scope parameters, for example denoted herein as t or $t_{new}$, into reversible tokens that are generated during tokenization or token translation. Further, the values of the thereby generated reversible tokens are not affected by changes in the tokenization processor secrets held individually by tokenization processors wherein the changes are effected by resplitting of collectively held tokenization processor secrets.

Figure 4:
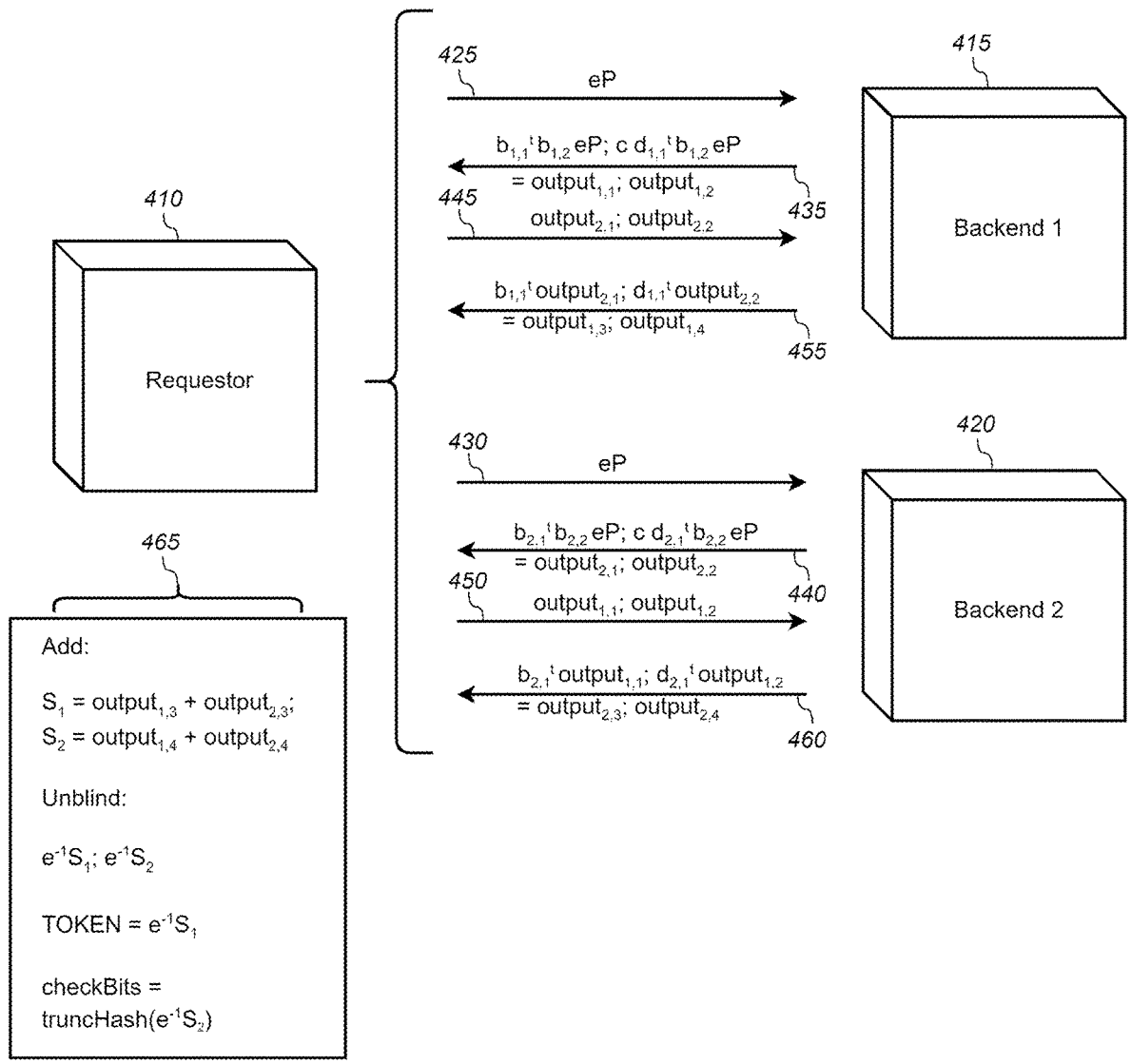
FIG. 4 comprises a flow chart with a signal flow diagram as configured in accordance with various embodiments of these teachings and that illustrates parallelizable two-round tokenization involving a Requestor, a Backend 1 and a Backend 2. The final outputs comprise a reversible token and a cryptographic integrity token, and their derivation involves addition, unblinding and hashing on the part of the Requestor. The transmissions depicted in FIG. 4 may include an overlay such as authenticated or non-authenticated encryption that is subsequently decrypted, that is not explicitly shown.

Relevant to FIG. 4 and FIG. 6, by one approach, at least a first tokenization processor generates a reversible token, denoted herein as TOKEN, and a cryptographic integrity token, denoted herein as checkBits. Moreover, relevant to FIG. 5 and FIG. 6, during detokenization based, at least in part, on a purported blinded or unblinded TOKEN received from a requestor, at least a second tokenization processor attempts to match a purported checkBits value received from the requestor against a value that is recomputed by a third tokenization processor from the purported blinded or unblinded TOKEN, wherein there may be overlaps among the tokenization processors comprised by the at least a first tokenization processor, the at least a second tokenization processor and the at least a third tokenization processor.

Referring now to FIG. 4, stepping through tokenization processing, first the Requestor 410 transmits eP to Backend 1 415 at 425, and transmits eP to Backend 2 420 at 430. Backend 1 415 responds at 435 with $b_{1,1}{}^t b_{1,2}[eP]$ and $c\, d_{1,1}{}^t b_{1,2}[eP]$, and Backend 2 420 responds with $b_{2,1}{}^t b_{2,2} [eP]$ and $c\, d_{2,1}{}^t b_{2,2} [eP]$ at 440, thus completing round-one processing. Using $b_{2,1}{}^t b_{2,2}\, eP$ and $c\, d_{2,1}{}^t b_{2,2}\, eP$ received via 445, Backend 1 415 transmits $b_{1,1}{}^t [b_{2,1}{}^t b_{2,2}\, eP]$ and $d_{1,1}{}^t [c\, d_{2,1}{}^t b_{2,2}\, eP]$ to the Requestor 410 at 455, thus completing its role in round-two processing. Similarly, using $b_{1,1}{}^t b_{1,2}\, eP$ and $c\, d_{1,1}{}^t b_{1,2}\, eP$ received via 450, Backend 2 420 transmits $b_{2,1}{}^t [b_{1,1}{}^t b_{1,2}\, eP]$ and $d_{2,1}{}^t [c\, d_{1,1}{}^t b_{1,2}\, eP]$ to the Requestor 410 at 460, thus completing its role in round-two processing. At 465, the Requestor 410 sums and unblinds the first output of 455 and the first output of 460 to derive TOKEN=$e^{-1} ([b_{1,1}{}^t b_{2,1}{}^t b_{2,2}\, eP]+[b_{2,1}{}^t b_{1,1}{}^t b_{1,2}\, eP])$. Also at 465, the Requestor 410 sums and unblinds the second output of 455 and the second output of 460 followed by truncated hashing to form the AUX_TOKEN usable as a cryptographic integrity token by Backend 1 and Backend 2 in the processing of FIG. 5, namely, checkBits=truncHash($e^{-1} ([c\, d_{1,1}{}^t d_{2,1}{}^t b_{2,2}\, eP]+[c\, d_{2,1}{}^t d_{1,1}{}^t b_{1,2}\, eP])$).

Figure 5:
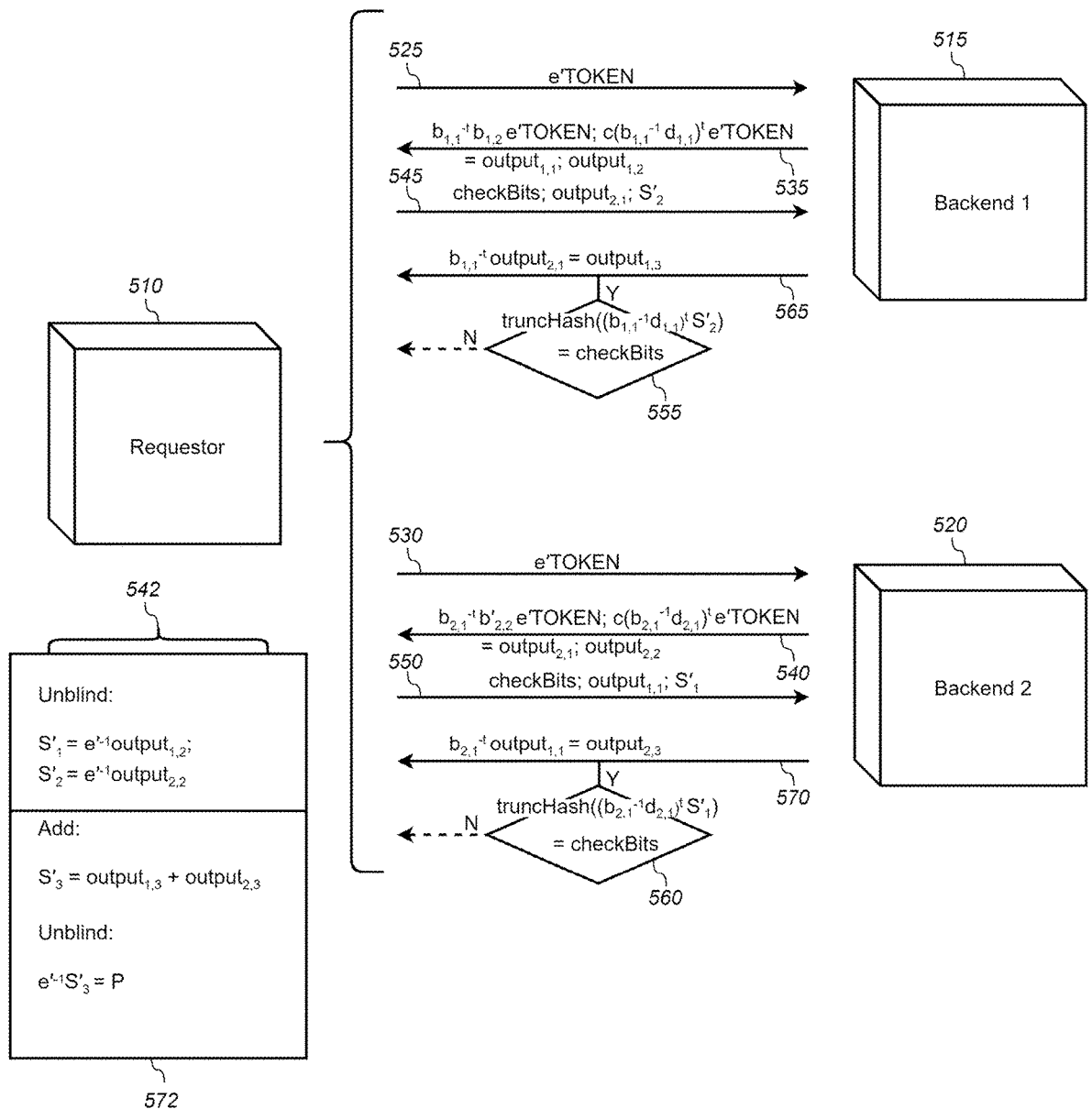
FIG. 5 comprises a flow chart with a signal flow diagram as configured in accordance with various embodiments of these teachings and that illustrates parallelizable two-round detokenization, intended to recover a representation of the Data that was tokenized as corresponding to FIG. 4 and involving a Requestor, a Backend 1 and a Backend 2. The transmissions depicted in FIG. 5 may include an overlay such as authenticated or non-authenticated encryption that is subsequently decrypted, that is not explicitly shown.

Referring now to FIG. 5, stepping through detokenization processing, first the Requestor 510 transmits e'TOKEN to Backend 1 515 at 525, and transmits e'TOKEN to Backend 2 520 at 530. Taking advantage of this relationship between tokenization processor secrets: $(b'_{1,2}+b'_{2,2})\,(b_{1,2}+b_{2,2})=1$ mod n, Backend 1 515 responds at 535 with $b_{1,1}{}^{-t} b'_{1,2}$ [e'TOKEN] and $c\, (b_{1,1}{}^{-1} d_{1,1})^t$ [e'TOKEN], and Backend 2 520 responds at 540 with $b_{2,1}{}^t b'_{2,2}$ [e'TOKEN] and $c\, (b_{2,1}{}^{-1} d_{2,1})^t$ [e'TOKEN], thus completing their role in round-one processing. $c\, (b_{1,1}{}^{-1} d_{1,1})^t$ e'TOKEN is exposed to the Requestor 510 so that it can unblind this value at 542 in order to be able to provide the result to Backend 2 520 at 550. Similarly, $c\, (b_{2,1}{}^{-1} d_{2,1})^t$ e'TOKEN is exposed to the Requestor 510 so that it can unblind this value at 542 in order to be able to provide the result to Backend 1 515 at 545. Also at 545, the Requestor 510 provides Backend 1 515 with checkBits, as was computed via the processing of FIG. 4, and $b_{2,1}{}^{-t} b'_{2,2}$ e'TOKEN as was received from Backend 2 520 at 540. Similarly, also at 550, the Requestor 510 provides Backend 2 520 with checkBits, and $b_{1,1}{}^{-t} b'_{1,2}$ e'TOKEN as was received from Backend 1 515 at 535. At 555, Backend 1 515 computes truncHash($(b_{1,1}{}^{-1} d_{1,1})^t$ [$c\, (b_{2,1}{}^{-1} d_{2,1})^t$ TOKEN]), and verifies whether or not that value is equal to checkBits as received at 545. If yes, then Backend 1 515 transmits $b_{1,1}{}^{-t} [b_{2,1}{}^{-t} b'_{2,2}$ e'TOKEN] to the Requestor 510 at 565. If no, then Backend 1 515 aborts the response or sends an error message. Similarly, at 560, Backend 2 520 computes truncHash($(b_{2,1}{}^{-1} d_{2,1})^t$ [$c\, (b_{1,1}{}^{-1} d_{1,1})^t$ TOKEN]), and verifies whether that value is equal to checkBits as received at 550. If yes, then Backend 2 520 transmits $b_{2,1}{}^{-t} [b_{1,1}{}^{-t} b'_{1,2}$ e'TOKEN] to the Requestor 510 at 570. If no, then Backend 2 520 aborts the response or sends an error message. This completes the role of Backend 1 515 and Backend 2 520 in round-two processing. At 572, the Requestor 510 adds the outputs if provided by Backend 1 515 at 565 and by Backend 2 520 at 570, respectively, followed by unblinding to recover P as the representation of Data. That is, P=$e'^{-1} ([b_{1,1}{}^{-t} b_{2,1}{}^{-t} b'_{2,2}$ e'TOKEN]+$[b_{2,1}{}^{-t} b_{1,1}{}^{-t} b'_{1,2}$ e'TOKEN]).

A goal of the use of addition rather than multiplication for $f_2$ is to cause bad Requestor inputs that fail checkBits integrity verification during detokenization to be rejected by conformant Backend(s), thus preventing effective recovery via summing if at least one Backend is conformant (where recovery here does not necessarily imply recovery of P if a Requestor is acting illegitimately). However, if ephemerally blinded TOKENs are expected to be provided to Backends during detokenization (as depicted above for Embodiment 2), then a Requestor acting illegitimately can ignore first-round blinded Backend outputs that are intended for use in reformulating checkBits and instead provide unblinded inputs for second-round Backend processing that correspond to a previous legitimate checkBits calculation for an unrelated TOKEN. This subterfuge forces the checkBits integrity verification to pass during second-round processing even though such inputs are unrelated to the TOKEN currently being detokenized. If both Backends are currently operating conformantly, then such attack can be thwarted via the use of end-to-end authenticated encryption combined with fresh randomization of the first-round blinded Backend outputs that are intended for use in reformulating checkBits. To effect a binding process, the authenticated encryption is preferably applied to the randomizing factors needed to remove the effect of the randomization as well as to the first-round Backend-generated values used by the opposite Backends during the second round of detokenization to generate the values to be released if checkBits verification passes. A simplified embodiment that is purely multiplicative, thus lending itself to checking for equality of second-round Backend outputs by a Requestor that is acting legitimately, is presented as Embodiment 3. This is followed by Embodiment 3 detokenization augmented with the introduction of the above-mentioned randomizing factors.

In both Embodiment 2 and Embodiment 3, alternatively to having the Requestor unblind first-round blinded Backend outputs during detokenization to enable verification of checkBits, detokenization can be performed over TOKENs that are not ephemerally blinded by the Requestor. In that case, end-to-end authentication (with or without encryption) can be used to prevent the specific attack of effective undetectable substitution of the parts of first-round Backend outputs by a Requestor that are used for checkBits reformulation by the Backends during second-round processing. In Embodiment 3 under submission by the Requestor of TOKENs that are not ephemerally blinded, to prevent either Backend from unilaterally recovering P from such TOKEN during detokenization, each Backend can ephemerally blind the part of its first-round output that is used by the opposite Backend during second-round processing to enable recovered P to be provided to a Requestor that acts legitimately. Each Backend can provide their ephemeral blinding factor (or its inverse) to the Requestor privately as part of its second-round Backend output, so that this ephemeral blinding factor can be inverted out by the Requestor towards recovery of P (where the Requestor applies the inverse ephemeral blinding factor associated with a Backend to a part of the opposite Backend's second-round output).

To thwart successful "mirroring," the authenticated encryption (or authentication-only, e.g., HMAC) keys derived by each Backend (e.g., from hash (previous resplit parameter(s)))) should preferably also be a function of Backend identity, so that the key used for encryption by Backend 1 and for decryption by Backend 2 differs from that used for encryption by Backend 2 and for decryption by Backend 1 (although both Backend 1 and Backend 2 can derive both keys).

Embodiment 3

$f_1$=multiplication modulo n; $f_2$=multiplication modulo n; constant functions $f_3$ and $f_4$ always return 1; $\beta_{1,1}(t)=b_{1,1}{}^t$, and $\beta_{2,1}(t)=b_{2,1}{}^t$; $\beta_{1,2}=b_{1,2}$ and $\beta_{2,2}=b_{2,2}$.

h=truncated hash; $g_1$=multiplication modulo n; $g_2$=multiplication modulo n; constant functions $g_3$ and $g_4$ always return 1; $\delta_{1,1}(t)=d_{1,1}{}^t$ and $\delta_{2,2}(t)=d_{2,1}{}^t$; $\delta_{1,2}=d_{1,2}$ and $\delta_{2,2}=d_{2,2}$.

Embodiment 3 TOKEN and checkBits: TOKEN=$(b_{1,1} b_{2,1})^t b_{1,2} b_{2,2} P$; checkBits=AUX_TOKEN=truncHash($(d_{1,1} d_{2,1})^t d_{1,2} d_{2,2} P$).

Referring now to FIG. 6, stepping through tokenization processing, first the Requestor 610 transmits eP to Backend 1 615 at 625, and transmits eP to Backend 2 620 at 630. Backend 1 615 responds at 635 with $b_{1,1}{}^t b_{1,2}[eP]$ and $d_{1,1}{}^t d_{1,2}[eP]$, and Backend 2 620 responds with $b_{2,1}{}^t b_{2,2}[eP]$ and $d_{2,1}{}^t d_{2,2}[eP]$ at 640, thus completing their round-one processing. Using $b_{2,1}{}^t b_{2,2} eP$ and $d_{2,1}{}^t d_{2,2} eP$ received via 645, Backend 1 615 transmits $b_{1,1}{}^t b_{1,2}[b_{2,1}{}^t b_{2,2} eP]$ and $d_{1,1}{}^t d_{1,2}[d_{2,1}{}^t d_{2,2} eP]$ to the Requestor 610 at 655, thus completing its role in round-two processing. Similarly, using $b_{1,1}{}^t b_{1,2} eP$ and $d_{1,1}{}^t d_{1,2} eP$ received via 650, Backend 2 620 transmits $b_{2,1}{}^t b_{2,2}[b_{1,1}{}^t b_{1,2} eP]$ and $d_{2,1}{}^t d_{2,2}[d_{1,1}{}^t d_{1,2} eP]$ to the Requestor 610 at 660, thus completing its role in round-two processing. At 665, the Requestor 610 verifies equality of the first output of 655 and the first output of 660, and the second output of 655 and the second output of 660, respectively. Also at 665, the Requestor 610 unblinds the first output of 655 to derive TOKEN=$e^{-1} [b_{1,1}{}^t b_{2,1}{}^t b_{1,2} b_{2,2} eP]$. The Requestor 610 also unblinds the second output of 655, followed by truncated hashing to form the AUX_TOKEN usable as a cryptographic integrity token by Backend 1 715 and Backend 2 720 in the processing of FIG. 7, namely, checkBits=truncHash($e^{-1} [d_{1,1}{}^t d_{2,1}{}^t d_{1,2} d_{2,2} eP]$).

Figure 7:
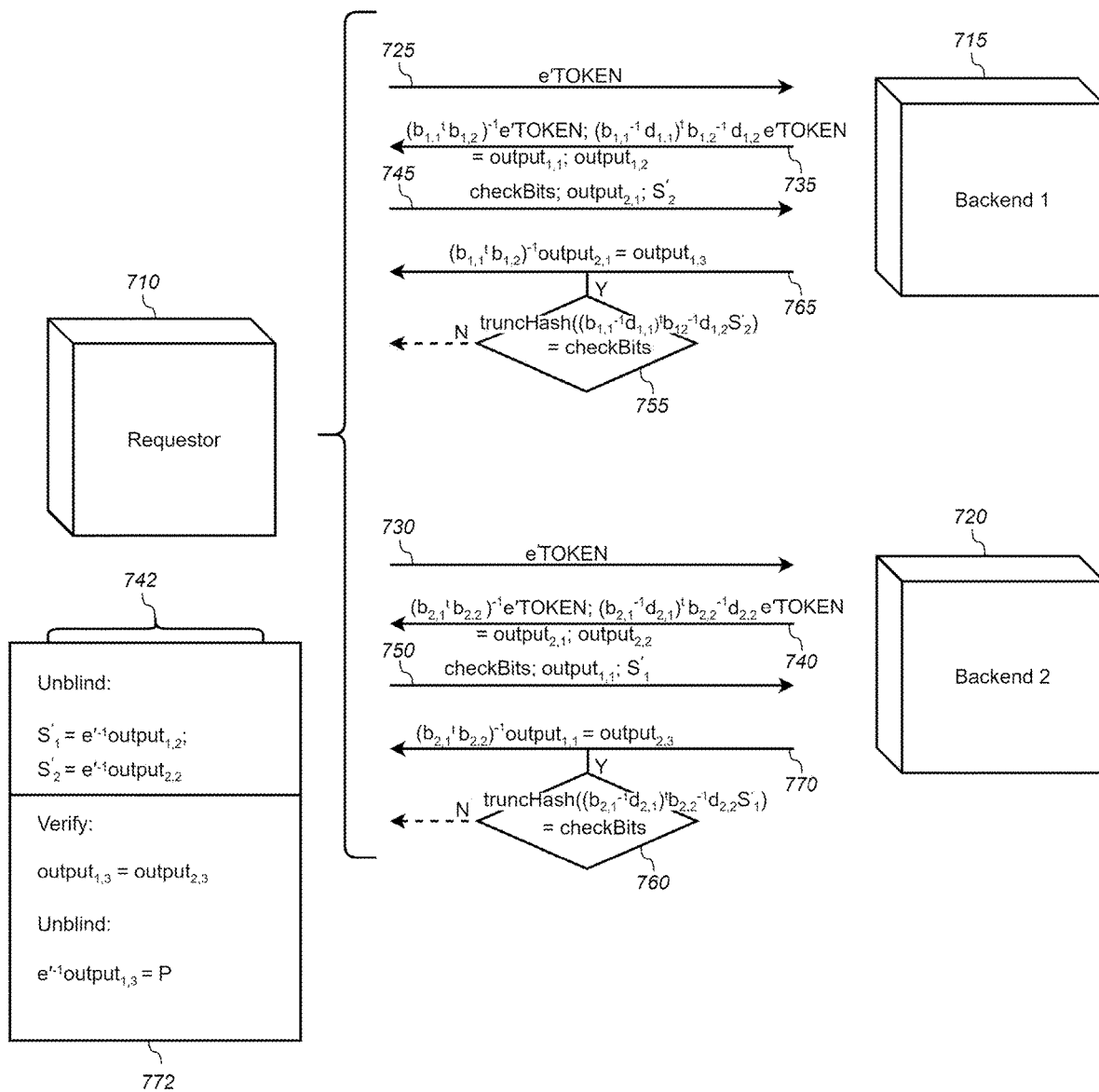
FIG. 7 comprises a flow chart with a signal flow diagram as configured in accordance with various embodiments of these teachings and that illustrates parallelizable two-round detokenization, intended to recover a representation of the Data that was tokenized as corresponding to FIG. 6 and involving a Requestor, a Backend 1 and a Backend 2. The transmissions depicted in FIG. 7 may include an overlay such as authenticated or non-authenticated encryption that is subsequently decrypted, that is not explicitly shown.

Referring now to FIG. 7, stepping through detokenization processing, first the Requestor 710 transmits e'TOKEN to Backend 1 715 at 725, and transmits e'TOKEN to Backend 2 720 at 730. Backend 1 715 responds at 735 with $(b_{1,1}{}^t b_{1,2})^{-1}$ [e'TOKEN] and $(b_{1,1}{}^{-1} d_{1,1})^t b_{1,2}{}^{-1} d_{1,2}$ [e'TOKEN], and Backend 2 720 responds at 740 with $(b_{2,1}{}^t b_{2,2})^{-1}$ [e'TOKEN] and $(b_{2,1}{}^{-1} d_{2,1})^t b_{2,2}{}^{-1} d_{2,2}$ [e'TOKEN], thus completing their role in round-one processing. $(b_{1,1}{}^{-1} d_{1,1})^t b_{1,2}{}^{-1} d_{1,2}$ e'TOKEN is exposed to the Requestor 710 so that it can unblind this value at 742 in order to be able to provide the result to Backend 2 720 at 750. Similarly, $(b_{2,1}{}^{-1} d_{2,1})^t b_{2,2}{}^{-1} d_{2,2}$ e'TOKEN is exposed to the Requestor 710 so that it can unblind this value at 742 in order to be able to provide the result to Backend 1 715 at 745. Also at 745, the Requestor 710 provides Backend 1 715 with checkBits, as was computed via the processing of FIG. 6, and $(b_{2,1}{}^t b_{2,2})^{-1}$ e'TOKEN as was received from Backend 2 720 at 740. Similarly, also at 750, the Requestor 710 provides Backend 2 720 with checkBits, and $(b_{1,1}{}^t b_{1,2})^{-1}$ e'TOKEN as was received from Backend 1 715 at 735. At 755, Backend 1 715 computes truncHash($(b_{1,1}{}^{-1} d_{1,1})^t b_{1,2}{}^{-1} d_{1,2} [(b_{2,1}{}^{-1} d_{2,1})^t b_{2,2}{}^{-1} d_{2,2}$ TOKEN]), and verifies whether or not that value is equal to checkBits as received at 745. If yes, then Backend 1 715 transmits $(b_{1,1}{}^t b_{1,2})^{-1} [(b_{2,1}{}^t b_{2,2})^{-1}$ e'TOKEN] to the Requestor at 765. If no, then Backend 1 715 aborts the response or sends an error message. Similarly, at 760, Backend 2 720 computes truncHash($(b_{2,1}{}^{-1} d_{2,1})^t b_{2,2}{}^{-1} d_{2,2} [(b_{1,1}{}^{-1} d_{1,1})^t b_{1,2}{}^{-1} d_{1,2}$ TOKEN]), and verifies whether that value is equal to checkBits as received at 750. If yes, then Backend 2 720 transmits $(b_{2,1}{}^t b_{2,2})^{-1} [(b_{1,1}{}^t b_{1,2})^{-1}$ e'TOKEN] to the Requestor at 770. If no, then Backend 2 720 aborts the response or sends an error message. This completes the role of Backend 1 715 and Backend 2 720 in round-two processing. At 772, the Requestor 710 verifies equality of the output of 765 and the output of 770, followed by unblinding of the output of 765 to recover P as the representation of Data. That is, $P=e'^{-1}[(b_{1,1}{}^t b_{1,2})^{-1} (b_{2,1}{}^t b_{2,2})^{-1}$ e'TOKEN].

Augmenting detokenization with $rand_1$ generated by Backend 1 and $rand_2$ generated by Backend 2:

Detokenization Round-One Backend Processing:

Backend 1: $(b_{1,1}{}^t b_{1,2})^{-1}$ [e'TOKEN] and $rand_1$—provided privately via end-to-end authenticated encryption to Backend 2 (although passing opaquely through Requestor); $rand_1 (b_{1,1}{}^{-1} d_{1,1})^t b_{1,2}{}^{-1} d_{1,2}$ [e'TOKEN]

Backend 2: $(b_{2,1}{}^t b_{2,2})^{-1}$ [e'TOKEN] and $rand_2$—provided privately via end-to-end authenticated encryption to Backend 1 (although passing opaquely through Requestor); $rand_2 (b_{2,1}{}^{-1} d_{2,1})^t b_{2,2}{}^{-1} d_{2,2}$ [e'TOKEN]

Detokenization Round-Two Backend Processing:

Backend 1: $(b_{1,1}{}^t b_{1,2})^{-1} [(b_{2,1}{}^t b_{2,2})^{-1}$ e'TOKEN]; $(rand_2^{-1} (b_{1,1}{}^{-1} d_{1,1})^t b_{1,2}{}^{-1} d_{1,2})$ mod n $[(b_{2,1}{}^{-1} d_{2,1})^t b_{2,2}{}^{-1} d_{2,2}$ TOKEN] (using $[e'^{-1}(rand_2 (b_{2,1}{}^{-1} d_{2,1})^t b_{2,2}{}^{-1} d_{2,2}$ e'TOKEN)] and end-to-end encrypted $rand_2$ (or $rand_2^{-1}$ mod n) provided by Requestor); Verify that truncHash($(b_{1,1}{}^{-1} d_{1,1})^t b_{1,2}{}^{-1} d_{1,2} [(b_{2,1}{}^{-1} d_{2,1})^t b_{2,2}{}^{-1} d_{2,2}$ TOKEN])=checkBits as condition of releasing $(b_{1,1}{}^t b_{1,2})^{-1} [(b_{2,1}{}^t b_{2,2})^{-1}$ e'TOKEN] to Requestor Backend 2: $(b_{2,1}{}^t b_{2,2})^{-1} [(b_{1,1}{}^t b_{1,2})^{-1}$ e'TOKEN]; $(rand_1^{-1} (b_{2,1}{}^{-1} d_{2,1})^t b_{2,2}{}^{-1} d_{2,2})$ mod n $[(b_{1,1}{}^{-1} d_{1,1})^t b_{1,2}{}^{-1} d_{1,2}$ TOKEN] (using $[e'^{-1}(rand_1 (b_{1,1}{}^{-1} d_{1,1})^t b_{1,2}{}^{-1} d_{1,2}$ e'TOKEN)] and end-to-end encrypted $rand_1$ (or $rand_1^{-1}$ mod n) provided by Requestor); Verify that truncHash($(b_{2,1}{}^{-1} d_{2,1})^t b_{2,2}{}^{-1} d_{2,2} [(b_{1,1}{}^{-1} d_{1,1})^t b_{1,2}{}^{-1} d_{1,2}$ TOKEN])=checkBits as condition of releasing $(b_{2,1}{}^t b_{2,2})^{-1} [(b_{1,1}{}^t b_{1,2})^{-1}$ e'TOKEN] to Requestor Detokenization final Requestor processing: Verify that $[(b_{1,1}{}^t b_{1,2})^{-1} (b_{2,1}{}^t b_{2,2})^{-1}$ e'TOKEN] received from Backend 1=$[(b_{2,1}{}^t b_{2,2})^{-1} (b_{1,1}{}^t b_{1,2})^{-1}$ e'TOKEN] received from Backend 2. Recover $P=e'^{-1}[(b_{1,1}{}^t b_{1,2})^{-1} (b_{2,1}{}^t b_{2,2})^{-1}$ e'TOKEN].

As an alternative to Backend 1 suppressing the release of $(b_{2,1}{}^t b_{2,2})^{-1} [(b_{1,1}{}^t b_{1,2})^{-1}$ e'TOKEN] to the Requestor in the event that checkBits verification fails, and to Backend 2 suppressing the release of $(b_{2,1}{}^t b_{2,2})^{-1} [(b_{1,1}{}^t b_{1,2})^{-1}$ e'TOKEN] to the Requestor in the event that checkBits verification fails, Backend 1 can release a modified version that incorporates or substitutes the value of one or more $b_{1,j}$ values, and Backend 2 can release the corresponding modified version that incorporates or substitutes the value of one or more $b_{2,j}$ values. Since $(b_{1,j} b_{2,j})$ mod n remains constant through resplit intervals, then a Requestor acting adversely will not detect an inequality in the received values or a difference across resplit intervals, if $b_{1,j}$ and $b_{2,j}$ are used in a consistent formulation and only as the product $(b_{1,j} b_{2,j})$ mod n. Parallel computations such as these can also be used in other embodiments that entail one or more checks conducted by the Backends, as an alternative to aborting computation and/or transmitting an error message.

Unlike Embodiment 2, in Embodiment 3, the second-round computation by each Backend that enables recovery of P in the legitimate Requestor case is identical to that in the first-round computation. End-to-end encryption (whether authenticated or not) of that part of the first-round computation can thwart the specific attack in which a Requestor (that is unilaterally attempting attack) requests first-round detokenization processing twice instead of requesting first-round detokenization processing followed by requesting second-round detokenization processing.

Unlike Embodiments 2 and 3, Embodiments 4-6 (as well as Embodiment 1) do not expose any aspects of non-blinded TOKENs to either of the Backends and do not entail augmenting the TOKEN by an element such as checkBits, as an AUX_TOKEN, that is stored in addition to the TOKEN to enable detokenization processing by the Backends.

Embodiment 4

$f_1$=multiplication modulo n; $f_2$=multiplication modulo n; $f_3$=hash; constant function $f_4$ always returns 1; $\beta_{1,1}(t)=b_{1,1}{}^t$, and $\beta_{2,1}(t)=b_{2,1}{}^t$; $\beta_{1,2}=b_{1,2}$ and $\beta_{2,2}=b_{2,2}$; $\beta_{1,3}(t)=b_{1,3}{}^t$; $\beta_{2,3}(t)=\beta_{2,3}{}^t$; $\beta_{1,4}=b_{1,4}$; $\beta_{2,4}=b_{2,4}$; $G_1$=G. Setting $f_3(x)$=hash(x) is an example. Another example is to set $f_3(x)$=(hash(0||x) hash(1||x)) mod n. This holds analogously for Embodiment 5 and Embodiment 6 presented later with respect to functions $f_3$ and $f_4$.

Embodiment 4 TOKEN: TOKEN=$(b_{1,1}\ b_{2,1})^t\ b_{1,2}\ b_{2,2}$ hash$((b_{1,3}\ b_{2,3})^t\ b_{1,4}\ b_{2,4}\ G)$P.

Figure 8:
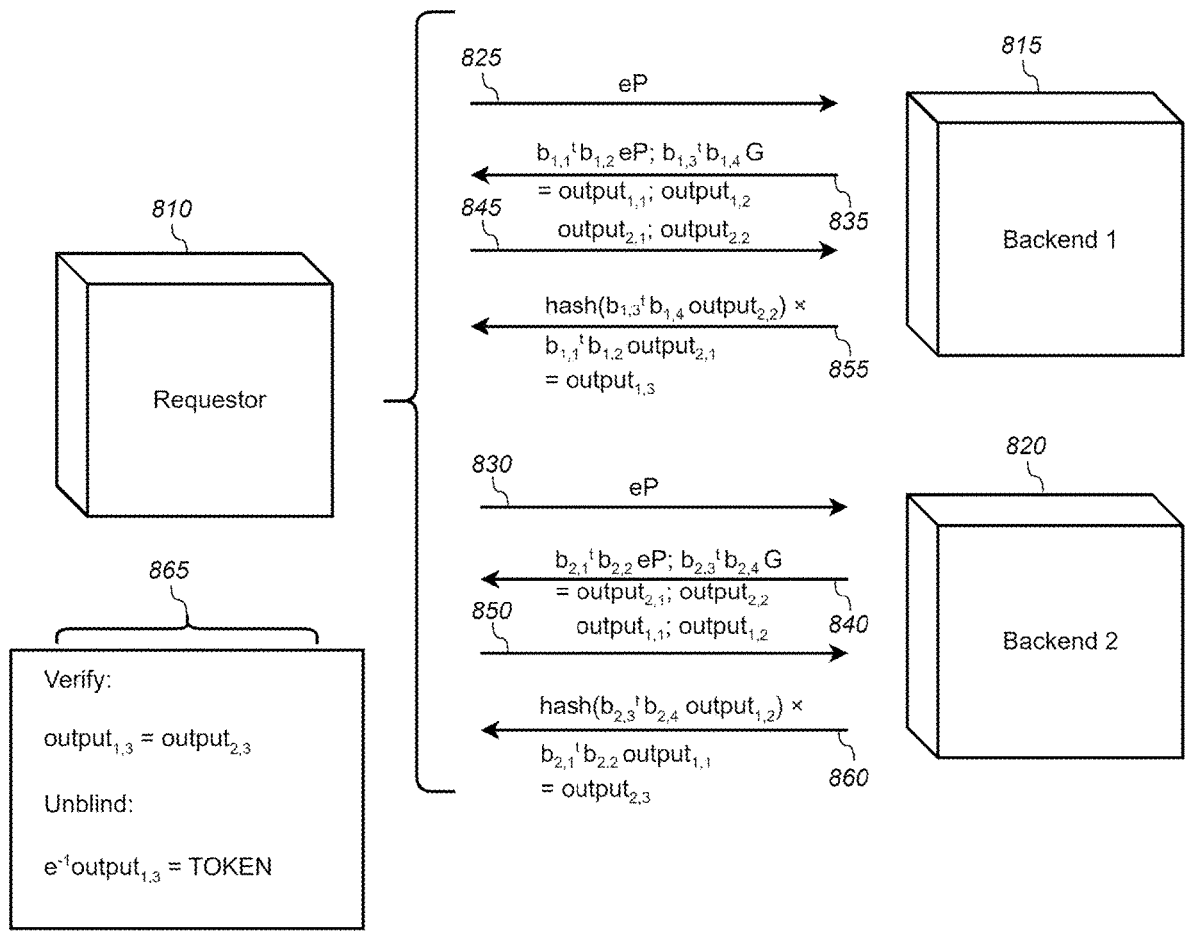
FIG. 8 comprises a flow chart with a signal flow diagram as configured in accordance with various embodiments of these teachings and that illustrates parallelizable two-round tokenization involving a Requestor, a Backend 1 and a Backend 2. A reversible token is a final output, and its derivation involves verification and unblinding on the part of the Requestor. The transmissions depicted in FIG. 8 may include an overlay such as authenticated or non-authenticated encryption that is subsequently decrypted, that is not explicitly shown.

Referring now to FIG. 8, stepping through tokenization processing, first the Requestor 810 transmits eP to Backend 1 815 at 825, and transmits eP to Backend 2 820 at 830. Backend 1 815 responds at 835 with $b_{1,1}{}^t\ b_{1,2}$[eP] and $b_{1,3}{}^t\ b_{1,4}\ G$, and Backend 2 820 responds with $b_{2,1}{}^t\ b_{2,2}$ [eP] and $\beta_{2,3}{}^t\ b_{2,4}\ G$ at 840, thus completing their round-one processing. Using $b_{2,1}{}^t\ b_{2,2}$ eP and $\beta_{2,3}{}^t\ b_{2,4}\ G$ received via 845, Backend 1 815 transmits hash($b_{1,3}{}^t\ b_{1,4}\ [\beta_{2,3}{}^t\ b_{2,4}\ G]$) $b_{1,1}{}^t\ b_{1,2}[b_{2,1}{}^t\ b_{2,2}\ eP]$ to the Requestor 810 at 855, thus completing its role in round-two processing. Similarly, using $b_{1,1}{}^t\ b_{1,2}$ eP and $b_{1,3}{}^t\ b_{1,4}\ G$ received via 850, Backend 2 820 transmits hash($b_{2,3}{}^t\ b_{2,4}\ [b_{1,3}{}^t b_{1,4}\ G]$) $b_{2,1}{}^t\ b_{2,2}\ [b_{1,1}{}^t\ b_{1,2}\ eP]$ to the Requestor 810 at 860, thus completing its role in round-two processing. At 865, the Requestor 810 verifies equality of the output of 855 and the output of 860, and unblinds the output of 855 to derive TOKEN=$e^{-1}$ [hash($b_{1,3}{}^t\ b_{1,4}\ b_{2,3}{}^t\ b_{2,4}\ G$) $b_{1,1}{}^t\ b_{1,2}\ b_{2,1}{}^t\ b_{2,2}$ eP].

Figure 9:
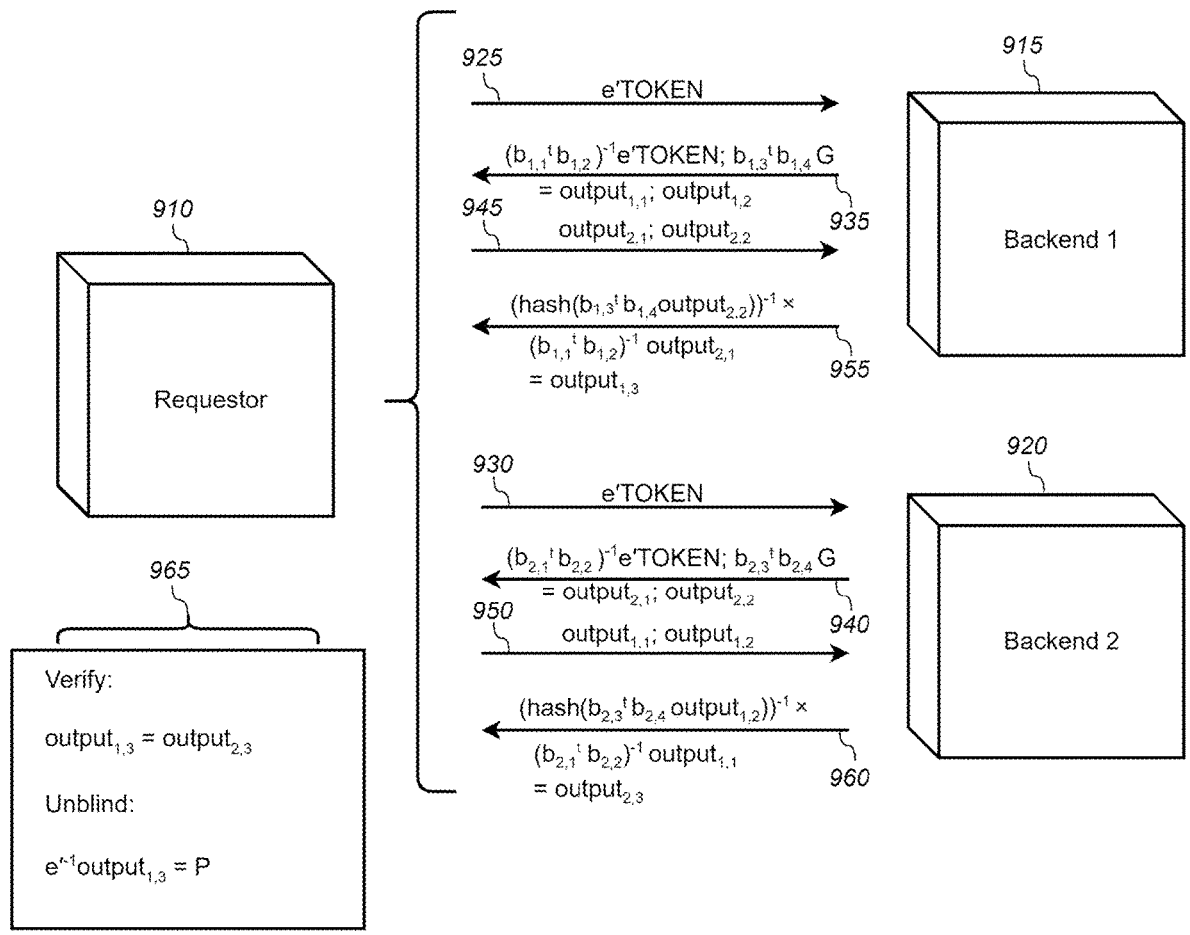
FIG. 9 comprises a flow chart with a signal flow diagram as configured in accordance with various embodiments of these teachings and that illustrates parallelizable two-round detokenization, intended to recover a representation of the Data that was tokenized as corresponding to FIG. 8 and involving a Requestor, a Backend 1 and a Backend 2. The transmissions depicted in FIG. 9 may include an overlay such as authenticated or non-authenticated encryption that is subsequently decrypted, that is not explicitly shown.

Referring now to FIG. 9, stepping through detokenization processing, first the Requestor 910 transmits e'TOKEN to Backend 1 915 at 925, and transmits e'TOKEN to Backend 2 920 at 930. Backend 1 915 responds at 935 with $(b_{1,1}{}^t\ b_{1,2})^{-1}$ [e'TOKEN] and $b_{1,3}{}^t\ b_{1,4}\ G$, and Backend 2 920 responds at 940 with $(b_{2,1}{}^t\ b_{2,2})^{-1}$ [e'TOKEN] and $b_{2,3}{}^t\ b_{2,4}\ G$, thus completing their role in round-one processing. Using $(b_{2,1}{}^t\ b_{2,2})^{-1}$ e'TOKEN and $\beta_{2,3}{}^t\ b_{2,4}\ G$ received via 945, Backend 1 915 transmits (hash($b_{1,3}{}^t\ b_{1,4}\ [\beta_{2,3}{}^t\ b_{2,4}\ G]$))$^{-1}$ mod n $(b_{1,1}{}^t\ b_{1,2})^{-1}\ [(b_{2,1}{}^t\ b_{2,2})^{-1}$ e'TOKEN] to the Requestor 910 at 955, thus completing its role in round-two processing. Using $(b_{1,1}{}^t\ b_{1,2})^{-1}$ e'TOKEN and $b_{1,3}{}^t\ b_{1,4}\ G$ received via 950, Backend 2 920 transmits (hash($b_{2,3}{}^t\ b_{2,4}\ [b_{1,3}{}^t\ b_{1,4}\ G]$))$^{-1}$ mod n $(b_{2,1}{}^t\ b_{2,2})^{-1}\ [(b_{1,1}{}^t\ b_{1,2})^{-1}$ e'TOKEN] to the Requestor 910 at 960, thus completing its role in round-two processing. At 965, the Requestor 910 verifies equality of the output of 955 and the output of 960. The Requestor 910 unblinds the output of 955, resulting in recovery of P=$e'^{-1}$ [(hash($b_{1,3}{}^t\ b_{1,4}\ \beta_{2,3}{}^t\ b_{2,4}\ G$))$^{-1}$ mod n $(b_{1,1}{}^t\ b_{1,2})^{-1}\ (b_{2,1}{}^t\ b_{2,2})^{-1}$ e'TOKEN].

Like Embodiment 3, Embodiment 4 has the Backends perform, at least in part, similar computations during the two rounds. Any adverse consequences of such similarity as potentially exploitable by illegitimately acting Requestors (such as pertaining to a lack of end-to-end encryption or release of such encryption key by a non-conformant Backend, thus enabling bypass of the second round by a Requestor during certain adversarial operations) are not relevant to Embodiment 5 and Embodiment 6.

Alternative Embodiment 4

$f_1$=multiplication modulo n; $f_2$=multiplication modulo n; constant function $f_3$ always return 1; $f_4$=identity function; the operation between $f_4$ and $f_1$ is elliptic curve point addition; $\beta_{1,1}(t)=b_{1,1}{}^t$, and $\beta_{2,1}(t)=b_{2,1}{}^t$; $\beta_{1,2}=b_{1,2}$ and $\beta_{2,2}=b_{2,2}$; $\beta_{1,5}(t)=b_{1,5}{}^t$; $\beta_{2,5}(t)=b_{2,5}{}^t$ $\beta_{1,6}=b_{1,6}$; $\beta_{2,6}=b_{2,6}$; $G_2$=G.

Alternative Embodiment 4 TOKEN: TOKEN=$(b_{1,1}\ b_{2,1})^t\ b_{1,2}\ b_{2,2}\ P+(b_{1,5}\ b_{2,5})^t\ b_{1,6}\ b_{2,6}\ G$.

Alternative Embodiment 4, if implemented under 2-round tokenization that does not allow for enabling P-dependent G or t within the additive modifier $(b_{1,5}\ b_{2,5})^t\ b_{1,6}\ b_{2,6}\ G$, can be attacked as follows (which is why a 3-round tokenization example of Alternative Embodiment 4 will be presented subsequently): The t-dependent additive modifier $(b_{1,5}\ b_{2,5})^t\ b_{1,6}\ b_{2,6}\ G$, denoted as $m_t$, can be extracted by a Requestor that requests tokenization of any two elliptic curve points $P_1$ and $P_2$, where $P_2$ is chosen as $aP_1$ for a known integer value of a 1: aTOKEN$_1$=a $(b_{1,1}\ b_{2,1})^t b_{1,2}\ b_{2,2}\ P_1$+a $(b_{1,5}\ b_{2,5})^t\ b_{1,6}\ b_{2,6}\ G$, and TOKEN$_2$=$(b_{1,1}\ b_{2,1})^t b_{1,2}\ b_{2,2}\ aP_1+(b_{1,5}\ b_{2,5})^t\ b_{1,6}\ b_{2,6}\ G$ together imply that $(a\ -1)^{-1}$ mod n (aTOKEN$_1$−TOKEN$_2$)=$m_t$.

3-Round Tokenization Example of Alternative Embodiment 4

Note that t* is a function of t via the formulation of AUX_TOKEN, and G=Gcheck (as defined below):
TOKEN=$(b_{1,1}\ b_{2,1})^{t*}\ b_{1,2}\ b_{2,2}\ P+(b_{1,5}\ b_{2,5})^{t*}\ b_{1,6}\ b_{2,6}$ Gcheck; checkBits=AUX_TOKEN=truncHash$((d_{1,1}\ d_{2,1})^t\ d_{1,2}\ d_{2,2}\ P)$.

As an example of t* where n is prime: t*=(hash (0||AUX_TOKEN) hash(1 AUX_TOKEN)) mod n−1, where||denotes concatenation.

As an example formulation of Gcheck: Let Gcheck x-coordinate=hash(AUX_TOKEN||Pad) where Pad is deterministically generated as the smallest nonnegative integer such that hash(AUX_TOKEN||Pad) is an x-coordinate of a point on the elliptic curve and hash(AUX_TOKEN Pad)<p, where the elliptic curve is defined over the prime field GF(p). The y-coordinate is preferably chosen unambiguously as one of the two possible values that correspond to the x-coordinate per the equation of the elliptic curve.

Tokenization Round-One Backend Processing:
  Backend 1: $d_{1,1}{}^t\ d_{1,2}$ [eP]—provide to Requestor
  Backend 2: $d_{2,1}{}^t\ d_{2,2}$ [eP]—provide to Requestor Tokenization Round-Two Backend Processing:
  Backend 1: $d_{1,1}{}^t\ d_{1,2}\ [d_{2,1}{}^t\ d_{2,2}\ P]$ (using [$e^{-1}(d_{2,1}{}^t\ d_{2,2}\ eP)$] provided by Requestor); checkBits=truncHash $(d_{1,1}{}^t\ d_{1,2}\ [d_{2,1}{}^t\ d_{2,2}\ P])$—provide to Requestor; derive t* and Gcheck; $b_{1,5}{}^{t*}\ b_{1,6}$ Gcheck—provide to Requestor; $b_{1,1}{}^{t*}\ b_{1,2}$[eP]
  Backend 2: $d_{2,1}{}^t\ d_{2,2}\ [d_{1,1}{}^t\ d_{1,2}\ P]$ (using [$e^{-1}(d_{1,1}{}^t\ d_{1,2}\ eP)$] provided by Requestor); checkBits=truncHash $(d_{2,1}{}^t\ d_{2,2}\ [d_{1,1}{}^t\ d_{1,2}\ P])$—provide to Requestor; derive t* and Gcheck; $b_{2,5}{}^{t*}\ b_{2,6}$ Gcheck—provide to Requestor; $b_{2,1}{}^{t*}\ b_{2,2}$ [eP]

Tokenization Round-Three Backend Processing (if [checkBits] Provided to Requestor by Backend 1=[checkBits] Provided to Requestor by Backend 2):
  Backend 1: $b_{1,1}{}^{t*}\ b_{1,2}[b_{2,1}{}^{t*}\ b_{2,2}\ eP]$; $b_{1,5}{}^{t*}\ b_{1,6}\ [b_{2,5}{}^{t*}\ b_{2,6}$ eGcheck] (using [e($b_{2,5}{}^{t*}\ b_{2,6}$ Gcheck)] provided by Requestor); $b_{1,1}{}^{t*}\ b_{1,2}[b_{2,1}{}^{t*}\ b_{2,2}\ eP]+b_{1,5}{}^{t*}\ b_{1,6}$ [e $b_{2,5}{}^{t*}\ b_{2,6}$ Gcheck]—provide to Requestor
  Backend 2: $b_{2,1}{}^{t*}\ b_{2,2}\ [b_{1,1}{}^{t*}\ b_{1,2}\ eP]$; $b_{2,5}{}^{t*}\ b_{2,6}\ [b_{1,5}{}^{t*}\ b_{1,6}$ eGcheck] (using [e($b_{1,5}{}^{t*}\ b_{1,6}$ Gcheck)] provided by Requestor); $b_{2,1}{}^{t*}\ b_{2,2}\ [b_{1,1}{}^{t*}\ b_{1,2}\ eP]+b_{2,5}{}^{t*}\ b_{2,6}\ [e\ b_{1,5}{}^{t*}\ b_{1,6}$ Gcheck]—provide to Requestor Tokenization final Requestor processing: Verify that $[b_{1,1}{}^{t*}\ b_{1,2}\ b_{2,1}{}^{t*}\ b_{2,2}\ eP+b_{1,5}{}^{t*}\ b_{1,6}\ e\ b_{2,5}{}^{t*}\ b_{2,6}$ Gcheck]

received from Backend 1=$[b_{2,1}{}^{t*} b_{2,2} b_{1,1}{}^{t*} b_{1,2} eP + b_{2,5}{}^{t*} b_{2,6} e b_{1,5}{}^{t*} b_{1,6}$ Gcheck] received from Backend 2. Derive TOKEN=$e^{-1} [b_{1,1}{}^{t*} b_{1,2} b_{2,1}{}^{t*} b_{2,2} eP + b_{1,5}{}^{t*} b_{1,6} e b_{2,5}{}^{t*} b_{2,6}$ Gcheck].

Detokenization Round-One Backend Processing:

Backend 1: derive t* and Gcheck from [checkBits] provided by Requestor; $(b_{1,1}{}^{t*} b_{1,2})^{-1}$ [e'TOKEN]; $(b_{1,1}{}^{t*} b_{1,2})^{-1} b_{1,5}{}^{t*} b_{1,6}$ [e'Gcheck]; $d_{1,1}{}^{t} d_{1,2} (b_{1,1}{}^{t*} b_{1,2})^{-1}$ [e'TOKEN]—provide to Requestor; $d_{1,1}{}^{t} d_{1,2} (b_{1,1}{}^{t*} b_{1,2})^{-1} b_{1,5}{}^{t*} b_{1,6}$ [Gcheck]

Backend 2: derive t* and Gcheck from [checkBits] provided by Requestor; $(b_{2,1}{}^{t*} b_{2,2})^{-1}$ [e'TOKEN]; $(b_{2,1}{}^{t*} b_{2,2})^{-1} b_{2,5}{}^{t*} b_{2,6}$ [e'Gcheck]; $d_{2,1}{}^{t} d_{2,2} (b_{2,1}{}^{t*} b_{2,2})^{-1}$ [e'TOKEN]-provide to Requestor; $d_{2,1}{}^{t} d_{2,2} (b_{2,1}{}^{t*} b_{2,2})^{-1} b_{2,5}{}^{t*} b_{2,6}$ [Gcheck]

Detokenization Round-Two Backend Processing:

Backend 1: $(b_{1,1}{}^{t*} b_{1,2})^{-1} [(b_{2,1}{}^{t*} b_{2,2})^{-1}$ e'TOKEN]; $(b_{1,1}{}^{t*} b_{1,2})^{-1} b_{1,5}{}^{t*} b_{1,6} [(b_{2,1}{}^{t*} b_{2,2})^{-1} b_{2,5}{}^{t*} b_{2,6}$ e'Gcheck]; $d_{1,1}{}^{t} d_{1,2} (b_{1,1}{}^{t*} b_{1,2})^{-1} [d_{2,1}{}^{t} d_{2,2} (b_{2,1}{}^{t*} b_{2,2})^{-1}$ TOKEN] (using $[d_{2,1}{}^{t} d_{2,2} (b_{2,1}{}^{t*} b_{2,2})^{-1}$ e'TOKEN] provided by Requestor); $d_{1,1}{}^{t} d_{1,2} (b_{1,1}{}^{t*} b_{1,2})^{-1} b_{1,5}{}^{t*} b_{1,6} [d_{2,1}{}^{t} d_{2,2} (b_{2,1}{}^{t*} b_{2,2})^{-1} b_{2,5}{}^{t*} b_{2,6}$ Gcheck]; Verify that truncHash $(d_{1,1}{}^{t} d_{1,2} (b_{1,1}{}^{t*} b_{1,2})^{-1} [d_{2,1}{}^{t} d_{2,2} (b_{2,1}{}^{t*} b_{2,2})^{-1}$ TOKEN]—$d_{1,1}{}^{t} d_{1,2} (b_{1,1}{}^{t*} b_{1,2})^{-1} b_{1,5}{}^{t*} b_{1,6} [d_{2,1}{}^{t} d_{2,2} (b_{2,1}{}^{t*} b_{2,2})^{-1} b_{2,5}{}^{t*} b_{2,6}$ Gcheck])=[checkBits] as condition of releasing $(b_{1,1}{}^{t*} b_{1,2})^{-1} [(b_{2,1}{}^{t*} b_{2,2})^{-1}$ e'TOKEN]–$(b_{1,1}{}^{t*} b_{1,2})^{-1} b_{1,5}{}^{t*} b_{1,6} [(b_{2,1}{}^{t*} b_{2,2})^{-1} b_{2,5}{}^{t*} b_{2,6}$ e'Gcheck] to Requestor Backend 2: $(b_{2,1}{}^{t*} b_{2,2})^{-1} [(b_{1,1}{}^{t*} b_{1,2})^{-1}$ e'TOKEN]; $(b_{2,1}{}^{t*} b_{2,2})^{-1} b_{2,5}{}^{t*} b_{2,6} [(b_{1,1}{}^{t*} b_{1,2})^{-1} b_{1,5}{}^{t*} b_{1,6}$ e'Gcheck]; $d_{2,1}{}^{t} d_{2,2} (b_{2,1}{}^{t*} b_{2,2})^{-1} [d_{1,1}{}^{t} d_{1,2} (b_{1,1}{}^{t*} b_{1,2})^{-1}$ TOKEN] (using $[d_{1,1}{}^{t} d_{1,2} (b_{1,1}{}^{t*} b_{1,2})^{-1}$ e'TOKEN] provided by Requestor); $d_{2,1}{}^{t} d_{2,2} (b_{2,1}{}^{t*} b_{2,2})^{-1} b_{2,5}{}^{t*} b_{2,6} [d_{1,1}{}^{t} d_{1,2} (b_{1,1}{}^{t*} b_{1,2})^{-1} b_{1,5}{}^{t*} b_{1,6}$ Gcheck]; Verify that truncHash $(d_{2,1}{}^{t} d_{2,2} (b_{2,1}{}^{t*} b_{2,2})^{-1} [d_{1,1}{}^{t} d_{1,2} (b_{1,1}{}^{t*} b_{1,2})^{-1}$ TOKEN]—$d_{2,1}{}^{t} d_{2,2} (b_{2,1}{}^{t*} b_{2,2})^{-1} b_{2,5}{}^{t*} b_{2,6} [d_{1,1}{}^{t} d_{1,2} (b_{1,1}{}^{t*} b_{1,2})^{-1} b_{1,5}{}^{t*} b_{1,6}$ Gcheck])=[checkBits] as condition of releasing $(b_{2,1}{}^{t*} b_{2,2})^{-1} [(b_{1,1}{}^{t*} b_{1,2})^{-1}$ e'TOKEN]—$(b_{2,1}{}^{t*} b_{2,2})^{-1} b_{2,5}{}^{t*} b_{2,6} [(b_{1,1}{}^{t*} b_{1,2})^{-1} b_{1,5}{}^{t*} b_{1,6}$ e'Gcheck] to Requestor Detokenization final Requestor processing: Verify that $[(b_{1,1}{}^{t*} b_{1,2})^{-1} (b_{2,1}{}^{t*} b_{2,2})^{-1}$ e'TOKEN–$(b_{1,1}{}^{t*} b_{1,2})^{-1} b_{1,5}{}^{t*} b_{1,6} (b_{2,1}{}^{t*} b_{2,2})^{-1} b_{2,5}{}^{t*} b_{2,6}$ e'Gcheck] received from Backend 1=$[(b_{2,1}{}^{t*} b_{2,2})^{-1} (b_{1,1}{}^{t*} b_{1,2})^{-1}$ e'TOKEN–$(b_{2,1}{}^{t*} b_{2,2})^{-1} b_{2,5}{}^{t*} b_{2,6} (b_{1,1}{}^{t*} b_{1,2})^{-1} b_{1,5}{}^{t*} b_{1,6}$ e'Gcheck] received from Backend 2. Recover P=$e'^{-1} [(b_{1,1}{}^{t*} b_{1,2})^{-1} (b_{2,1}{}^{t*} b_{2,2})^{-1}$ e'TOKEN—$(b_{1,1}{}^{t*} b_{1,2})^{-1} b_{1,5}{}^{t*} b_{1,6} (b_{2,1}{}^{t*} b_{2,2})^{-1} b_{2,5}{}^{t*} b_{2,6}$ e'Gcheck].

Unlike Embodiment 4 and Alternative Embodiment 4, the TOKENs of Embodiment 5 and 6 each incorporate two rather than one multiplicative modifier, where $G_1$ and $G_2$ are generated independently of each other for use within Embodiment 5, and where $G_1=G_2$ in Embodiment 6. The use of two distinct multiplicative modifiers within the computation of each TOKEN, where the intent is that each Backend does not have access to the multiplicative modifiers of the opposite Backend, implies that each of the two Backends would have to eventually be compromised to totally remove the combined effect of the modifiers. Analogously to the case of detokenization of non-blinded TOKENs under Embodiment 3, Embodiments 5 and 6 make use of ephemeral blinding factors generated independently by each of the Backends, even though here detokenization involves blinded Tokens. However, under Embodiments 5 and 6, Backends preferably use such ephemeral blinding factors during both tokenization and detokenization and do not ultimately reveal the ephemeral blinding factors to Requestors. Even though here the ephemeral blinding factors are not provided as first- or second-round outputs to Requestors, these values still traverse across the first and second rounds. Preferably, each Backend utilizes the ephemeral blinding factors during second-round computations to prevent both the opposite Backend and the Requestor (acting independently or collusively) from accessing the multiplicative modifiers that the Backend is responsible for using and safeguarding. Each Backend incorporates such a multiplicative modifier into a TOKEN during tokenization and attempts to remove such a multiplicative modifier during detokenization. Whether or not such removal is successful depends on the legitimacy or not of purported blinded TOKENs submitted by Requestors. Preferably, multiplicative modifiers are scope dependent.

After presenting Embodiment 5 and Embodiment 6, two mechanisms intended towards assuring traversal of Backend-generated ephemeral blinding factors across first and second rounds are described, where: (i) the first entails, in part, "boomeranging" of randomly generated values between the first and second rounds; and (ii) the second utilizes deterministic generation during the first round and deterministic re-generation during the second round.

Embodiment 5

$f_1$=multiplication modulo n; $f_2$=multiplication modulo n; $f_3$=hash; $f_4$=hash; $\beta_{1,1}(t)=b_{1,1}{}^{t}$, and $\beta_{2,1}(t)=b_{2,1}{}^{t}$; $\beta_{1,2}=b_{1,2}$ and $\beta_{2,2}=b_{2,2}$; $\beta_{1,3}(t)=b_{1,3}{}^{t}$; $\beta_{2,3}(t)=b_{2,3}{}^{t}$; $\beta_{1,4}=b_{1,4}$; $\beta_{2,4}=b_{2,4}$; $\beta_{1,5}(t)=b_{1,5}{}^{t}$; $\beta_{2,5}(t)=b_{2,5}{}^{t}$; $\beta_{1,6}=b_{1,4}$; $\beta_{2,6}=b_{2,4}$.

Embodiment 5 TOKEN: TOKEN=$(b_{1,1} b_{2,1})^{t} b_{1,2} b_{2,2}$ hash$((b_{1,3} b_{2,3})^{t} (b_{1,4} b_{2,4}) G_1)$ hash$((b_{1,3} b_{2,3})^{t} (b_{1,4} b_{2,4}) G_2)$P.

In Embodiment 5 as well as Embodiment 6 considered next, the hash function of $f_3$ need not be the same as the hash function of $f_4$.

In both Embodiment 5 and Embodiment 6: $e_1$ and $e_2$ denote the ephemeral blinding factors of Backend 1 and Backend 2, respectively, as used during tokenization; $e'_1$ and $e'_2$ denote the ephemeral blinding factors of Backend 1 and Backend 2, respectively, as used during detokenization.

In both Embodiment 5 and Embodiment 6: the removal by each Backend of the effect of its ephemeral blinding factor requires the Requestor to initiate running round 2, as is the case for both tokenization and detokenization.

In both Embodiment 5 and Embodiment 6: at least one second-round output differs in its value between each of the Backends independently of any difference in values between the ephemeral blinding factors, as is the case for both tokenization and detokenization.

Relevant to FIG. 10 and FIG. 12, by one approach, a Requestor combines at least three values comprising a first value, a second value and a third value, as part of its processing to derive a TOKEN, wherein: the first value involves at least ephemeral blinding by the requestor of Data that is further ephemerally blinded by a first tokenization processor and by a second tokenization processor; the second value involves at least the ephemeral blinding by the first tokenization processor and tokenization processor secrets of both the first tokenization processor and the second tokenization processor, and a scope label denoted as t, but not the Data and not the ephemeral blinding by the requestor; the third value, which is distinct from the second value, involves at least the ephemeral blinding by the second tokenization processor and tokenization processor secrets of both the first tokenization processor and the second tokenization processor that may be the same or different than the tokenization processor secrets involved in the second value, and the scope label denoted as t, but not the Data and not the ephemeral blinding by the requestor.

Referring now to FIG. 10, stepping through tokenization processing, first the Requestor 1010 transmits eP to Backend 1 1015 at 1025, and transmits eP to Backend 2 1020 at 1030. Backend 1 1015 responds at 1035 with $e_1 b_{1,1}{}^t b_{1,2}[eP]$ and $b_{1,3}{}^t b_{1,4} G_1$, and Backend 2 1020 responds with $e_2 b_{2,1}{}^t b_{2,2}$ [eP] and $\beta_{2,3}{}^t b_{2,4} G_2$ at 1040, thus completing round-one processing. Using $e_2 b_{2,1}{}^t b_{2,2}$ eP and $\beta_{2,3}{}^t b_{2,4} G_2$ received via 1045, Backend 1 1015 transmits $e_1 b_{1,1}{}^t b_{1,2}[e_2 b_{2,1}{}^t b_{2,2}$ eP] and $(e_1^{-1}$ hash$(b_{1,3}{}^t b_{1,4} [b_{2,3}{}^t b_{2,4} G_2]))$ mod n to the Requestor 1010 at 1055, thus completing its role in round-two processing. Similarly, using $e_1 b_{1,1}{}^t b_{1,2}$ eP and $b_{1,3}{}^t b_{1,4} G_1$ received via 1050, Backend 2 1020 transmits $e_2 b_{2,1}{}^t b_{2,2}$ [$e_1 b_{1,1}{}^t b_{1,2}$ eP] and $(e_2^{-1}$ hash$(b_{2,3}{}^t b_{2,4} [b_{1,3}{}^t b_{1,4} G_1]))$ mod n to the Requestor 1010 at 1060, thus completing its role in round-two processing. At 1065, the Requestor 1010 verifies equality of the first output of 1055 and the first output of 1060. Also at 1055, the Requestor 1010 computes the product of: the second output of 1055, the second output of 1060 and the first output of 1055. Finally at 1065, the Requestor 1010 unblinds the resultant product to derive TOKEN=$e^{-1}$ [($e_1^{-1}$ hash$(b_{1,3}{}^t b_{1,4} b_{2,3}{}^t b_{2,4} G_2))$ mod n] [($e_2^{-1}$ hash$(b_{2,3}{}^t b_{2,4} b_{1,3}{}^t b_{1,4} G_1))$ mod n] [$e_1 b_{1,1}{}^t b_{1,2} e_2 b_{2,1}{}^t b_{2,2}$ eP].

Referring now to FIG. 11, stepping through detokenization processing, first the Requestor 1110 transmits e'TOKEN to Backend 1 1115 at 1125, and transmits e'TOKEN to Backend 2 1120 at 1130. Backend 1 1115 responds at 1135 with $(e'_1 b_{1,1}{}^t b_{1,2})^{-1}$ [e'TOKEN] and $b_{1,3}{}^t b_{1,4} G_1$, and Backend 2 1120 responds at 1140 with $(e'_2 b_{2,1}{}^t b_{2,2})^{-1}$ [e'TOKEN] and $b_{2,3}{}^t b_{2,4} G_2$, thus completing their role in round-one processing. Using $(e'_2 b_{2,1}{}^t b_{2,2})^{-1}$ e'TOKEN and $b_{2,3}{}^t b_{2,4} G_2$ received via 1145, Backend 1 1115 transmits $(e'_1 b_{1,1}{}^t b_{1,2})^{-1}$ [$(e'_2 b_{2,1}{}^t b_{2,2})^{-1}$ e'TOKEN] and $(e'_1(\text{hash}(b_{1,3}{}^t b_{1,4} [\beta_{2,3}{}^t b_{2,4} G_2]))^{-1})$ mod n to the Requestor 1110 at 1155, thus completing its role in round-two processing. Using $(e'_1 b_{1,1}{}^t b_{1,2})^{-1}$ [e'TOKEN] and $b_{1,3}{}^t b_{1,4} G_1$ received via 1150, Backend 2 1120 transmits $(e'_2 b_{2,1}{}^t b_{2,2})^{-1}$ [$(e'_1 b_{1,1}{}^t b_{1,2})^{-1}$ e'TOKEN] and $(e'_2 (\text{hash}(b_{2,3}{}^t b_{2,4} [b_{1,3}{}^t b_{1,4} G_1]))^{-1})$ mod n to the Requestor 1110 at 1160, thus completing its role in round-two processing. At 1165, the Requestor 1110 verifies equality of the first output of 1155 and the first output of 1160. Also at 1165, the Requestor 1110 computes the product of: the second output of 1155, the second output of 1160 and the first output of 1155. Finally at 1165, the Requestor 1110 unblinds the resultant product to derive P=$e'^{-1}$[($e'_1$ (hash$(b_{1,3}{}^t b_{1,4} b_{2,3}{}^t b_{2,4} G_2))^{-1}$) mod n] [($e'_2$ (hash$(b_{2,3}{}^t b_{2,4} b_{1,3}{}^t b_{1,4} G_1))^{-1}$) mod n] [$(e'_1 b_{1,1}{}^t b_{1,2})^{-1} (e'_2 b_{2,1}{}^t b_{2,2})^{-1}$ e'TOKEN].

Embodiment 5 can be exploited by a non-conformant Backend unless appropriate safeguards are taken to: (1) prevent a Backend from fooling the other Backend to compute the multiplicative modifier (as part of its second-round output) that the adversarial Backend knows, by effectively switching the use of $G_1$ vs. $G_2$; and (2) prevent a Backend from fooling the other Backend to provide it with the multiplicative modifier that the unwitting victim Backend correctly uses in computing part of its second-round output.

As an example of countermeasure (1): Suppose Backend 1 provides Backend 2 with a fresh value of $bb_{1,1} G_2$ at the onset of each parameter resplit period; suppose Backend 2 provides Backend 1 with a fresh value of $bb_{2,1} G_1$ at the onset of each resplit period. During both tokenization and recovery, Backend 1 forms hash$(b_{1,3}{}^t b_{1,4} \beta_{2,3}{}^t b_{2,4} G_2)$ as: hash$((b_{1,3}{}^t b_{1,4}-bb_{1,1}) [(b_{2,3})^t b_{2,4} G_2]+[(b_{2,3})^t b_{2,4} bb_{1,1}$ $G_2])$ rather than as hash$(b_{1,3}{}^t b_{1,4} [\beta_{2,3}{}^t b_{2,4} G_2])$, where Backend 2 generates $(b_{2,3})^t b_{2,4} [bb_{1,1} G_2]$ as well as $(b_{2,3})^t b_{2,4} G_2$ during first-round computation. Computation by Backend 2 to form hash$(b_{2,3}{}^t b_{2,4} b_{1,3}{}^t b_{1,4} G_1)$ is done analogously. But if Backend 1 provides Backend 2 with $bb_{1,1} G_1$ instead of $bb_{1,1} G_2$, then [$(b_{2,3})^t b_{2,4} bb_{1,1} G_1$] as received from unwitting Backend 2 by Backend 1 would enable Backend 1 to generate hash$(b_{2,3}{}^t b_{2,4} b_{1,3}{}^t b_{1,4} G_1)$ as $b_{1,3}{}^t b_{1,4} [(b_{2,3})^t b_{2,4} bb_{1,1} G_1]$ (where the analogous attack would entail Backend 2 providing Backend 1 with $bb_{2,1} G_2$ instead of $bb_{2,1} G_1$, and Backend 2 generating hash$(b_{1,3}{}^t b_{1,4} \beta_{2,3}{}^t b_{2,4} G_2)$ as $\beta_{2,3}{}^t b_{2,4} [(b_{1,3})^t b_{1,4} bb_{2,1} G_2]$. To mitigate against that:

As an example of countermeasure (2): Suppose Backend 1 also provides Backend 2 with a fresh value of $bb_{1,2} G_1$ at the onset of each parameter resplit period; suppose Backend 2 also provides Backend 1 with a fresh value of $bb_{2,2} G_2$ at the onset of each resplit period. Then as a condition of continuing round two computation, Backend 1 verifies that $bb_{1,2}[bb_{2,1} G_1]=[bb_{2,1} bb_{1,2} G_1]$; analogously, as a condition of continuing round two computation, Backend 2 verifies that $bb_{2,2} [bb_{1,1} G_2]=[bb_{1,1} bb_{2,2} G_2]$.

In lieu of providing countermeasures such as these as safeguards, one can consider Embodiment 6 below as an alternative.

Embodiment 6

$f_1$=multiplication modulo n; $f_2$=multiplication modulo n; $f_3$=hash; $f_4$=hash; $\beta_{1,1}(t)=b_{1,1}{}^t$, and $\beta_{2,1}(t)=b_{2,1}{}^t$; $\beta_{1,2}=b_{1,2}$ and $\beta_{2,2}=b_{2,2}$; $\beta_{1,3}(t)=b_{1,3}{}^t$; $\beta_{2,3}(t)=b_{2,3}{}^t$; $\beta_{1,4}=b_{1,4}$; $\beta_{2,4}=b_{2,4}$; $\beta_{1,5}(t)=b_{1,5}{}^t$; $\beta_{2,5}(t)=b_{2,5}{}^t$; $\beta_{1,6}=b_{1,6}$; $\beta_{2,6}=b_{2,6}$; $G_1=G_2=G$.

Embodiment 6 TOKEN: TOKEN=$(b_{1,1} b_{2,1})^t b_{1,2} b_{2,2}$ hash$((b_{1,3} b_{2,3})^t b_{1,4} b_{2,4} G)$ hash$((b_{1,5} b_{2,5})^t b_{1,6} b_{2,6} G)$P.

Embodiment 6 is characterized, in part, by having each Backend withhold the use of at least some of its preferably secret parameters until the second round of both tokenization and detokenization.

Referring now to FIG. 12, stepping through tokenization processing, first the Requestor 1210 transmits eP to Backend 1 1215 at 1225, and transmits eP to Backend 2 1220 at 1230. Backend 1 1215 responds at 1235 with $e_1$ [eP] and $b_{1,3}{}^t b_{1,4}$ G, and Backend 2 1220 responds with $e_2$ [eP] and $b_{2,5}{}^t b_{2,6}$ G at 1240, thus completing round-one processing. Using $e_2$ eP and $b_{2,5}{}^t b_{2,6}$ G received via 1245, Backend 1 1215 transmits $e_1[e_2$ eP] and $(e_1^{-1} b_{1,1}{}^t b_{1,2}$ hash$(b_{1,5}{}^t b_{1,6} [b_{2,5}{}^t b_{2,6}$ G]))$ mod n to the Requestor 1210 at 1255, thus completing its role in round-two processing. Similarly, using $e_1$ eP and $b_{1,3}{}^t b_{1,4}$ G received via 1250, Backend 2 1220 transmits $e_2[e_1$ eP] and $(e_2^1 b_{2,1}{}^t b_{2,2}$ hash$(b_{2,3}{}^t b_{2,4} [b_{1,3}{}^t b_{1,4}$ G]))$ mod n to the Requestor 1210 at 1260, thus completing its role in round-two processing. At 1265, the Requestor 1210 verifies equality of the first output of 1255 and the first output of 1260. Also at 1255, the Requestor 1210 computes the product of: the second output of 1255, the second output of 1260 and the first output of 1255. Finally at 1265, the Requestor 1210 unblinds the resultant product to derive TOKEN=$e^{-1}$ [($e_1^{-1} b_{1,1}{}^t b_{1,2}$ hash$(b_{1,5}{}^t b_{1,6} b_{2,5}{}^t b_{2,6}$ G)) mod n] [($e_2^{-1} b_{2,1}{}^t b_{2,2}$ hash$(b_{2,3}{}^t b_{2,4} b_{1,3}{}^t b_{1,4}$ G)) mod n] [$e_1 e_2$ eP].

Referring now to FIG. 13, stepping through detokenization processing, first the Requestor 1310 transmits e'TOKEN to Backend 1 1315 at 1325, and transmits e'TOKEN to Backend 2 1320 at 1330. Backend 1 1315 responds at 1335 with $e'_1$[e'TOKEN] and $b_{1,3}{}^t b_{1,4}$ G, and Backend 2 1320 responds at 1340 with $e'_2$ [e'TOKEN] and $b_{2,5}{}^t b_{2,6}$ G, thus completing their role in round-one processing. Using $e'_2$ e'TOKEN and $b_{2,5}{}^t b_{2,6}$ G received via 1345, Backend 1 1315 transmits $e'_1 [e'_2 \text{ e'TOKEN}]$ and $(e'_1 b_{1,1}{}^t b_{1,2} \text{ hash}(b_{1,5}{}^t b_{1,6} [b_{2,5}{}^t b_{2,6} \text{ G}]))^{-1}$ mod n to the Requestor 1310 at 1355, thus completing its role in round-two processing. Using $e'_1$ e'TOKEN and $b_{1,3}{}^t b_{1,4}$ G received via 1350, Backend 2 1320 transmits $e'_2 [e'_1 \text{ e'TOKEN}]$ and $(e'_2 b_{2,1}{}^t b_{2,2} \text{ hash}(b_{2,3}{}^t b_{2,4} [b_{1,3}{}^t b_{1,4} \text{ G}]))^{-1}$ mod n to the Requestor 1310 at 1360, thus completing its role in round-two processing. At 1365, the Requestor 1310 verifies equality of the first output of 1355 and the first output of 1360. Also at 1365, the Requestor 1310 computes the product of: the second output of 1355, the second output of 1360 and the first output of 1355. Finally at 1365, the Requestor 1310 unblinds the resultant product to derive $P = e'^{-1} [(e'_1 b_{1,1}{}^t b_{1,2} \text{ hash}(b_{1,5}{}^t b_{1,6} b_{2,5}{}^t b_{2,6} \text{ G}))^{-1} \text{ mod n}] [(e'_2 b_{2,1}{}^t b_{2,2} \text{ hash}(b_{2,3}{}^t b_{2,4} b_{1,3}{}^t b_{1,4} \text{ G}))^{-1} \text{ mod n}] [e'_1 e'_2 \text{ e'TOKEN}]$.

Detokenization Round-One Backend Processing:
Backend 1: $e'_1 [\text{e'TOKEN}]$; $b_{1,3}{}^t b_{1,4}$ G
Backend 2: $e'_2 [\text{e'TOKEN}]$; $b_{2,5}{}^t b_{2,6}$ G Detokenization Round-Two Backend Processing:
Backend 1: $e'_1 [e'_2 \text{ e'TOKEN}]$—provide to Requestor; $b_{1,5}{}^t b_{1,6} [b_{2,5}{}^t b_{2,6} \text{ G}]$; $(e'_1 b_{1,1}{}^t b_{1,2} \text{ hash}(b_{1,5}{}^t b_{1,6} [b_{2,5}{}^t b_{2,6} \text{ G}]))^{-1}$ mod n—provide to Requestor
Backend 2: $e'_2 [e'_1 \text{ e'TOKEN}]$-provide to Requestor; $\beta_{2,3}{}^t b_{2,4} [b_{1,3}{}^t b_{1,4} \text{ G}]$; $(e'_2 b_{2,1}{}^t b_{2,2} \text{ hash}(b_{2,3}{}^t b_{2,4} [b_{1,3}{}^t b_{1,4} \text{ G}]))^{-1}$ mod n—provide to Requestor Detokenization final Requestor processing: Verify that $[e'_1 e'_2 \text{ e'TOKEN}]$ received from Backend 1 = $[e'_2 e'_1 \text{ e'TOKEN}]$ received from Backend 2. Recover $P = e'^{-1} (e'_1 b_{1,1}{}^t b_{1,2} \text{ hash}(b_{1,5}{}^t b_{1,6} b_{2,5}{}^t b_{2,6} \text{ G}))^{-1} \text{ mod n}] [(e'_2 b_{2,1}{}^t b_{2,2} \text{ hash}(b_{2,3}{}^t b_{2,4} b_{1,3}{}^t b_{1,4} \text{ G}))^{-1} \text{ mod n}] [e'_1 e'_2 \text{ e'TOKEN}]$.

Optional Add-On to Embodiment 6

Within Embodiment 6 as well as other embodiments involving two or more rounds, the following assurance mechanism can be used if the Requestor supplies both Backends with the same eP, where the intent is that each Backend can verify whether the opposite Backend has operated within the first round, at least in part, by applying a scalar multiple known to it to eP:

For example, the Requestor supplies eP, $ee_1$ and $ee_2$ eP to Backend 1, and eP, $ee_2$ and $ee_1$ eP to Backend 2, where information about $ee_1$ other than $ee_1$ eP is not supplied to Backend 2 and information about $ee_2$ other than $ee_2$ eP is not supplied to Backend 1. Backend 1 aborts performance of round-two computation upon $[\text{Point}_{2,1}]$ if $ee_1 [\text{Point}_{2,1}]$ $[\text{Point}_{2,2}]$ for received values $[\text{Point}_{2,1}]$ and $[\text{Point}_{2,2}]$. Analogously, Backend 2 aborts performance of round-two computation upon $[\text{Point}_{1,1}]$ if $ee_2 [\text{Point}_{1,1}]$ $[\text{Point}_{1,2}]$ for received values $[\text{Point}_{1,1}]$ and $[\text{Point}_{1,2}]$. The corresponding optional add-on for detokenization can be applied, whether or not the optional tokenization add-on has been applied during tokenization that resulted in the TOKEN values used during detokenization. The Requestor supplies e'TOKEN, $ee'_1$ and $ee'_2$ e'TOKEN to Backend 1, and e'TOKEN, $ee'_2$ and $ee'_1$ e'TOKEN to Backend 2. Note that there is a degree of similarity between this example of the optional add-on technique and the earlier-presented example of countermeasure (2).

Multiplex Extension/Alternative Embodiment 6

Multiple TOKENs may be generated via a single run of the tokenization protocol if [eP] received from the Requestor by Backend 1 and Backend 2 for first-round processing is replaced by a sequence $[eP_1, eP_2, \ldots, eP_m]$ for some integer m greater than 1. More generally, in lieu of enabling the Requestor to verify that $[e_1 e_2 eP_1, e_1 e_2 eP_2, \ldots, e_1 e_2 eP_m] = [e_2 e_1 eP_1, e_2 e_1 eP_2, \ldots, e_2 e_1 eP_m]$, the Requestor can distribute $[eP_1, \ldots, eP_k]$ for some non-negative integer k (where $[eP_1, \ldots, eP_0]$ is vacuous) to one of the Backends for it to act upon and return a result, and distribute $[eP_{k+1}, \ldots, eP_m]$ to the other Backend for it to act upon and return a result, for some positive integer m. Detokenization can be addressed analogously (using $[\text{e'TOKEN}_1, \ldots, \text{e'TOKEN}_k]$ and $[\text{e'TOKEN}_{k+1}, \ldots, \text{e'TOKEN}_m]$), independently of if/how this technique was applied during tokenization.

Two mechanisms intended towards assuring traversal of Backend-generated ephemeral blinding factors across first and second rounds:

(i): In this example embodiment, hash-based message authentication code (HMAC) and encryption (Enc) keys are deterministically derived from each Backend's current Pohlig-Hellman values using a preferably NIST-approved key derivation function (KDF). Each Backend's HMAC keys for tokenization and detokenization are computationally independent of each other. This is also true of the symmetric Enc keys. When an HMAC value is generated, it is placed in that Backend's non-volatile storage and is deleted from that storage if/when that value is returned to it within the second round of the corresponding tokenization/detokenization. If a putative HMAC value returned to a Backend does not appear in that Backend's storage, that Backend preferably aborts that round's computation. If a putative HMAC value returned to a Backend fails to verify over the inserted arguments (including those obtained by decrypting a received value putatively resulting from encryption using the Enc key), that Backend preferably aborts that round's computation. Each Backend's storage of HMAC values is erased upon onset of a new resplit interval. With regard to Embodiment 5 and Embodiment 6, arguments that are inserted for HMAC value computation can include, in particular, the purportedly current value of the ephemeral blinding factor $e_1$ or $e_2$, respectively.

(ii): Rather than the Backends sending HMAC values and/or Enc values and evaluating received values purported to be HMAC values and/or Enc values, values that need to traverse across multiple rounds can be derived via deterministic computation. As an example, Backend 1 generates $e_1$ as HKDF-Expand($K_1$, info=[requestorID, t, eP], L) mod n [HKDF-Expand($K_2$, info=[requestorID, t, eP], L) mod n], where $K_1$ is a Pohlig-Hellman parameter-derived key derivation key. $K_1$ can be derived using HKDF-Extract. Alternatively, generation of $K_1$ and/or $e_1$ can utilize KMAC. Within the expansion, eP can be represented as the octet string comprising the x-coordinate of the point. HKDF-Expand generates L octets as output, where L is preferably at least 8 greater than the octet-length of n to reduce bias of $e_1$. The same key derivation key $K_1$ can be used for both tokenization and detokenization, e.g., if strings signifying "tokenization" and "detokenization" are added as respective arguments of HKDF-Expand or KMAC. The analogous formulation for detokenization is $e_1 = $ HKDF-Expand($K_1$, info=[requestorID, t, e'TOKEN], L) mod n. A reference for Hash-based Key Derivation Function (HKDF) is https://doi.org/10.17487/RFC5869. A reference for KECCAK Message Authentication Code (KMAC) is https://nvlpubs.nist.gov/nistpubs/SpecialPublications/NIST.SP.800-185.pdf.

Relevant to FIG. 14 and FIG. 16, by one approach, at least one tokenization processor is used to generate a TOKEN and a KEY_TOKEN upon a request from a Requestor.

Referring now to FIG. 14, stepping through a TOKEN-plus-KEY_TOKEN version of tokenization processing as an alternative to Embodiment 1, first the Requestor 1410 transmits an ephemerally blinded representation of Data, i.e., eP, to Backend 1 1415 at 1425 and transmits eP to Backend 2 1420 at 1430. Backend 1 1415 responds at 1435 with $b_1$ [eP] and $d_1$ [eP], and Backend 2 220 responds at 240 with $b_2$ [eP] and $d_2$ [eP]. At 1445, the Requestor 1410 performs two addition operations and two unblinding operations to derive TOKEN=$e^{-1}$ ([$b_1$ eP]+[$b_2$ eP])=$(b_1+b_2)$P and KEY_TOKEN=$e^{-1}$ ([$d_1$ eP]+[$d_2$ eP])=$(d_1+d_2)$P, respectively.

Relevant to FIG. 15 and FIG. 17, by one approach, at least one tokenization processor is used to attempt recovery of a KEY_TOKEN from a purported TOKEN received from a Requestor that may or may not be the same as a Requestor that requested generation of the KEY_TOKEN. The tokenization processors that attempt recovery of the KEY_TOKEN may overlap with the tokenization processors that generated the TOKEN. The purported TOKEN may be submitted by the Requestor in blinded form as depicted FIG. 15 and FIG. 17.

Referring now to FIG. 15, stepping through a TOKEN-to-KEY_TOKEN version of detokenization processing as an alternative to Embodiment 1, first the Requestor 1510 transmits e'TOKEN, to Backend 1 1515 at 1525 and transmits e'TOKEN to Backend 2 1520 at 1530. Backend 1 1515 responds at 1535 with $b'_1$ [e'TOKEN], and Backend 2 1520 responds at 1540 with $b'_2$ [e'TOKEN], where $(b_1+b_2)$ $(b'_1+b'_2)=(d_1+d_2)$ mod n. At 1445, the Requestor 1410 performs an addition operation over the output of 1535 and the output of 1540 followed by an unblinding operation over the resultant sum to derive KEY_TOKEN=$(b'_1+b'_2)$ $(b_1+b_2)$ TOKEN=$(d_1+d_2)$P.

Referring now to FIG. 16, stepping through a TOKEN-plus-KEY_TOKEN version of tokenization processing as an alternative to Embodiment 6, first the Requestor 1610 transmits eP to Backend 1 1615 at 1625, and transmits eP to Backend 2 1620 at 1630. Backend 1 1615 responds at 1635 with $e_1$ [eP], $e^+_1$ [eP], $b_{1,3}{}^t b_{1,4}$ G and $d_{1,3}{}^t d_{1,4}$ G, and Backend 2 1620 responds with $e_2$ [eP], $e^+_2$ [eP], $b_{2,5}{}^t b_{2,6}$ G and $d_{2,5}{}^t d_{2,6}$ G at 1640, where $e_1$ and $e^+_1$ are ephemeral blinding factors generated by Backend 1 1615 and $e_2$ and $e^+_2$ are ephemeral blinding factors generated by Backend 2 1620. This completes round-one processing by Backend 1 1615 and Backend 2 1620. $e_1$ and $e^+_1$ may be identical or distinct and are preferably generated as discussed previously for generation of $e_1$. $e_2$ and $e^+_2$ may be identical or distinct and are preferably generated as discussed previously for generation of $e_2$. Using $e_2$ eP, $e^+_2$ eP, $b_{2,5}{}^t b_{2,6}$ G and $d_{2,5}{}^t d_{2,6}$ G received via 1645, Backend 1 1615 transmits $e_1$ [$e_2$ eP], $e^+_1$ [$e^+_2$ eP], $(e_1^{-1} b_{1,1}{}^t b_{1,2}$ hash$(b_{1,5}{}^t b_{1,6}$ [$b_{2,5}{}^t b_{2,6}$ G]))mod n and $(e^+_1{}^{-1} d_{1,1}{}^t d_{1,2}$ hash$(d_{1,5}{}^t d_{1,6}$ [$d_{2,5}{}^t d_{2,6}$ G])) mod n to the Requestor 1610 at 1655, thus completing its role in round-two processing. Similarly, using $e_1$ eP, $e^+_1$ eP, $b_{1,3}{}^t b_{1,4}$ G and $d_{1,3}{}^t d_{1,4}$ G received via 1650, Backend 2 1620 transmits $e_2$ [$e_1$ eP], $e^+_2$ [$e^+_1$ eP], $(e_2^{-1} b_{2,1}{}^t b_{2,2}$ hash$(b_{2,3}{}^t b_{2,4}$ [$b_{1,3}{}^t b_{1,4}$ G])) mod n and $(e^+_2{}^{-1} d_{2,1}{}^t d_{2,2}$ hash$(d_{2,3}{}^t d_{2,4}$ [$d_{1,3}{}^t d_{1,4}$ G])) mod n to the Requestor 1610 at 1660, thus completing its role in round-two processing. At 1665, the Requestor 1610 verifies equality of the first output of 1655 and the first output of 1660, and equality of the second output of 1655 and the second output of 1660, respectively. Also at 1665, the Requestor 1610 computes the product of: the third output of 1655, the third output of 1660 and the first output of 1655. The Requestor 1610 unblinds the resultant product to derive TOKEN=$e^{-1}$ [$(e_1^{-1} b_{1,1}{}^t b_{1,2}$ hash$(b_{1,5}{}^t b_{1,6}$ $b_{2,5}{}^t b_{2,6}$ G)) mod n] [$(e_2^{-1} b_{2,1}{}^t b_{2,2}$ hash$(b_{2,3}{}^t b_{2,4} b_{1,3}{}^t b_{1,4}$ G)) mod n] [$e_1 e_2$ eP]=$(b_{1,1} b_{2,1})^t b_{1,2} b_{2,2}$ hash$((b_{1,3} b_{2,3})^t b_{1,4} b_{2,4}$ G) hash$((b_{1,5} b_{2,5})^t b_{1,6} b_{2,6}$ G)P. Further at 1665, the Requestor 1610 computes the product of: the fourth output of 1655, the fourth output of 1660 and the second output of 1655. Finally at 1665, the Requestor 1610 unblinds the resultant product to derive KEY_TOKEN=$e^{-1}$ [$(e^+_1{}^{-1} d_{1,1}{}^t d_{1,2}$ hash$(d_{1,5}{}^t d_{1,6} d_{2,5}{}^t d_{2,6}$ G)) mod n] [$(e^+_2{}^{-1} d_{2,1}{}^t d_{2,2}$ hash$(d_{2,3}{}^t d_{2,4} d_{1,3}{}^t d_{1,4}$ G)) mod n] [$e^+_1 e^+_2$ eP]=$(d_{1,1} d_{2,1})^t d_{1,2} d_{2,2}$ hash$((d_{1,3} d_{2,3})^t d_{1,4} d_{2,4}$ G) hash$((d_{1,5} d_{2,5})^t d_{1,6} d_{2,6}$ G)P.

Referring now to FIG. 17, stepping through a TOKEN-to-KEY_TOKEN version of detokenization processing as an alternative to Embodiment 6, first the Requestor 1710 transmits e'TOKEN to Backend 1 1715 at 1725, and transmits e'TOKEN to Backend 2 1720 at 1730. Backend 1 1715 responds at 1735 with $e'_1$[e'TOKEN], $b_{1,3}{}^t b_{1,4}$ G and $d_{1,3}{}^t d_{1,4}$ G, and Backend 2 1720 responds with $e'_2$ [e'TOKEN], $b_{2,5}{}^t b_{2,6}$ G and $d_{2,5}{}^t d_{2,6}$ G at 1740, where $e_1$ is an ephemeral blinding factor generated by Backend 1 1715 and $e_2$ is an ephemeral blinding factor generated by Backend 2 1720. This completes round-one processing by Backend 1 1715 and Backend 2 1720. $e'_1$ and $e'_2$ are preferably generated as discussed previously for such parameters. Using $e'_2$ e'TOKEN, $b_{2,5}{}^t b_{2,6}$ G and $d_{2,5}{}^t d_{2,6}$ G received via 1745, Backend 1 1715 transmits $e'_1$ [$e'_2$ e'TOKEN] and $(e'_1{}^{-1}(b_{1,1}{}^{-1} d_{1,1})^t$ $b_{1,2}{}^{-1} d_{1,2}$ (hash$(b_{1,5}{}^t b_{1,6}$ [$b_{2,5}{}^t b_{2,6}$ G]))$^{-1}$ hash$(d_{1,5}{}^t d_{1,6}$ [$d_{2,5}{}^t d_{2,6}$ G])) mod n to the Requestor 1710 at 1755, thus completing its role in round-two processing. Similarly, using $e'_1$ e'TOKEN, $b_{1,3}{}^t b_{1,4}$ G and $d_{1,3}{}^t d_{1,4}$ G received via 1750, Backend 2 1720 transmits $e'_2$ [$e'_1$ e'TOKEN] and $(e'_2{}^{-1}$ $(b_{2,1}{}^{-1} d_{2,1})^t b_{2,2}{}^{-1} d_{2,2}$ (hash$(b_{2,3}{}^t b_{2,4}$ [$b_{1,3}{}^t b_{1,4}$ G]))$^{-1}$ hash $(d_{2,3}{}^t d_{2,4}$ [$d_{1,3}{}^t d_{1,4}$ G])) mod n to the Requestor 1710 at 1760, thus completing its role in round-two processing. At 1765, the Requestor 1710 verifies equality of the first output of 1755 and the first output of 1760. Also at 1765, the Requestor 1710 computes the product of: the second output of 1755, the second output of 1760 and the first output of 1755. The Requestor unblinds the resultant product to recover KEY_TOKEN=$e'^{-1}$ [$(e'_1{}^{-1}(b_{1,1}{}^{-1} d_{1,1})^t b_{1,2}{}^{-1} d_{1,2}$ (hash$(b_{1,5}{}^t b_{1,6}$ [$b_{2,5}{}^t b_{2,6}$ G]))$^{-1}$ hash$(d_{1,5}{}^t d_{1,6}$ [$d_{2,5}{}^t d_{2,6}$ G])) mod n] [$(e'_2{}^{-1}(b_{2,1}{}^{-1} d_{2,1})^t b_{2,2}{}^{-1} d_{2,2}$ (hash$(b_{2,3}{}^t b_{2,4}$ [$b_{1,3}{}^t b_{1,4}$ G]))$^{-t}$ hash$(d_{2,3}{}^t d_{2,4}$ [$d_{1,3}{}^t d_{1,4}$ G])) mod n] [$e'_1 e'_2$ e'TOKEN]=$(d_{1,1} d_{2,1})^t d_{1,2} d_{2,2}$ hash$((d_{1,3} d_{2,3})^t d_{1,4} d_{2,4}$ G) hash$((d_{1,5} d_{2,5})^t d_{1,6} d_{2,6}$ G)P.

Referring now to FIG. 18, stepping through a token translation version of tokenization processing as a supplement to Embodiment 3 that results in a TOKEN under scope label $t_{new}$ using a TOKEN under scope label t as input, first the Requestor 1810 transmits eTOKEN to Backend 1 1815 at 1825, and transmits eTOKEN to Backend 2 1820 at 1830. Backend 1 1815 responds at 1835 with $b_{1,1}{}^{t_{new}-t}$ [eTOKEN] and $(b_{1,1}{}^t b_{1,2})^{-1} d_{1,1}{}^{t_{new}} d_{1,2}$ [eTOKEN], and Backend 2 1820 responds with $b_{2,1}{}^{t_{new}-t}$ [eTOKEN] and $(b_{2,1}{}^t b_{2,2})^{-1} d_{2,1}{}^{t_{new}} d_{2,2}$ [eTOKEN] at 1840. This completes round-one processing by Backend 1 1815 and Backend 2 1820. Using $b_{2,1}{}^{t_{new}-t}$ eTOKEN and $(b_{2,1}{}^t b_{2,2})^{-1} d_{2,1}{}^{t_{new}} d_{2,2}$ eTOKEN received via 1845, Backend 1 1815 transmits $b_{1,1}{}^{t_{new}-t}$ [$b_{2,1}{}^{t_{new}-t}$ eTOKEN] and $(b_{1,1}{}^t b_{1,2})^{-1} d_{1,1}{}^{t_{new}} d_{1,2}$ [$(b_{2,1}{}^t b_{2,2})^{-1} d_{2,1}{}^{t_{new}} d_{2,2}$ eTOKEN] to the Requestor 1810 at 1855, thus completing its role in round-two processing. Similarly, using $b_{1,1}{}^{t_{new}-t}$ eTOKEN and $(b_{1,1}{}^t b_{1,2})^{-1} d_{1,1}{}^{t_{new}} d_{1,2}$ eTOKEN received via 1850, Backend 2 1820 transmits $b_{2,1}{}^{t_{new}-t}$ [$b_{1,1}{}^{t_{new}-t}$ eTOKEN] and $(b_{2,1}{}^t b_{2,2})^{-1} d_{2,1}{}^{t_{new}} d_{2,2}$ [$(b_{1,1}{}^t b_{1,2})^{-1} d_{1,1}{}^{t_{new}} d_{1,2}$ eTOKEN] to the Requestor 1810 at 1860, thus completing its role in round-two processing. At 1865, the Requestor 1810 verifies equality of the first output of 1855 and the first output of 1860, and verifies equality of the second output of 1855 and the second output of 1860, respectively. Also at 1865, the Requestor 1810 unblinds the first output of 1855 to derive $TOKEN_{new} = e^{-1} [b_{1,1}{}^{t_{new}-t} b_{2,1}{}^{t_{new}-t} eTOKEN] = (b_{1,1} b_{2,1})^{t_{new}-t} (b_{1,1} b_{2,1})^t b_{1,2} b_{2,2} P = (b_{1,1} b_{2,1})^{t_{new}} b_{1,2} b_{2,2} P$. Finally at 1865, the Requestor 1810 unblinds the second output of 1855 and then applies a truncated hash function to the result of unblinding to derive $checkBits_{new} = truncHash(e^{-1} [(b_{1,1}{}^t b_{1,2})^{-1} d_{1,1}{}^{t_{new}} d_{1,2} (b_{2,1}{}^t b_{2,2})^{-1} d_{2,1}{}^{t_{new}} d_{2,2} eTOKEN]) = truncHash((b_{1,1}{}^t b_{1,2})^{-1} d_{1,1}{}^{t_{new}} d_{1,2} (b_{2,1}{}^t b_{2,2})^{-1} d_{2,1}{}^{t_{new}} d_{2,2} (b_{1,1} b_{2,1})^t b_{1,2} b_{2,2} P) = truncHash((b_{1,1} b_{2,1})^{-t} (b_{1,1} b_{2,1})^t (b_{1,2} b_{2,2})^{-1} b_{1,2} b_{2,2} (d_{1,1} d_{2,1})^{t_{new}} d_{1,2} d_{2,2} P) = truncHash((d_{1,1} d_{2,1})^{t_{new}} d_{1,2} d_{2,2} P)$.

As an alternative to the processing depicted by FIG. 18, an enhanced flow can be used to have Backend 1 and Backend 2 regenerate the original checkBits value associated with scope t as a check against a checkBits value submitted by the Requestor, where matching of the submitted and the recomputed checkBits values is used as a precondition of release by Backend 1 and Backend 2 of their round-two outputs.

Referring now to FIG. 19, stepping through a token translation version of tokenization processing as a supplement to Embodiment 6 that results in a TOKEN under scope label $t_{new}$ using a TOKEN under scope label t as input, first the Requestor 1910 transmits eTOKEN to Backend 1 1915 at 1925, and transmits eTOKEN to Backend 2 1920 at 1930. Backend 1 1915 responds at 1935 with $e_1$ [eTOKEN], $b_{1,3}{}^t b_{1,4}$ G and $b_{1,3}{}^{t_{new}} b_{1,4}$ G, and Backend 2 1920 responds with $e_2$ e[TOKEN], $b_{2,5}{}^t b_{2,6}$ G and $b_{2,5}{}^{t_{new}} b_{2,6}$ G at 1940. This completes round-one processing by Backend 1915 and Backend 2 1920. Using $e_2$ eTOKEN, $b_{2,5}{}^t b_{2,6}$ G and $b_{2,5}{}^{t_{new}} b_{2,6}$ G received via 1945, Backend 1 1915 transmits $e_1$ [$e_2$ eTOKEN] and $e_1^{-1} b_{1,1}{}^{t_{new}-t} (hash(b_{1,5}{}^t b_{1,6} [b_{2,5}{}^t b_{2,6} G]))^{-1} hash(b_{1,5}{}^{t_{new}} b_{1,6} [b_{2,5}{}^{t_{new}} b_{2,6} G])$ to the Requestor 1910 at 1955, thus completing its role in round-two processing. Similarly, using $e_1$ eTOKEN, $b_{1,3}{}^t b_{1,4}$ G and $b_{1,3}{}^{t_{new}} b_{1,4}$ G received via 1950, Backend 2 1920 transmits $e_2$ [$e_1$ eTOKEN] and $e_2$-t $b_{2,1}{}^{t_{new}-t} (hash(b_{2,3}{}^t b_{2,4} [b_{1,3}{}^t b_{1,4} G]))^{-1}$ hash $(b_{2,3}{}^{t_{new}} b_{2,4} [b_{1,3}{}^{t_{new}} b_{1,4} G])$ to the Requestor 1910 at 1960, thus completing its role in round-two processing. At 1965, the Requestor 1910 verifies equality of the first output of 1955 and the first output of 1960. Also at 1965, the Requestor 1910 computes the product of the second output of 1955, the second output of 1960 and the first output of 1955. Finally at 1965, the Requestor 1910 unblinds the resultant product to derive $TOKEN_{new} = e^{-1} [(e_1^{-1} b_{1,1}{}^{t_{new}-t} (hash(b_{1,5}{}^t b_{1,6} b_{2,5}{}^t b_{2,6} G))^{-1} hash(b_{1,5}{}^{t_{new}} b_{1,6} b_{2,5}{}^{t_{new}} b_{2,6} G))$ mod n] $[(e_2^{-1} b_{2,1}{}^{t_{new}-t} (hash(b_{2,3}{}^t b_{2,4} b_{1,3}{}^t b_{1,4} G))^{-1}$ hash $(b_{2,3}{}^{t_{new}} b_{2,4} [b_{1,3}{}^{t_{new}} b_{1,4} G]))$ mod n] $[e_1 e_2$ eTOKEN]$= (b_{1,1} b_{2,1})^{t_{new}-t} (hash((b_{1,5} b_{2,5})^t b_{1,6} b_{2,6} G))^{-1} hash((b_{1,5} b_{2,5})^{t_{new}} b_{1,6} b_{2,6} G) (hash((b_{1,3} b_{2,3})^t b_{1,4} b_{2,4} G))^{-1} hash((b_{1,3} b_{2,3})^{t_{new}} b_{1,4} b_{2,4} G) (b_{1,1} b_{2,1})^t b_{1,2} b_{2,2} hash((b_{1,3} b_{2,3})^t b_{1,4} b_{2,4} G) hash((b_{1,5} b_{2,5})^t b_{1,6} b_{2,6} G) P = (b_{1,1} b_{2,1})^{t_{new}} b_{1,2} b_{2,2} hash((b_{1,3} b_{2,3})^{t_{new}} b_{1,4} b_{2,4} G) hash((b_{1,5} b_{2,5})^{t_{new}} b_{1,6} b_{2,6} G) P$.

Relevant to FIG. 20 with the resultant tokenization processor secrets usable for tokenization as depicted in FIG. 2 and FIG. 4, and detokenization as depicted in FIG. 3 and FIG. 5, by one approach, a third party sets up a plurality of tokenization processors, wherein the third party computes an inverse of a first sum of first tokenization processor secrets and splits, preferably randomly, the inverse as a second sum, that is distinct from the first sum, of second tokenization processor secrets. Moreover, the third party transmits at least one of the first tokenization processor secrets and at least one of the second tokenization processor secrets to a first tokenization processor, and does not transmit these tokenization processor secrets to a second tokenization processor. The third party also transmits to the second tokenization processor at least one of the first tokenization processor secrets that differs from tokenization processor secrets that are sent to the first tokenization processor, and at least one of the second tokenization processor secrets that differs from tokenization processor secrets that are sent to the first tokenization processor. Further, at least one of the tokenization processor secrets used by the first tokenization processor for tokenization processing, as derived from the tokenization processor secrets received by the first tokenization processor from the third party is different than at least one of the tokenization processor secrets used by the second tokenization processor for tokenization processing, as derived from the tokenization processor secrets received by the second tokenization processor from the third party.

Referring now to FIG. 20, $3^{rd}$ party 2030 (aka third party), communicates with Backend 1 2010 and Backend 2 2020 in order to execute its role in third-party setup usable, in particular, for Embodiment 1 tokenization and detokenization as depicted in FIG. 2 and FIG. 3, respectively (where $(b'_1 + b'_2) (b_1 + b_2) = 1$ mod n), and for Embodiment 2 tokenization and detokenization as depicted in FIG. 4 and FIG. 5, respectively (where $(b'_{1,2} + b'_{2,2}) (b_{1,2} + b_{2,2}) = 1$ mod n). At 2035, $3^{rd}$ party 2030 generates initial tokenization processor secrets $b_1$ and $b_2$, and computes their modulo n sum at 2040. At 2045, $3^{rd}$ party 2030 inverts the sum and splits it into initial tokenization processor secrets $b'_1$ and $b'_2$. The distribution of $b_1$ and $b'_1$ to Backend 1 2010, and of $b_2$ and $b'_2$ to Backend 2 2020 is depicted at 2050 and 2055, respectively. At 2060, Backend 1 2010 and Backend 2 2020 agree on parameters m, j and k that preferably are not exposed to $3^{rd}$ party 2030. At 2065, Backend 1 2010 uses j to resplit the initial collective secret $(b_1 + b_2)$ mod n into $b_1 + j$ and $b_2 - j$, and uses m as a multiplier so that the new value of $(b_1 + b_2)$ mod n is preferably independent of the initial value of $(b_1 + b_2)$ mod n that was and may still be available to $3^{rd}$ party 2030. The value of m cannot be reconstructed by potential collusion between $3^{rd}$ party 2030 and either Backend 1 2010 (using the initial value of $b_1$ and the new value of $b_1$) or Backend 2 2020 (using the initial value of $b_2$ and the new value of $b_2$) once the value of j is no longer accessible because it has been deleted. Similarly at 2065, Backend 1 2010 uses k to resplit $(b'_1 + b'_2)$ mod n and $m^1$ to preferably render the new value of $(b'_1 + b'_2)$ independent of its initial value. $m^{-1}$ is used in order to preserve the equality: $(b'_1 + b'_2) (b_1 + b_2) = 1$ mod n. At 2070, the operations analogous to those of 2065 are carried out by Backend 2 2020. At 2075, Backend 1 2010 stores the new values of $b_1$ and $b'_1$. At 2080, Backend 2 2020 stores the new values of $b_2$ and $b'_2$.

Relevant to FIG. 21, by one approach, a third party sets up a plurality of tokenization processors, wherein the third party computes an inverse of a first sum of first tokenization processor secrets, and derives a value from the inverse and from second tokenization processor secrets. The third party then splits that value, preferably randomly, as a second sum of second tokenization processor secrets that is distinct from the first sum. Further, the first tokenization processor secrets and the second tokenization processor secrets differ in at least one tokenization processor secret.

Referring now to FIG. 21, $3^{rd}$ party 2130 (aka third party), communicates with Backend 1 2110 and Backend 2 2120 in order to execute its role in third-party setup usable, in particular, for TOKEN-plus-KEY_TOKEN alternative version of Embodiment 1 tokenization processing as depicted in FIG. 14, and TOKEN-to-KEY_TOKEN alternative version of detokenization processing depicted in FIG. 15, respectively (where $(b_1+b_2)(b'_1+b'_2)=(d_1+d_2) \mod n$). At 2135, $3^{rd}$ party 2130 generates initial tokenization processor secrets $b_{1,1}$ $b_2$, $d_1$ and $d_2$ and determines the modulo n product of the inverse of the sum of $b_1$ and $b_2$ and the sum of $d_1$ and $d_2$ at 2140. At 2145, $3^{rd}$ party 2130 splits the resultant product of 2140 into initial tokenization processor secrets $b'_1$ and $b'_2$. The distribution of $b_1$, $d_1$ and $b'_1$ to Backend 1 2110, and of $b_2$, $d_2$ and $b'_2$ to Backend 2 2120 is depicted at 2150 and 2155, respectively. At 2160, Backend 1 2110 and Backend 2 2120 agree on parameters m, m', j, j' and k that preferably are not exposed to $3^{rd}$ party 2130. At 2165, Backend 1 2110 uses j to resplit the initial collective secret $(b_1+b_2) \mod n$ into $b_1+j$ and $b_2-j$, and uses m as a multiplier so that the new value of $(b_1+b_2) \mod n$ is preferably independent of the initial value of $(b_1+b_2) \mod n$ that was and may still be available to $3^{rd}$ party 2130. The value of m cannot be reconstructed by potential collusion between $3^{rd}$ party 2130 and either Backend 1 2110 (using the initial value of $b_1$ and the new value of $b_1$) or Backend 2 2120 (using the initial value of $b_2$ and the new value of $b_2$) once the value of j is no longer accessible because it has been deleted. Similarly at 2165, Backend 1 2110 uses j' to resplit $(d_1+d_2) \mod n$ and m' to preferably render the new value of $(d_1+d_2)$ independent of its initial value. Further at 2165, Backend 1 2110 uses k to resplit $(b'_1+b'_2) \mod n$ and $m^{-1}m'$ to preferably render the new value of $(b'_1+b'_2)$ independent of its initial value. $m^{-1}m'$ is used in order to preserve the equality: $(b_1+b_2)(b'_1+b'_2)=(d_1+d_2) \mod n$. At 2170, the operations analogous to those of 2165 are carried out by Backend 2 2120. At 2175, Backend 1 2010 stores the new values of $b_1$, $d_1$ and $b'_1$. At 2180, Backend 2 2120 stores the new values of $b_2$, $d_2$ and $b'_2$.

The following algorithm expresses an example embodiment of deriving an elliptic curve point P from Data as source for use with direct tokenization of Data:

Below, Data_len_var is the field (of byte-length denoted by Data_len_var length) that indicates the value of Data_len (which denotes the byte-length of the input Data).

1. Convert the Data_len to a fixed-length byte string (with a length of 1 byte).
2. Determine rand_len in bytes by computing (for example elliptic curves P-256, P-384 and P-521, respectively):
   a. For P-256: rand_len=32–Data_len–(Data_len_var length).
   b. For P-384: rand_len=48–Data_len–(Data_len_var length).
   c. For P-521: rand_len=66–Data_len–(Data_len_var length).

Preferably, rand_len is at least 8 bytes.

3. Use HKDF-Extract to generate rand and truncate it to rand_len bytes:
   a. rand=HKDF-Extract(salt=counter, input keying material (IKM)=Data), where counter=0 on the first run and is incremented with each successive run.
   b. rand_trun=truncate(rand, rand_len).
4. Use HKDF-Expand to generate vector where rand_trun is the input keying material and the vector length is the Data_len:
   a. vector=HKDF-Expand(rand_trun, key length=Data_len).
5. Compute Data_xor=Data .XOR. vector.
6. Concatenate rand_trun, Data_xor and Data_len_var, and convert the resultant bytes to an integer to derive x_0:
   a. x_0=(rand_trun||Data_xor||Data_len_var).
7. Determine if $((x\_0)^3-3x\_0+b) \pmod{p}$ is a quadratic residue, say $y^2 \pmod{p}$. If not, increment counter and do steps 4 through 7 over. Once a valid x_0 is found, define x_found=x_0. Note that there are (p+1)/2 quadratic residues (including 0). Therefore, since every time an x_0 is tried there is $\frac{1}{2}+\frac{1}{2}p\sim\frac{1}{2}$ chance that x_0 yields a quadratic residue, this loop should not be extensive.
   a. The following check should preferably be added in order to avoid bias: Reject any candidate x-coordinate values that involve modulo p wrap-around, i.e., for which $2^{256}>x\_0>p-1$. This bias-avoidance technique has a negligible impact on computation time. The proof here shows the probability of getting a value that does not pass this check on the first try is extremely low in the case of P-256. This proof is also described in U.S. Pat. No. 11,374,910. Although not further described herein, the method for determining this probability is the same for curves P-224, P-384, and P-521, with analogous results.
      i. $2^{-33}=2^{223}/2^{256}<(2^{256}-p)/2^{256}=(2^{256}-(2^{256}-2^{224}+2^{192}+2^{96}-1)/2^{256}\ 2^{224}/2^{256}=2^{-32}$.
8. Denote by y_found the smaller of y and –y reduced mod p, such that
   a. $(y^2=(x\_found)^3-3x\_found+b) \pmod{p}$.
9. The point P is defined as (x_found, y_found).

Referring now to FIG. 22 that encapsulates the steps above for generating P from Data as flow 2200: at 2205, rand is generated from Data and the current counter value that can be initialized at, say, 0. At 2210, rand is truncated to rand_len bytes. At 2215, vector is generated by expanding the resultant value of 2210 to the length of Data. At 2220, vector is exclusive-or added to Data. At 2225, an x-coordinate is formed to generate a candidate value of P. At 2230, the candidate value of P is checked for its validity as a point on the intended elliptic curve. Then, either the flow advances to 2235 or the counter value is incremented and fed back into 2205.

Referring now to FIG. 23 that depicts flow 2300, an alternative decision tree for elliptic curve point generation is depicted, where counter is removed from HKDF-Extract as an input to the optional "salt" field and placed instead in HKDF-Expand as an input to the optional "info" field. At 2305, rand is generated from Data. At 2310, rand is truncated to rand_len bytes. At 2315, vector is generated by expanding the resultant value of 2310 to the length of Data, using the current counter value that can be initialized at, say, 0. At 2320, vector is exclusive-or added to Data. At 2325, an x-coordinate is formed to generate a candidate value of P. At 2330, the candidate value of P is checked for its validity as a point on the intended elliptic curve. Then, either the flow advances to 2335 or the counter value is incremented at 2340 and fed back into 2315.

An example recovery procedure to extract Data from elliptic curve point P is presented below as corresponding to the algorithm depicted in FIG. 22 for the generation of P:

The x-coordinate of P, as an integer, is converted to bytes, where this byte string is denoted as x.

1. Determine rand_trun and Data_xor based on x=(rand_trun||Data_xor||Data_len_var), where Data_len_var is the field (of byte-length denoted by Data_len_var length) that indicates the value of Data_len.
2. Use HKDF-Expand to generate vector=HKDF-Expand(rand_trun, Data_len).
3. Data=Data_xor .XOR. vector.
4. Integrity check (optional): An integrity check may be executed here by computing rand'=HKDF-Extract (counter, Data) using the recovered value of Data and checking for a match of the proper truncation of the resultant rand' value against the value in the rand_trun field. The value of counter is incremented until there is a successful match and/or a preset limit on tries has been reached. NOTE: Dependent on the use-case specifics such as pertaining to the adversarial model, an internal redundancy check on the recovered Data may potentially be used instead of or in addition to the rand'-based integrity check.

Note that the choice of whether to insert the counter value into the HKDF-Extract operation vs. the HKDF-Expand operation has bearing on the integrity verification process, which comprises recomputing the truncated rand value from recovered Data and checking for a match against the truncated rand field. Note also that if the counter value is incorporated into HKDF-Expand, then successful recovery of Data relies on choosing the correct value of counter, since such recovery is dependent on the Data .XOR. vector field where recovery of vector is as an output of HKDF-Expand. Verifying such choices of counter may involve checking for internal redundancy of the instances of recovered Data. Further, the counter value affects integrity verification processing even if the counter value is not incorporated into HKDF-Extract, in that recovered Data is an input to HKDF-Extract. In alternative embodiments, the counter value may instead be incorporated as an explicit field. An integrity verification process may be considered optional in some configurations. In the non-deterministic sub-case, rand may be randomly or pseudorandomly generated if a self-contained integrity check feature is not required. Alternatively, if an integrity check feature is required, the truncated rand field entry can, for example, be populated by a randomly or pseudorandomly generated prefix of appropriate bit-length concatenated with a preset-length truncated hash of a value that comprises a concatenation of the prefix and Data.

The following algorithm expresses an example embodiment of deriving an elliptic curve point P from Data as source for use with TOKEN-and-KEY_TOKEN-based tokenization:

Generate point P on the elliptic curve from Data:
1. Concatenate the following and turn the bytes into an integer to get x_0:
   a. x_0=hash(Data||Pad) where Pad is a string of pre-set length using, say, all zeroes on the first run and is incremented with each successive run.
2. Determine if $((x\_0)^3 - 3x\_0 + b)$ (mod p) is a quadratic residue, say $y^2$ (mod p). If not, increment Pad and repeat steps 1 and 2. Once a valid x_0 is found, define x_found=x_0.
   a. There are (p+1)/2 quadratic residues (including 0). Therefore, every time an x_0 is tried there is ½+ ½p~½ chance that x_0 yields a quadratic residue, which implies that this loop should not be extensive.
   b. Preferably, the following additional check is added in order to avoid bias: Reject any candidate x-coordinate values that involve modulo p wrap-around, i.e., for which $2^{256}$>x_0>p-1. This bias-avoidance technique has a negligible impact on computation time as discussed in U.S. Pat. No. 11,374,910.
3. Denote by y_found the smaller of y and -y reduced mod p, such that
   a. $y^2=((x\_found)^3-3x\_found+b)$ (mod p).

The point P is now defined as (x_found, y_found).

Referring now to FIG. 24 that encapsulates the steps above for generating P from Data as flow 2400: At 2405, a candidate x-coordinate is generated from Data using a Pad value, that may be initialized as, say, a string of all zeroes. At 2410, the x-coordinate generated at 2405 is tested for its validity as corresponding to a point on the intended elliptic curve. If yes, then advance to 2415. If no, then increase the value of Pad and return to 2405.

Following tokenization: The Requestor uses KEY_TOKEN as an input to HKDF to derive rand, key (as encryption key) and nonce (as initialization vector (IV)) used to encrypt the Data. Encrypt plaintext that incorporates, at least, Data with AES-CTR mode using the key and nonce to derive ciphertext. (Optional) integrity check: an integrity check may be enabled here for the recovery by using, for example, AES-GCM authenticated encryption as opposed to AES-CTR mode.

Following detokenization: Decrypt the ciphertext with the key and nonce to recover (rand||Data||Data_len_var), and thus recover Data. If AES-GCM is used to encrypt, then the generated Authentication Tag is usable to verify the integrity of Data.

The encryption in the symmetric-key case can be handled via various methods, such as, for example, using AES-GCM mode if authenticated encryption is desired, or using AES-CTR mode otherwise. The AES (or other encryption engine-) symmetric key and Initialization Vector (also denoted as a nonce) can be derived from a KEY_TOKEN using a key derivation method such as HKDF. Alternatively, HKDF or (potentially truncated) hash can be applied to a KEY_TOKEN with the result exclusive-or added to a value that can comprise, for example, [TruncatedHash(Data) ||Data||Data bit-length], where || denotes concatenation and TruncatedHash(Data) as a truncation of hash(Data) can be eliminated if an integrity check is not required and/or Data bit-length can be eliminated if the bit-length of Data is not considered sensitive and thus there is no need to pad out to constant length. Note that the function of KEY_TOKEN (whether computed using HKDF, a hash function, or other method) can be configured so that its bit-length matches that of the function of Data that it is exclusive-or added to. In the deterministic sub-case, the generation of KEY_TOKEN (and of TOKEN from which KEY_TOKEN is derived upon a recovery operation) can be based, for example, on hash (Data pad) as (or similarly as) described in U.S. Pat. No. 11,374,910. In the non-deterministic sub-case, the generation of KEY_TOKEN (and of Token from which KEY_TOKEN is derived upon a recovery operation) can instead be based, for example, on hash(random/pseudorandom||pad).

Reversible tokenization can play an important role in suppressing unauthorized access to sensitive data while reaping the advantages of artificial intelligence as instantiated via large language models operating on less sensitive inputs that are associated with and/or are indexed by parts of the sensitive data. This applies to inputs for the purpose of inference, as well as to inputs for the purpose of training the language model. A more effective training corpus can result from the expansion of the usable set of inputs that is due to being able to excise the sensitive data without sacrificing retention of the association of that sensitive data to the less sensitive inputs and thus to the outputs of the language model. However, inclusion of the reversible tokens that represent the sensitive data as part of the inputs to the model, such as a recurrent neural network language model, would adversely affect the operational capability of such language models in that output fidelity would be degraded because of the considerable increase in the length of inputs to the model. Regardless of tokenization method specifics, the length of reversible tokens cannot be shorter than that of the source data that is tokenized, not including any additional length due to requirements such as source data integrity verification. Thus, there is a need to introduce short tokens that are included in the inputs to the language model along with the less sensitive data, and along with metadata such as the data type of the source data that underlies the reversible tokens. The short tokens are tracked against their corresponding reversible tokens to ensure meaningful use of the outputs of the language model. The reversible tokens can be generated deterministically, resulting in the capability to match across occurrences of the same source data without requiring access to detokenization, and thus providing for a higher level of data-in-use security. Alternatively, the reversible tokens can be generated non-deterministically, such as to fulfill a need to suppress correlation of reversible tokens to their underlying source data. Such non-determinism is usable, for example, to hide whether a first source data and a second source data are identical given access to their corresponding reversible tokens. The source data can be locally discarded once tokenization is requested without adversely impacting the utility of the outputs of the language model, where retention and/or reacquisition of the metadata and the association of the short token to the reversible token serves to maintain context. The features discussed herein are consistent with updating of the tokenization processor secrets used by the tokenization processors in performance of generating the reversible tokens in that the resultant reversible tokens remain unaffected by such updating if carried out as previously described within this specification. Further, the features discussed herein are consistent with ephemeral blinding by a tokenization Requestor of the source data followed by unblinding during processing by the tokenization Requestor of tokenization processor outputs as described previously. The incorporation, i.e., embedding of role-based access control scope parameters into reversible tokens, as described previously, can be carried out without affecting the invariance of the resultant reversible tokens as the tokenization processor secrets are updated. Further, an indicator of the relevant role-based access control scope parameters that were incorporated during tokenization can be used during detokenization as requested by a Requestor that is authorized for that operation. Success of the detokenization relies on matching of the role-based access control scope parameters used by the tokenization processors during detokenization against those used during the tokenization. A short token can be generated as dependent on the corresponding reversible token, such as by invoking a hash function or truncated hash function over the reversible token as at least one argument of the function. Alternatively, a short token can be generated independently of reversible tokens, such as by using a counter that is reset at the onset of each Requestor session that involves a language model. As another alternative, short tokens can be generated randomly or pseudorandomly. Combinations of these example instantiations of short token generation can be used.

Relevant to FIG. 25, by one approach, a process for providing inputs to a language model and recoverability of source data associated with outputs of the language model results in a reversible token that represents source data, wherein the tokenization processors update their tokenization processor secrets without affecting the resultant reversible token into which the tokenization processor secrets have been incorporated, and the tokenization requestor generates an input to a language model, as a substitution of the reversible token, that comprises, at least, a short label token that comprises, at least, metadata and a short token. Further, the tokenization requestor associates, with the reversible token, an output of the language model that is attributable to the input. The substitution ensures output fidelity retention relative to the outputs of the language model.

With continued reference to FIG. 25, at 2530 Requestor 2510 and Backend 1 2515 communicate and at 2535 Requestor 2510 and Backend 2 2520 communicate, wherein in preparation of supplying one or more inputs Requestor 2510 blinds source data for which tokenization is requested. One or more such inputs may also include blinded values for values that are derived from outputs of a random or pseudorandom number generator, which may result in generation of a TOKEN, as a non-deterministic token, that differs from another TOKEN that is generated using the same source data. The communication at 2530 may entail one round. e.g., as depicted in FIG. 2, or two or more rounds, e.g., as depicted in FIG. 12. Similarly, the communication at 2535 may entail one round, or two or more rounds. The blinding may be done, for example, via the application of e as, e.g., in FIG. 2 and FIG. 12, and the unblinding at 2540 may be done via the application of $e^{-1}$ as, e.g., in FIG. 2 and FIG. 12. At 2540, Requestor 2510 processes at least one or more final tokenization responses communicated over 2530 and at least one or more final tokenization responses communicated over 2535, resulting in one or more TOKEN values. At 2545, Requestor 2510 stores one or more TOKEN values. At 2545, Requestor 2510 also stores one or more short token values that each correspond to a TOKEN value, where such storage of short token values may be considered optional if a short token value can be regenerated from other information such as including the corresponding TOKEN value. At 2545, Requestor 2510 also stores metadata values, which may include, for example, the data type of source data that is represented by a TOKEN, where such storage of metadata may be considered optional if such metadata is to be returned at 2555 from Language Model 2525. At 2550, Requestor 2510 transmits one or more metadata values and one or more corresponding short token values. At 2555, one or more outputs of Language Model 2525 are transmitted to Requestor 2510. One or more such outputs include one or more short tokens or alternative references to one or more short tokens that were transmitted at 2550.

Reversible tokenization with role-based access control as instantiated herein can be used to establish a data provenance property of proof of origin, in that success of tokenization of source data using a specific set of role-based access control parameters relies on the capability of detokenization to yield recovery of the source data if and only if the set of role-based access control parameters used during the tokenization matches that used during the detokenization.

Relevant to FIG. 26, by one approach, a method for providing data providence comprises: (1) upon a first set of one or more requests by a first requestor, tokenizing that entails, at least in part, embedding by a first tokenization processor and a second tokenization processor of a second set of one or more role-based access control scope parameters and a third set of tokenization processor secrets into a first reversible token of at least one reversible token, wherein the first reversible token remains invariant notwithstanding updating of the third set of tokenization processor secrets across the first tokenization processor and the second tokenization processor; and (2) upon a fourth set of one or more requests of a second requestor, detokenizing, wherein a fifth set of one or more role-based access control parameters is embedded during detokenization, success of tokenization is determined by the detokenization resulting in recovery of source data that matches that which was tokenized, and the success of the tokenization relies on the second set of one or more role-based access control parameters matching the fifth set of one or more role-based access control parameters.

With continued reference to FIG. 26, Requestor 1 2610 communicates via one or more rounds with Backend 1 2615 and Backend 2 2620 at 2625 in order to request tokenization of Data represented by P, followed at some later time by Requestor 2 2635 communicating via one or more rounds with Backend 1 2615 and Backend 2 2620 at 2640 in order to request detokenization of TOKEN that denotes the result of the tokenization that was requested by Requestor 1 2610. As discussed previously, Requestor 1 input, at 2625, includes eP for an ephemeral value e, and Requestor 2 input, at 2640, includes e'TOKEN for an ephemeral value e'. Also at 2625, Backend 1 2615 and Backend 2 2620 use a set of role-based access control parameters as denoted by {access control parameter $_{Requestor\ 1}$} that is compatible with a set of one or more requests for tokenization that comprises the request for tokenization of Data by Requestor 1 2610. Also at 2640, Backend 1 2615 and Backend 2 2620 use a set of role-based access control parameters as denoted by {access control parameter $_{Requestor\ 2}$} that is compatible with a set of one or more requests for detokenization that comprises the request for detokenization of TOKEN by Requestor 2 2635. Also at 2625, Backend 1 2615 uses a set of tokenization processor secrets that is available to it at the time of tokenization, as denoted by {Backend 1 secret $_{Time\ of\ tokenization}$}, and Backend 2 2620 uses a set of tokenization processor secrets that is available to it at the time of tokenization, as denoted by {Backend 2 secret Time of tokenization}. Also at 2640, Backend 1 2615 uses a set of tokenization processor secrets that is available to it at the time of detokenization, as denoted by {Backend 1 secret $_{Time\ of\ detokenization}$}, and Backend 2 2620 uses a set of tokenization processor secrets that is available to it as the time of detokenization, as denoted by {Backend 2 secret $_{Time\ of\ detokenization}$}. At 2630, Requestor 1 2610 uses e in processing final Backend 1 and Backend 2 outputs that were received by Requestor 1 2610 at 2625, with the result of processing denoted by TOKEN. At 2645, Requestor 2 2635 uses e' in processing final Backend 1 and Backend 2 outputs that were received by Requestor 2 2635 at 2640, with the result of processing denoted by P' that equals P if and only if {access control parameter $_{Requestor\ 1}$} equals {access control parameter $_{Requestor\ 2}$}.

Relevant to FIG. 27, by one approach, the following is made available for audit, either directly or via a proxy, by the first tokenization processor, the second tokenization processor, and the first requestor, respectively: a first identifier as indicative of identity of the first requestor and a first final tokenization response corresponding to the first set of one or more requests by the first requestor; a second identifier as indicative of the identity of the first requestor and a second final tokenization response corresponding to the first set of one or more requests by the first requestor; a first ephemeral value used in generating the first set of one or more requests. Also relevant to FIG. 27, an auditor determines the identity of the first requestor.

With continued reference to FIG. 27, Backend 1 2715, Backend 2 2720, and Requestor 1 2725 that previously acted as Requestor 1 2610 of FIG. 26 each transmit information to Auditor 2710, wherein each such transmission is direct or conducted via an intermediary, and each such transmission is communicated live to Auditor 2710 or later retrieved by Auditor 2710 from accessible storage. At 2730, Backend 1 2715 transmits an identifier of Requestor 1, its final tokenization response as consistent with that delivered to Requestor 1 2725 at 2625 of FIG. 26, and a scope ID that unambiguously identifies the one or more attributes purportedly associated with Requestor 1 2725 that were used by Backend 1 2715 to choose the set of role-based access control parameters {access control parameter $_{Requestor\ 1}$} used at 2625 of FIG. 26. At 2735, Backend 2 2720 transmits an identifier of Requestor 1, its final tokenization response as consistent with that delivered to Requestor 1 2725 at 2625 of FIG. 26, and a scope ID that unambiguously identifies the one or more attributes purportedly associated with Requestor 1 2725 that were used by Backend 2 2720 to choose the set of role-based access control parameters {access control parameter $_{Requestor\ 1}$} used at 2625 of FIG. 26. At 2740, Requestor 1 2725 transmits its e value that was used at 2625 of FIG. 26, as well as a pointer if needed to unambiguously associate that e value to final tokenization responses transmitted at 2730 and 2735, respectively. As one example, such pointer can be set to hash(final tokenization responses) using a hash function or truncated hash function. As another example, for which it may not be necessary to include a pointer, Requestor 1 2725 can transmit a function of e to Backend 1 2715 and Backend 2 2720 so that they can include that in 2730 and 2735, respectively. In that case, preferably the function of e cannot feasibly be reversed by Backend 1 2715 or Backend 2 2720 to rederive e. An example of a suitable such function is encryption under a public key for which the corresponding private key is securely accessible to Auditor 2710. At 2745, Auditor 2710 derives TOKEN by using Backend 1 final tokenization response, Backend 2 final tokenization response, and the inverse of e. This derivation is equivalent to the processing done by Requestor 1 2725 at 2630 of FIG. 26. At 2750, Auditor 2710 stores an association of Requestor 1 2725 as identified by Backend 1 2715 at 2730 and by Backend 2 2720 at 2735 to TOKEN. The same value of TOKEN may previously or later be associated with a different Requestor than Requestor 1.

By one approach, beyond ascertaining the association of an identified tokenization requestor to a TOKEN as depicted by FIG. 27, upon successful detokenization as determined by an auditor or a delegate of the auditor recovering source data that matches that which was tokenized by a thus identified tokenization requestor, the auditor can determine whether the identified tokenization requestor was authorized to submit the source data for the tokenization. For example, the one or more attributes purportedly associated with the identified tokenization requestor as determinative of the set of role-based access control parameters used for the tokenization may or may not be consistent with specific source data that was tokenized upon request of the identified tokenization requestor. As another example, although the one or more attributes that determined the set of role-based access control parameters used for the tokenization may not in and of themselves warrant permission to request tokenization of the specific source data, such tokenization may be considered acceptable given permissions granted to the identified requestor as associated with their job functions and/or other criteria.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method for providing inputs to a language model and recoverability of source data associated with outputs of the language model, as a process resulting in at least one reversible token as a reversible representation of the source data, using at least a first control circuit configured as a first tokenization processor, a second control circuit configured as a second tokenization processor that is different than the first tokenization processor, and a first requesting network element acting as a first requestor, wherein the first tokenization processor and the second tokenization processor communicate with the first requestor, the method comprising:

incorporating by the first tokenization processor and the second tokenization processor of a first set of tokenization processor secrets into a first reversible token of the at least one reversible token, wherein the first reversible token remains invariant notwithstanding updating of the first set of tokenization processor secrets across the first tokenization processor and the second tokenization processor;

generating by the first requestor of a first input of the inputs to the language model, comprising, at least in part, substituting, for output fidelity retention, of the first reversible token by a first short label token comprising at least a first metadata and a first short token; and associating by the first requestor with the first reversible token, a first output of the outputs of the language model that is attributable to the first input.

2. The method of claim 1 further comprising one of:
generating the first reversible token deterministically, thus enabling matching on the source data; and
generating the first reversible token non-deterministically, thus hiding whether a first source data as a first instance of the source data and a second source data as a second instance of the source data are identical given access to a second reversible token generated using the first source data and to a third reversible token generated using the second source data wherein the second reversible token does not match the third reversible token.

3. The method of claim 1 further comprising:
providing the inputs to the language model for at least one of: a purpose of inference; and a purpose of training the language model.

4. The method of claim 1 further comprising:
discarding by the first requestor of the source data that is represented by the first reversible token, wherein at least a part of the first metadata remains accessible as a point of reference.

5. The method of claim 1 further comprising:
incorporating by the first tokenization processor and the second tokenization processor of a second set of one or more role-based access control scope parameters into the first reversible token, wherein the first reversible token remains invariant notwithstanding updating of the first set of tokenization processor secrets across the first tokenization processor and the second tokenization processor; and
associating by the first requestor with the first reversible token, an indicator of the second set of one or more role-based access control scope parameters.

6. The method of claim 5 further comprising:
detokenizing, wherein successful detokenization relies on matching a third set of one or more role-based access control scope parameters incorporated during the detokenization against the second set of one or more role-based access control scope parameters.

7. A method for providing data provenance via tokenization and detokenization, as a process resulting in at least one reversible token, using at least a first control circuit configured as a first tokenization processor, a second control circuit configured as a second tokenization processor that is different than the first tokenization processor, a first requesting network element acting as a first requestor, and a second requesting network element acting as a second requestor, wherein the first tokenization processor and the second tokenization processor communicate with the first requestor and the second requestor, the method comprising:

upon a first set of one or more requests by the first requestor, tokenizing, entailing, at least in part, embedding by the first tokenization processor and the second tokenization processor of a second set of one or more role-based access control scope parameters and a third set of tokenization processor secrets into a first reversible token of the at least one reversible token, wherein the first reversible token remains invariant notwithstanding updating of the third set of tokenization processor secrets across the first tokenization processor and the second tokenization processor; and upon a fourth set of one or more requests of the second requestor, detokenizing, wherein: a fifth set of one or more role-based access control parameters is embedded during the detokenization; success of the tokenization is determined by the detokenization resulting in recovery of source data that matches that which was tokenized; and the success of the tokenization relies on the second set of one or more role-based access control parameters matching the fifth set of one or more role-based access control parameters.

8. The method of claim 7 further comprising:
the first tokenization processor, either directly or via a first proxy, making, at least, a first identifier as indicative of identity of the first requestor and a first final tokenization response corresponding to the first set of one or more requests by the first requestor available for audit;
the second tokenization processor, either directly or via a second proxy, making, at least, a second identifier as indicative of the identity of the first requestor and a second final tokenization response corresponding to the first set of one or more requests by the first requestor available for audit; and
the first requestor, either directly or via a third proxy, making, at least, a first ephemeral value used in generating the first set of one or more requests available for audit.

9. The method of claim 8 further comprising:
determining by an auditor the identity of the first requestor.

10. The method of claim 9 further comprising:
determining by the auditor upon successful detokenization of the first reversible token, as a reversible representation of the source data, whether the first requestor was authorized to submit the source data for the tokenization.

11. An apparatus for providing inputs to a language model and recoverability of source data associated with outputs of the language model, wherein the apparatus comprises:
a plurality of network interfaces;
a plurality of control circuits each operably coupled to one of the network interfaces wherein each of the control circuits is configured as a tokenization processor of a plurality of tokenization processors that communicates with a first requesting network element acting as a first requestor, wherein the apparatus is further configured:
to carry out a process resulting in at least one reversible token as a reversible representation of the source data, using at least a first control circuit of the plurality of control circuits configured as a first tokenization processor of the plurality of tokenization processors, a second control circuit configured as a second tokenization processor of the plurality of tokenization processors that is different than the first tokenization processor, and the first requestor;

to incorporate by the first tokenization processor and the second tokenization processor a first set of tokenization processor secrets into a first reversible token of the at least one reversible token, wherein the first reversible token remains invariant notwithstanding updating of the first set of tokenization processor secrets across the first tokenization processor and the second tokenization processor;

to generate by the first requestor a first input of the inputs to the language model, comprising, at least in part, substituting, for output fidelity retention, of the first reversible token by a first short label token comprising at least a first metadata and a first short token; and to associate by the first requestor with the first reversible token, a first output of the outputs of the language model that is attributable to the first input.

12. The apparatus of claim 11 further comprising one of:
the first requestor generates the first reversible token deterministically, thus enabling matching on the source data; and
the first requestor generates the first reversible token non-deterministically, thus hiding whether a first source data as a first instance of the source data and a second source data as a second instance of the source data are identical given access to a second reversible token generated using the first source data and to a third reversible token generated using the second source data wherein the second reversible token does not match the third reversible token.

13. The apparatus of claim 11 further comprising:
the first requestor provides the inputs to the language model for at least one of: a purpose of inference; and a purpose of training the language model.

14. The apparatus of claim 11 further comprising:
the first requestor discards the source data that is represented by the first reversible token, wherein at least a part of the first metadata remains accessible as a point of reference.

15. The apparatus of claim 11 further comprising:
the first tokenization processor and the second tokenization processor incorporate a second set of one or more role-based access control scope parameters into the first reversible token, wherein the first reversible token remains invariant notwithstanding updating of the first set of tokenization processor secrets across the first tokenization processor and the second tokenization processor; and
the first requestor associates an indicator of the second set of one or more role-based access control scope parameters with the first reversible token.

16. The apparatus of claim 15 further comprising:
a second network element acting as a second requestor, and the first tokenization processor and the second tokenization processor effecting detokenization, wherein successful detokenization relies on matching a third set of one or more role-based access control scope parameters incorporated during the detokenization against the second set of one or more role-based access control scope parameters.

17. An apparatus for providing data provenance via tokenization and detokenization, wherein the apparatus comprises:
a plurality of network interfaces;
a plurality of control circuits each operably coupled to one of the network interfaces wherein each of the control circuits is configured as a tokenization processor of a plurality of tokenization processors that communicates with a first requesting network element acting as a first requestor and a second requesting network element acting as a second requestor, wherein the apparatus is further configured:
to carry out a process resulting in at least one reversible token, using at least a first control circuit of the plurality of control circuits configured as a first tokenization processor of the plurality of tokenization processors, a second control circuit of the plurality of control circuits configured as a second tokenization processor of the plurality of tokenization processors that is different than the first tokenization processor, the first requestor, and the second requestor, wherein the first tokenization processor and the second tokenization processor communicate with the first requestor and the second requestor;
to tokenize, upon a first set of one or more requests by the first requestor, entailing, at least in part, embedding by the first tokenization processor and the second tokenization processor of a second set of one or more role-based access control scope parameters and a third set of tokenization processor secrets into a first reversible token of the at least one reversible token, wherein the first reversible token remains invariant notwithstanding updating of the third set of tokenization processor secrets across the first tokenization processor and the second tokenization processor; and
to detokenize, upon a fourth set of one or more requests of the second requestor, wherein: a fifth set of one or more role-based access control parameters is embedded during the detokenization; success of the tokenization is determined by the detokenization resulting in recovery of source data that matches that which was tokenized; and the success of the tokenization relies on the second set of one or more role-based access control parameters matching the fifth set of one or more role-based access control parameters.

18. The apparatus of claim 17 further comprising:
the first tokenization processor, either directly or via a first proxy, makes, at least, a first identifier as indicative of identity of the first requestor and a first final tokenization response corresponding to the first set of one or more requests by the first requestor available for audit;
the second tokenization processor, either directly or via a second proxy, makes, at least, a second identifier as indicative of the identity of the first requestor and a second final tokenization response corresponding to the first set of one or more requests by the first requestor available for audit; and
the first requestor, either directly or via a third proxy, makes, at least, a first ephemeral value used in generating the first set of one or more requests available for audit.

19. The apparatus of claim 18 further comprising:
an auditor determines the identity of the first requestor.

20. The apparatus of claim 19 further comprising:
the auditor determines upon successful detokenization of the first reversible token, as a reversible representation of the source data, whether the first requestor was authorized to submit the source data for the tokenization.

\* \* \* \* \*